United States Patent [19]
Ichimura et al.

[11] Patent Number: 5,699,374
[45] Date of Patent: Dec. 16, 1997

[54] SOLID-STATE MATERIAL, METHOD OF MANUFACTURING THE SOLID-STATE MATERIAL, FREQUENCY-CONVERTING ELEMENT, AND FREQUENCY-MEASURING INSTRUMENT INCORPORATING THE ELEMENT, AND FREQUENCY MODULATOR/AMPLIFIER INCORPORATING THE ELEMENT

[75] Inventors: Kouichi Ichimura; Kazushige Yamamoto; Nobuhiro Gemma, all of Yokohama, Japan

[73] Assignee: Kabushiki Kaisha Toshiba, Kawasaki, Japan

[21] Appl. No.: 702,035

[22] Filed: Aug. 23, 1996

[30] Foreign Application Priority Data

| Aug. 24, 1995 | [JP] | Japan | 7-215738 |
| Sep. 13, 1995 | [JP] | Japan | 7-235803 |
| Dec. 26, 1995 | [JP] | Japan | 7-338942 |

[51] Int. Cl.$^6$ ............................................. H01S 3/14
[52] U.S. Cl. ...................................................... 372/39
[58] Field of Search ........................ 372/35–42; 219/121.68

[56] References Cited

U.S. PATENT DOCUMENTS 5,256,849 10/1993 Scully ............................ 215/121.68

OTHER PUBLICATIONS

A. Winnacker, et al., "Photon–Gated Hole Burning: A New Mechanism Using Two–Step Photoionization", Optics Letters, vol. 10, No. 7, Jul. 1985, pp. 350–352.

*Primary Examiner*—Leon Scott, Jr.
*Attorney, Agent, or Firm*—Oblon, Spivak, McClelland, Maier & Neustadt, P.C.

[57] ABSTRACT

A method of manufacturing a solid-state material comprises a first step of preparing a starting material having an energy-level structure with at least first, second and third energy levels, each having a specific level width, the first energy level is the lowest of the three levels, one of the second and third energy levels changing the energy-level structure when light having a predetermined wavelength is applied to the material, and the energy-level structure remaining so changed even after the application of the light, and a second step of irradiating the starting material with a first coherent light beam resonating with transition between the first and third energy levels and a second coherent light beam resonating with transition between the second and third energy levels in a case that the third level is a level which changes the energy level structure, thereby changing a distribution of angular frequency in a plane one axis of which is a first transition angular frequency corresponding to the transition between the first and third energy levels and the other axis of which is a second transition angular frequency corresponding to the transition between the second and third energy levels, thereby to form a solid-state material having new distribution of transition angular frequency, wherein the second step includes a step of setting a spectral width of the first light beam, Rabi characteristic angular frequency for transition of the second light beam and Rabi characteristic angular frequency for transition of the second light beam within one of two inhomogeneous widths for the first and second transition angular frequencies which is broader than the other.

23 Claims, 35 Drawing Sheets

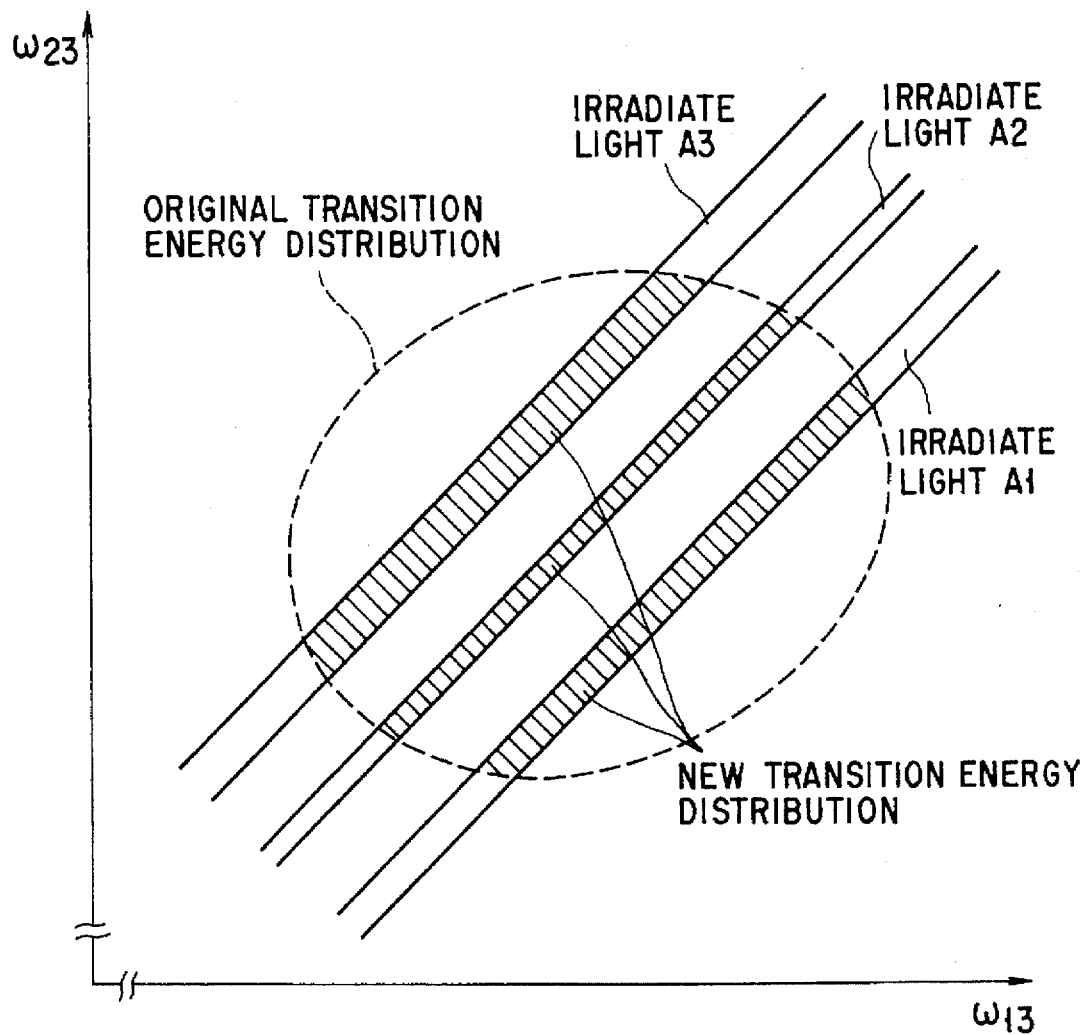
F I G. 5

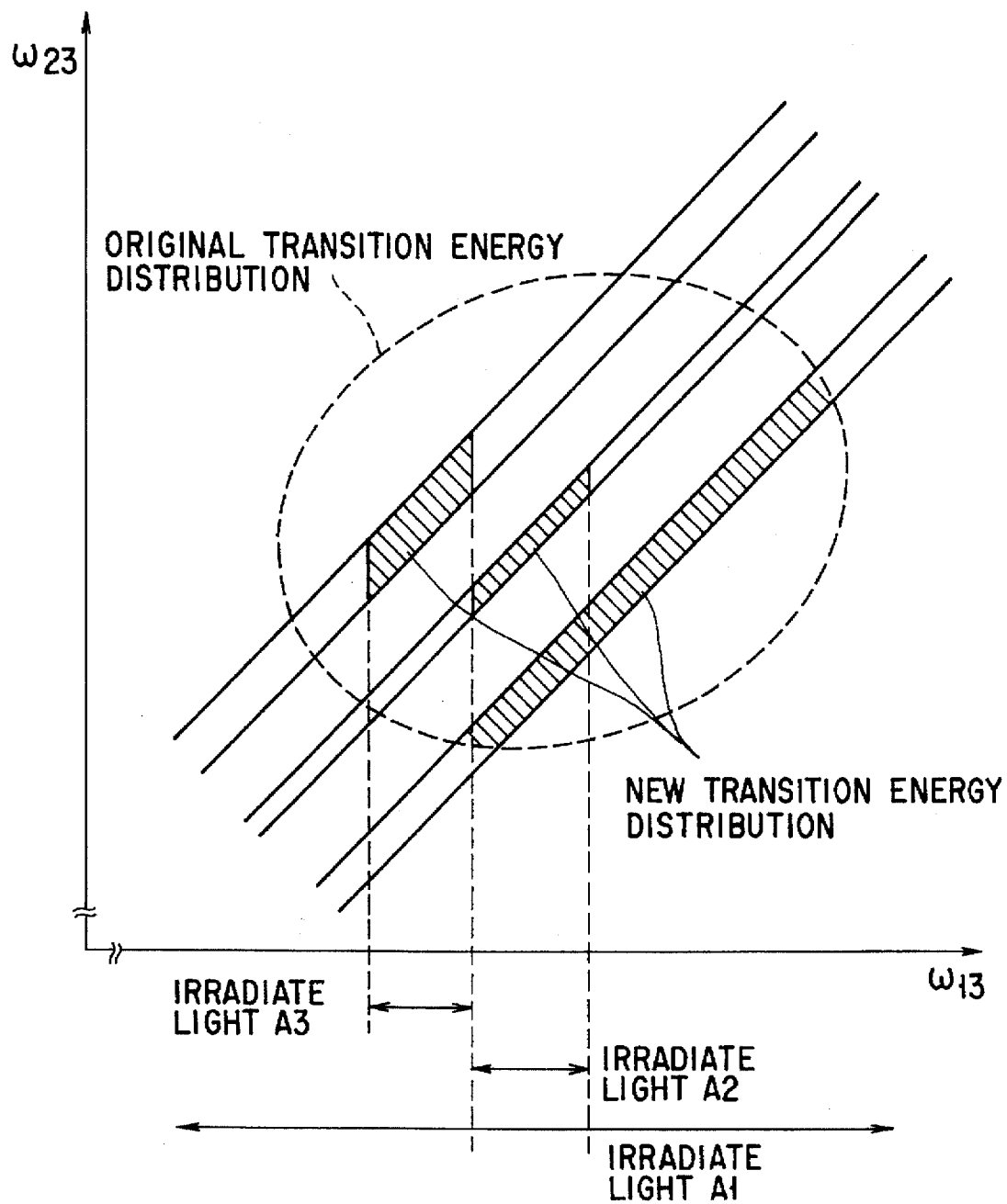
F I G. 6

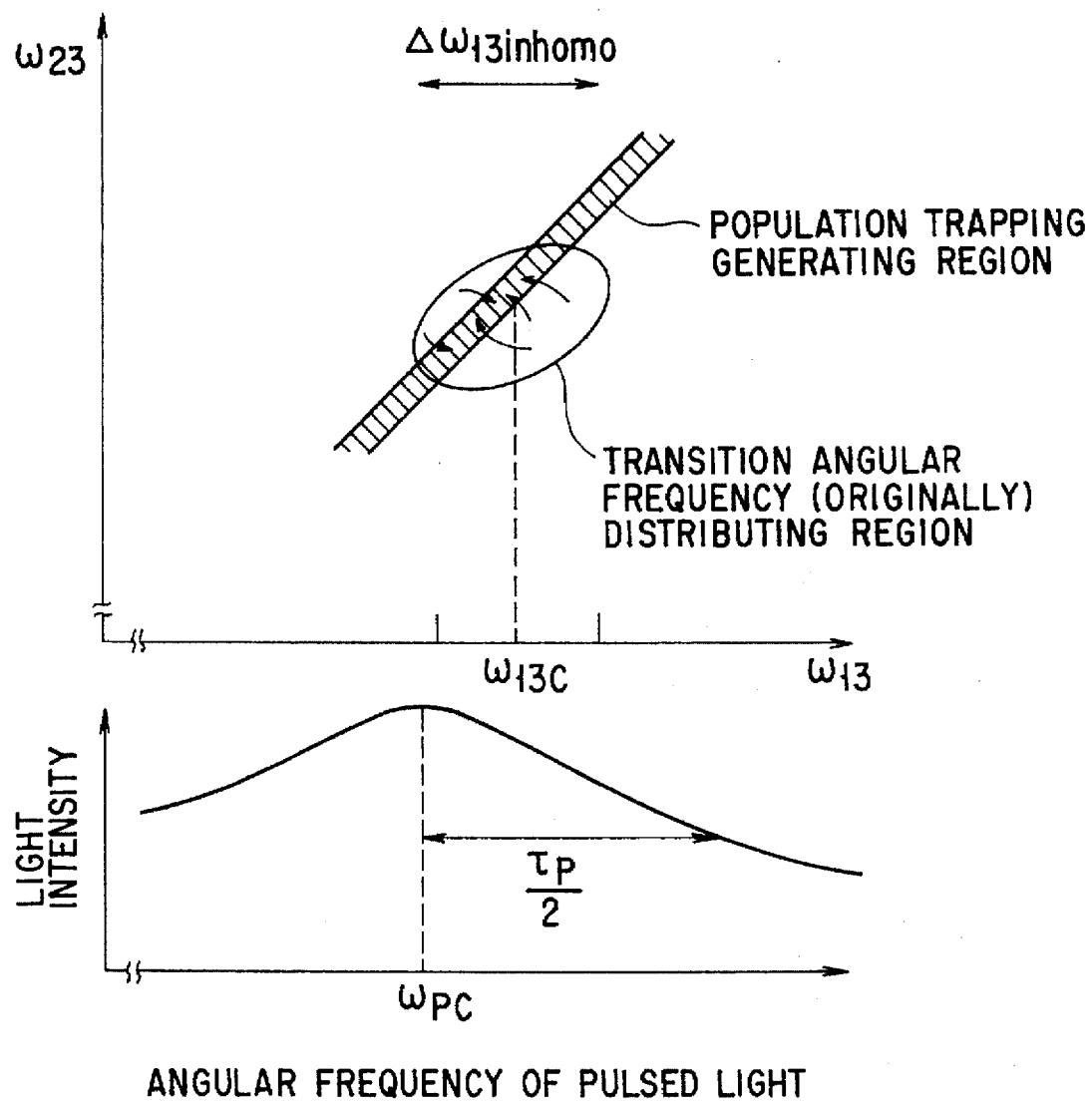
F I G. 10

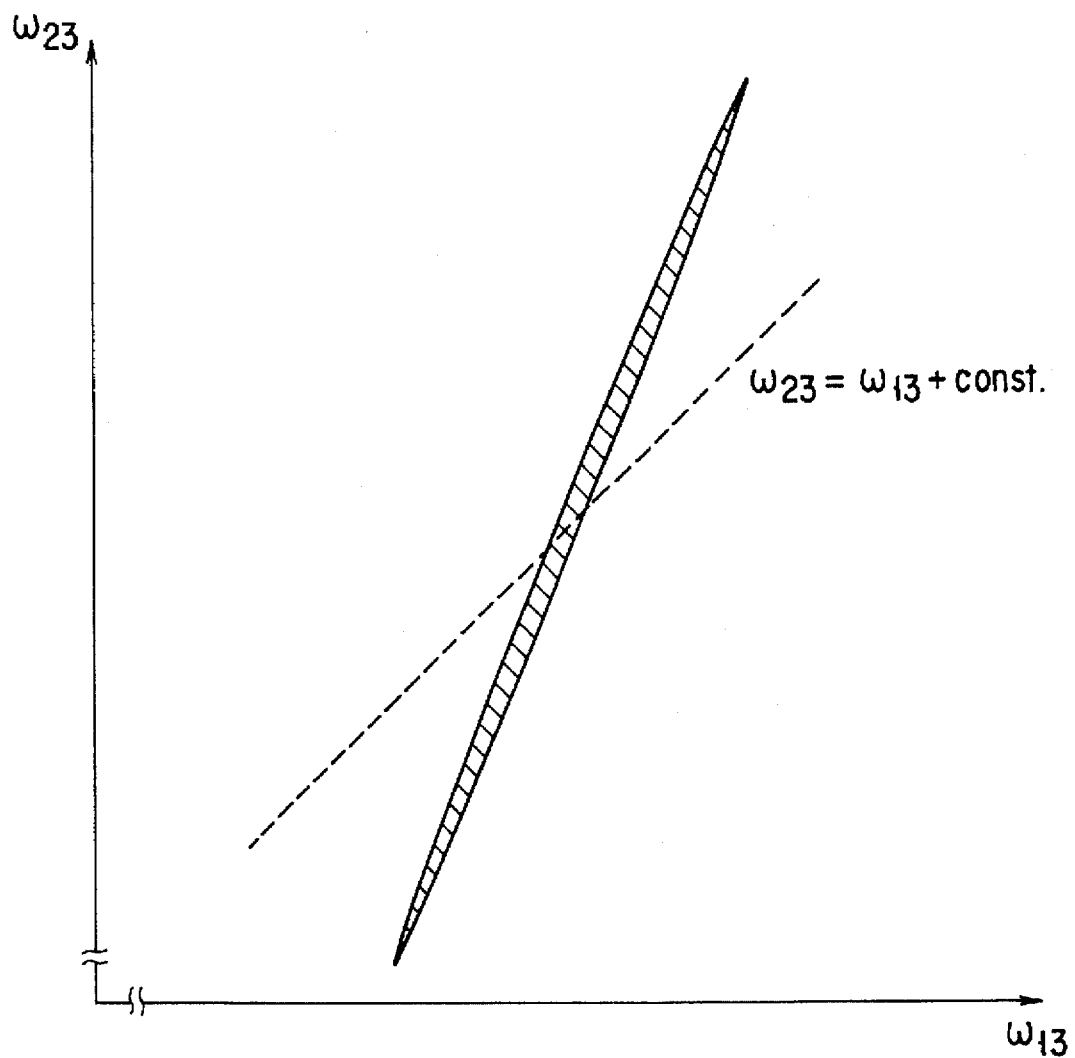
F I G. 12

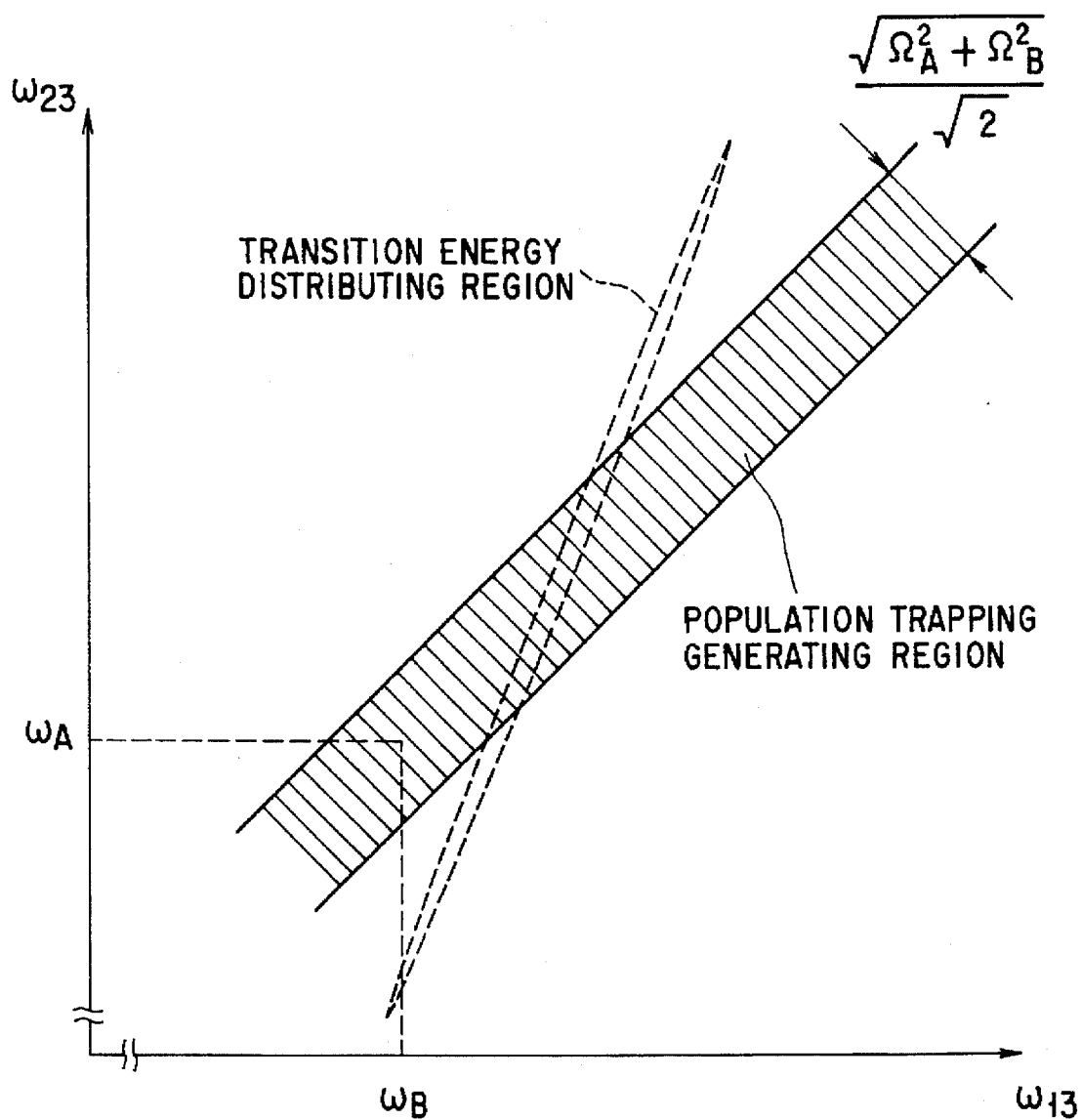
F I G. 13

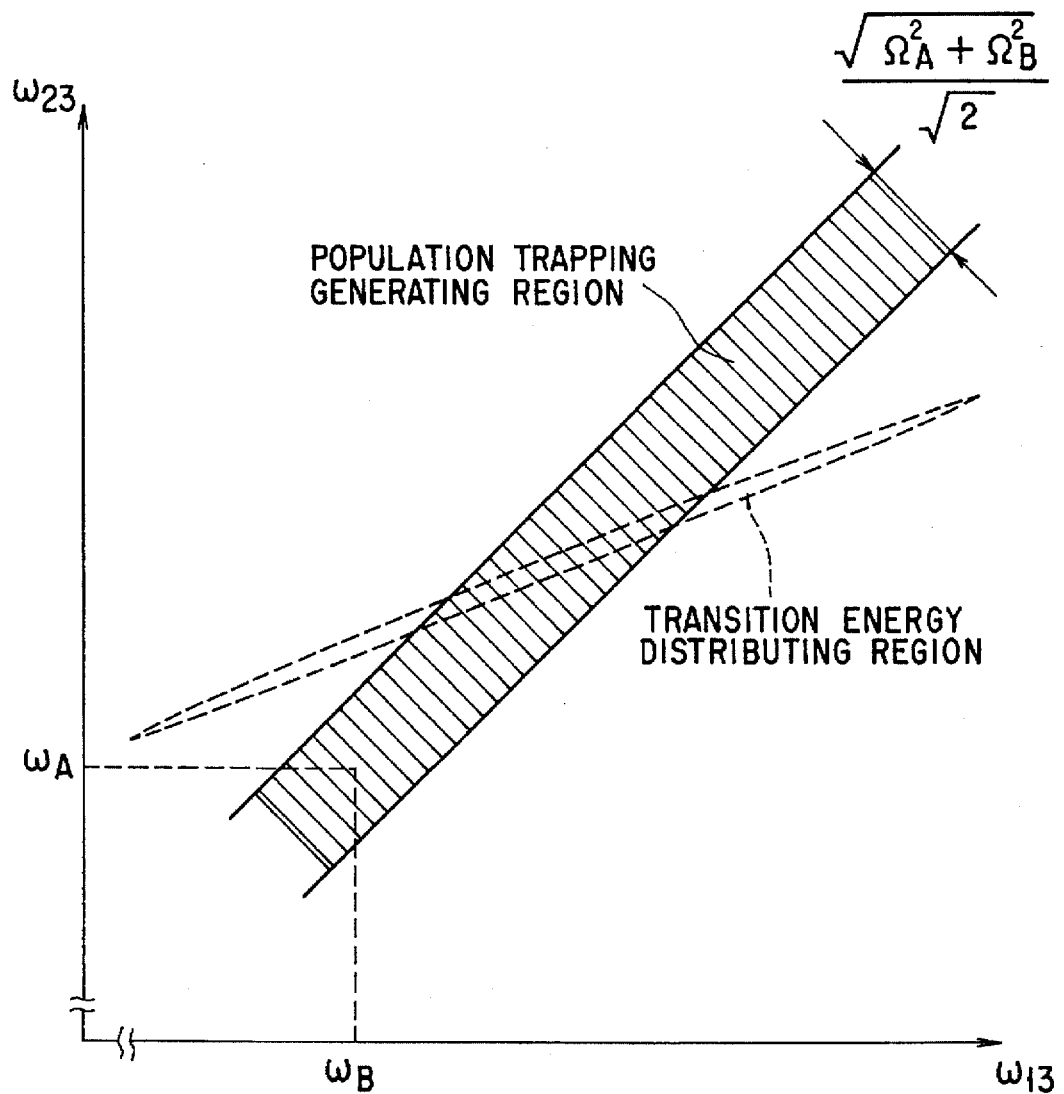
F I G. 17

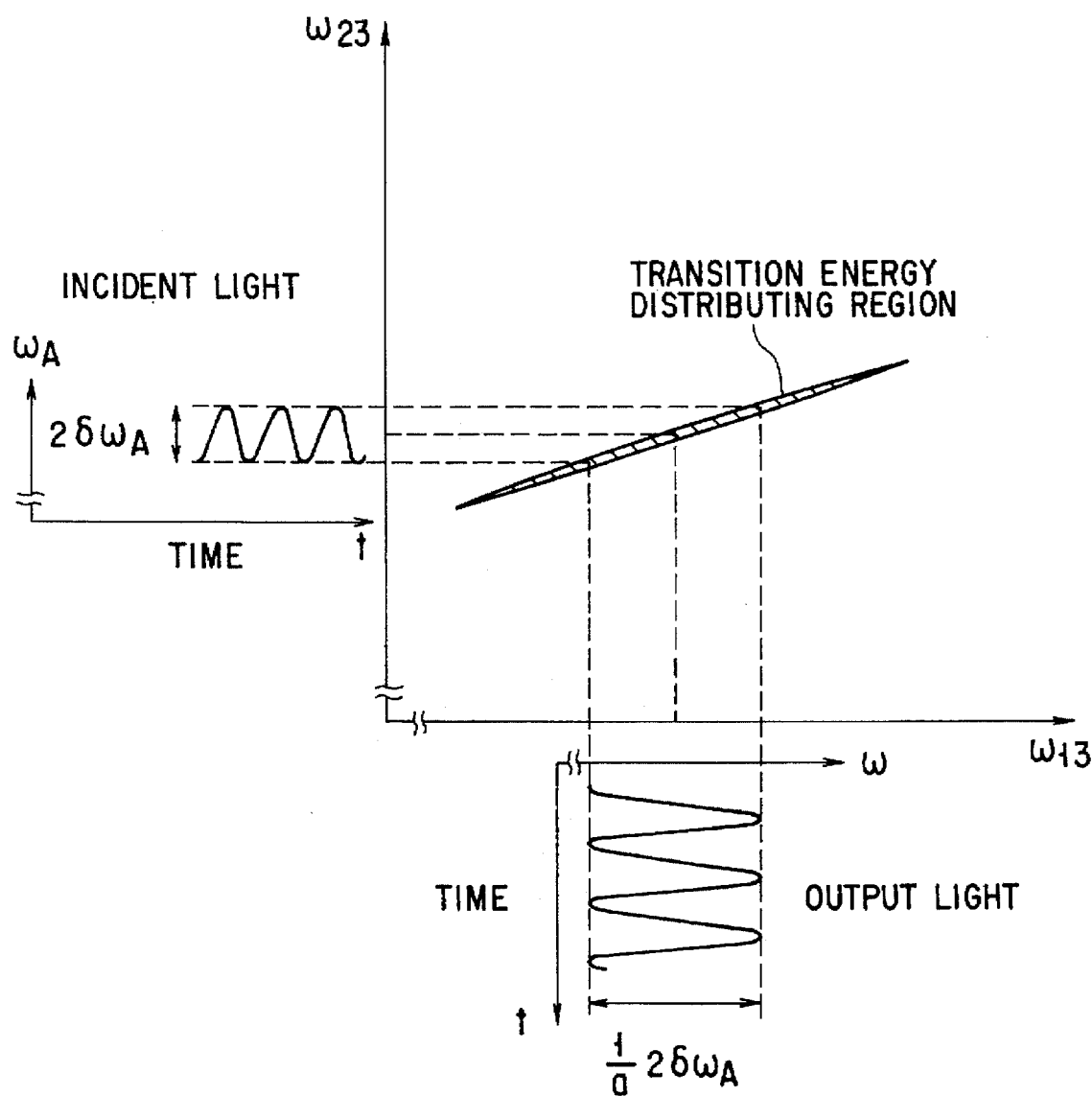
F I G. 19

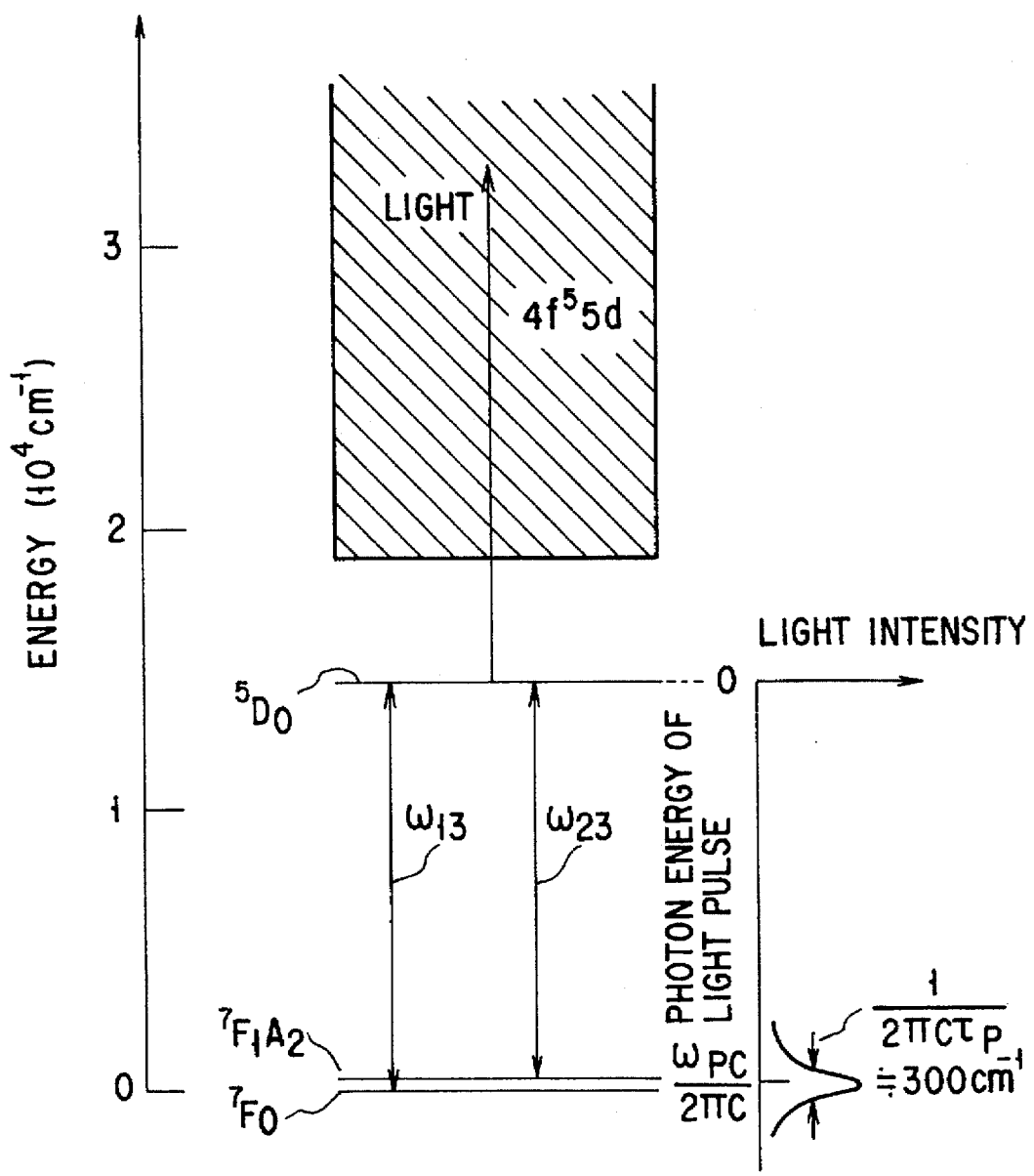
F I G. 20

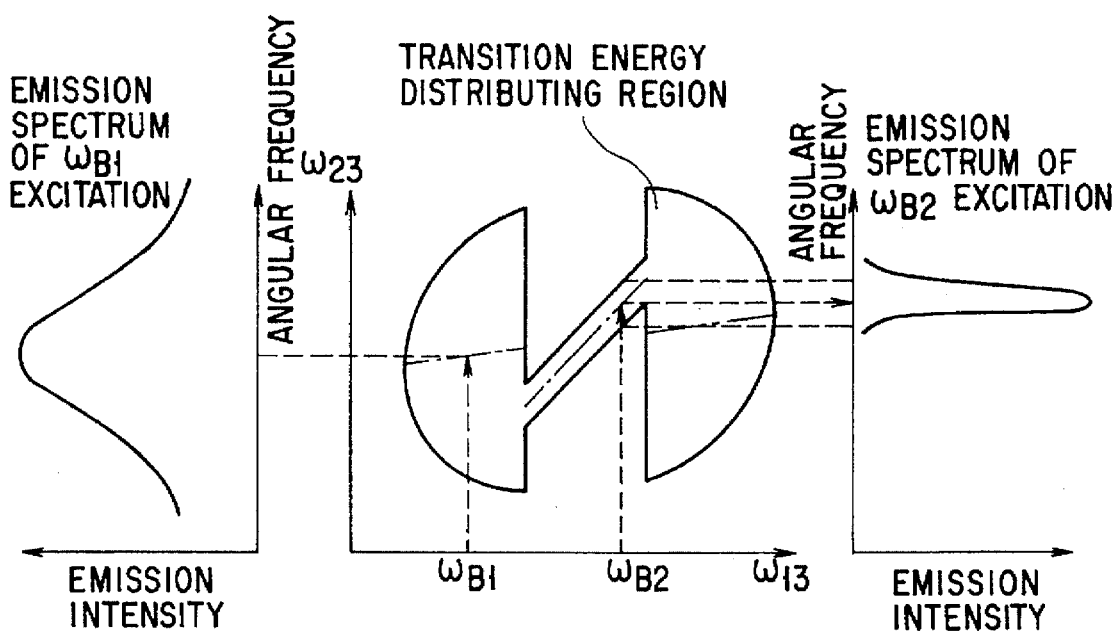
F I G. 25
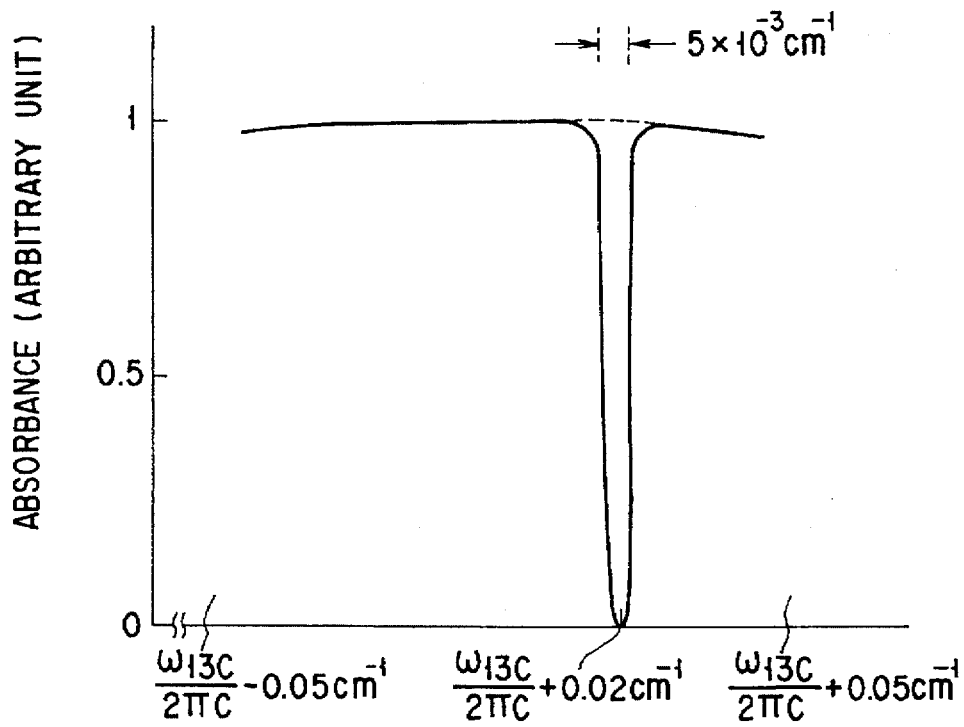
F I G. 26    PHOTON ENERGY OF LIGHT B

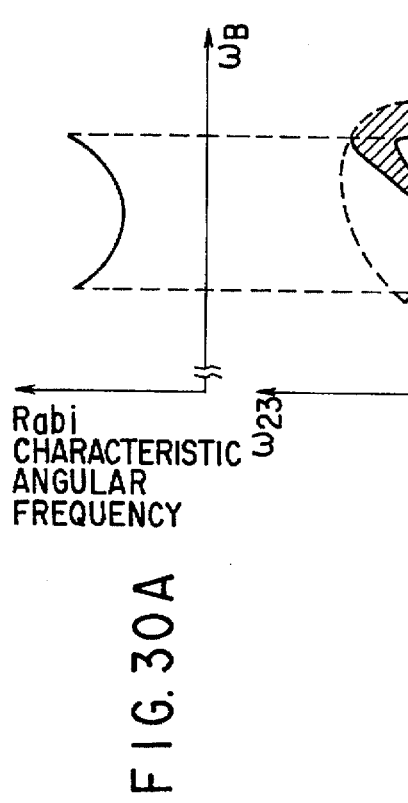
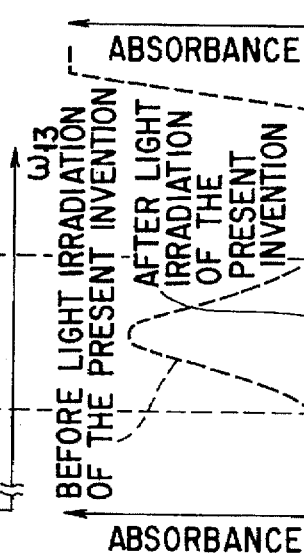
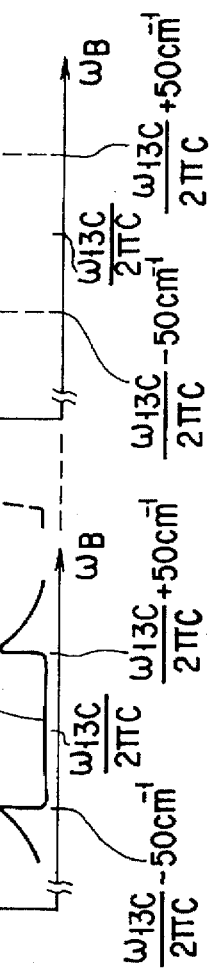
FIG. 30A  FIG. 30B  FIG. 30C  FIG. 30D

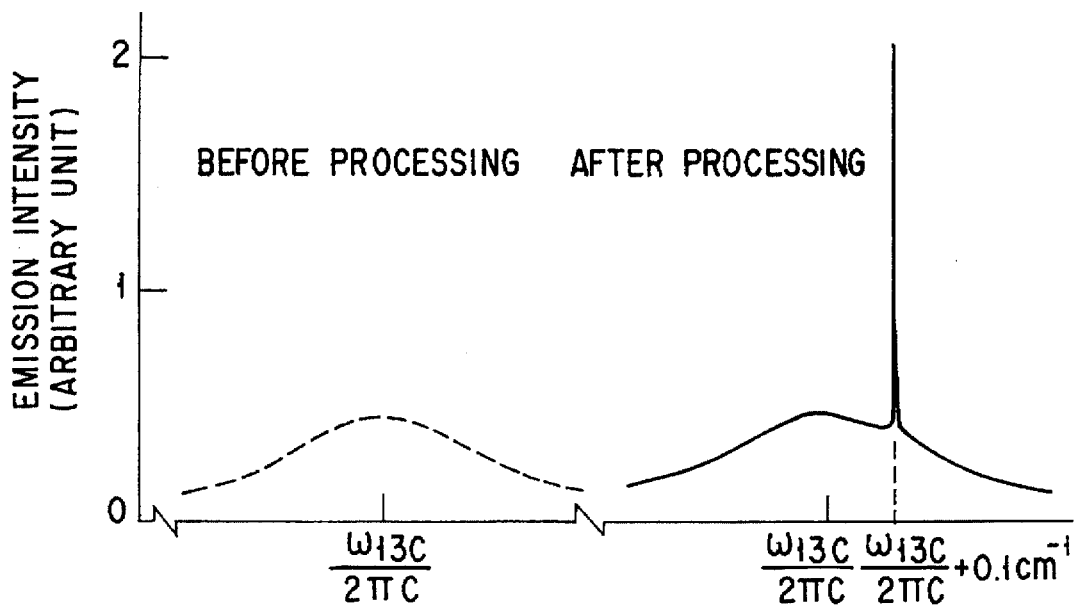
F I G. 37
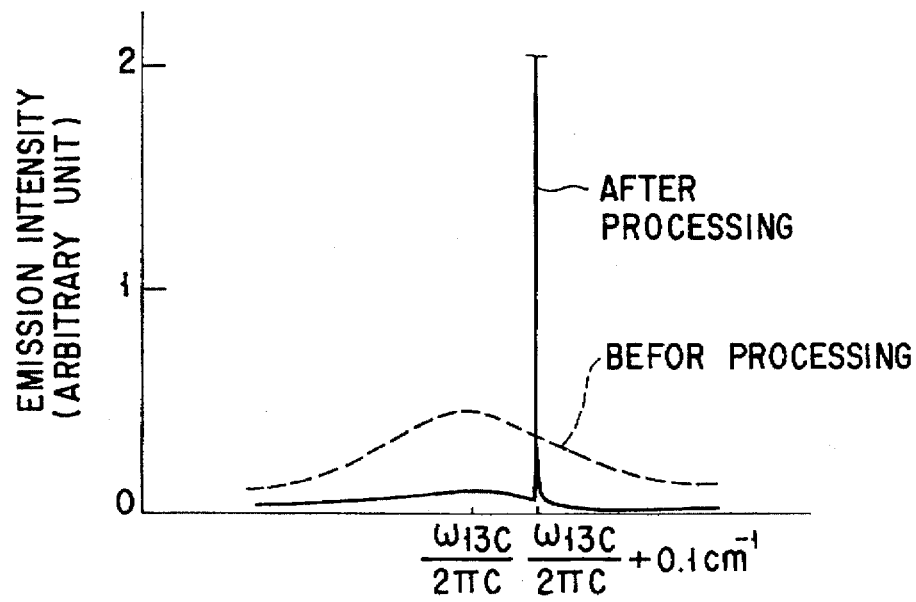
F I G. 38

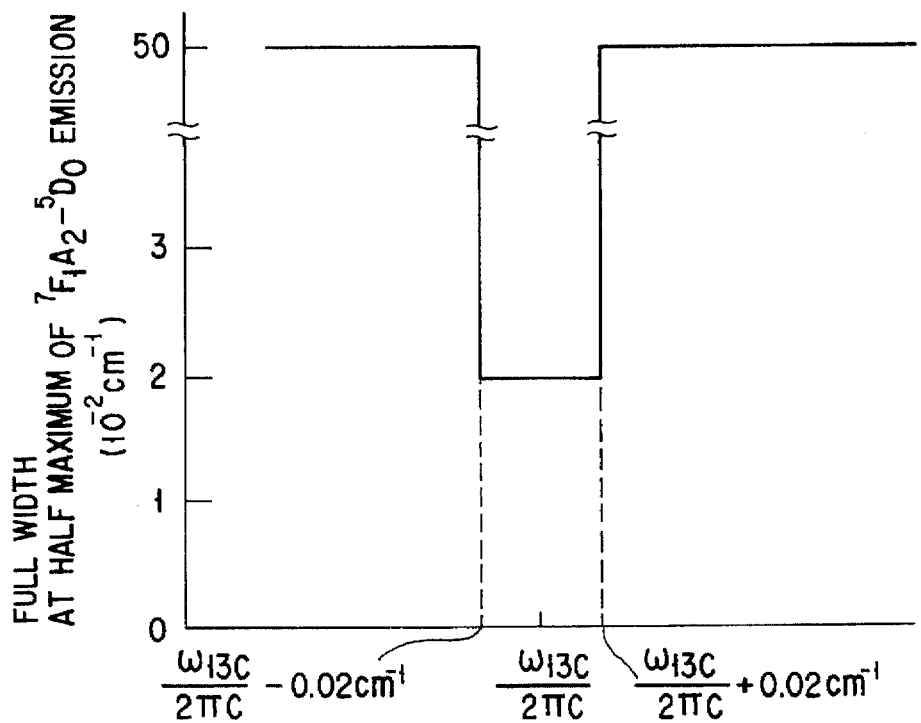
F I G. 41
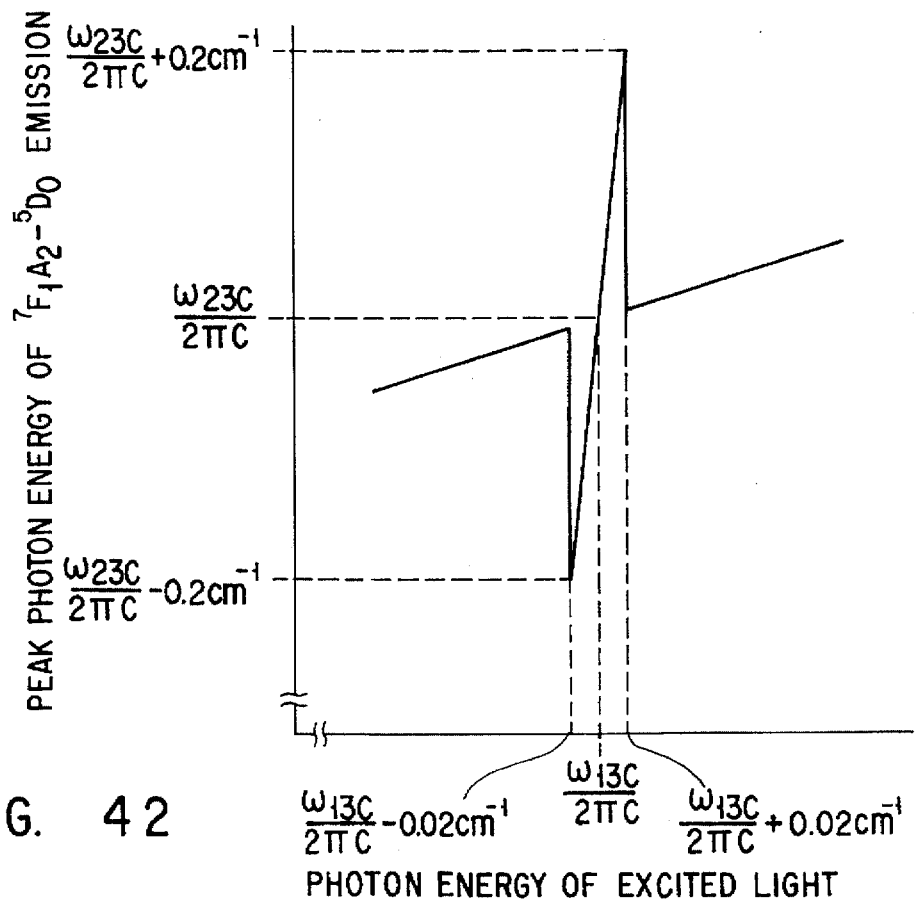
F I G. 42

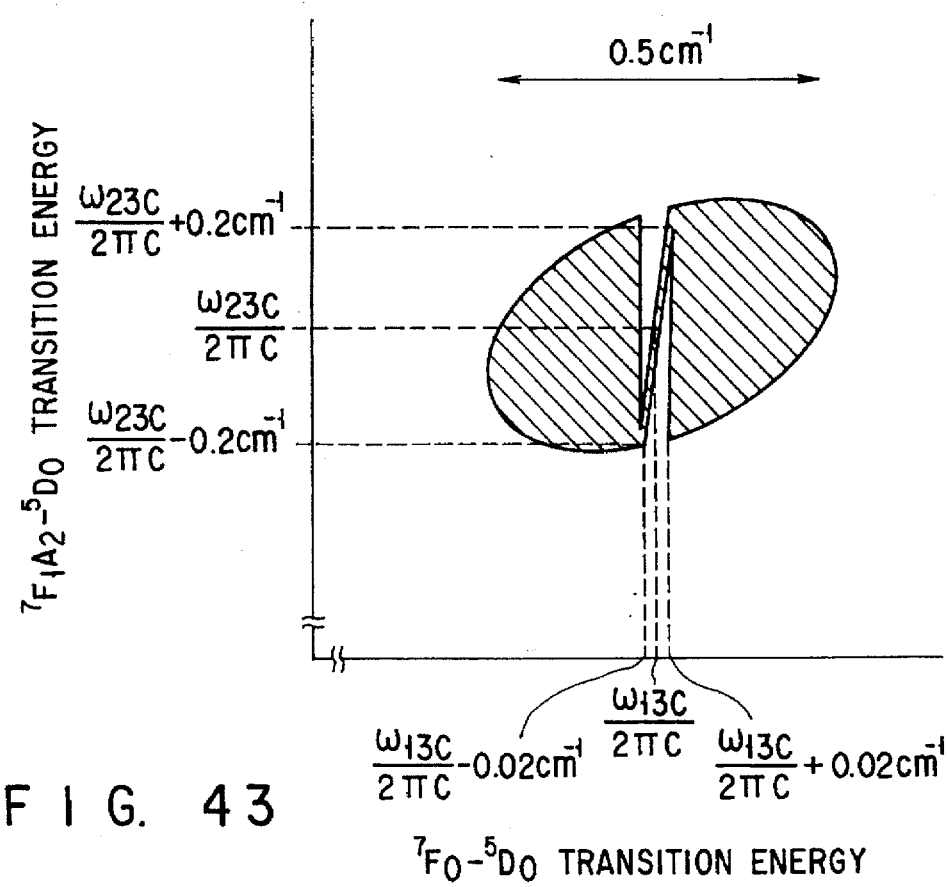
F I G. 43
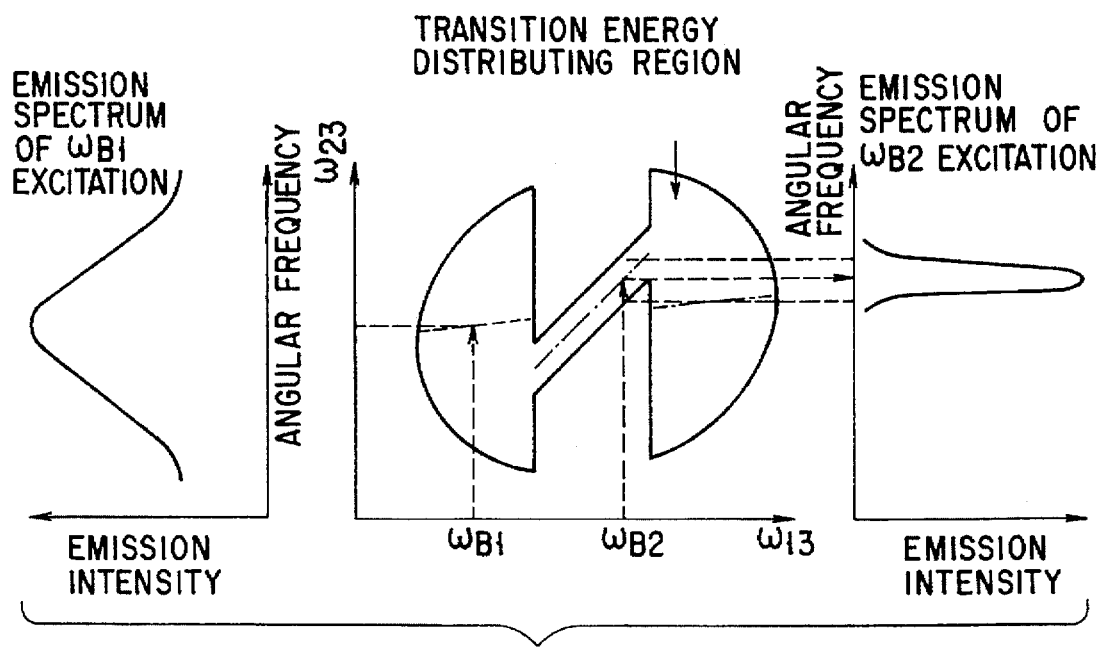
F I G. 44

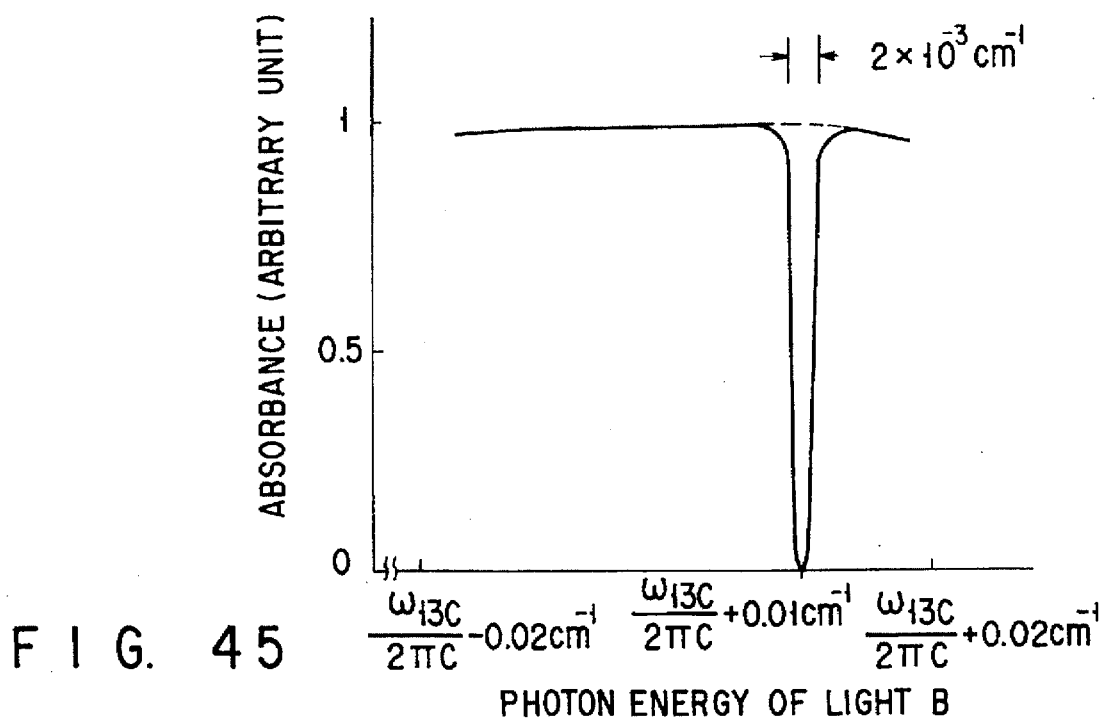
F I G. 45
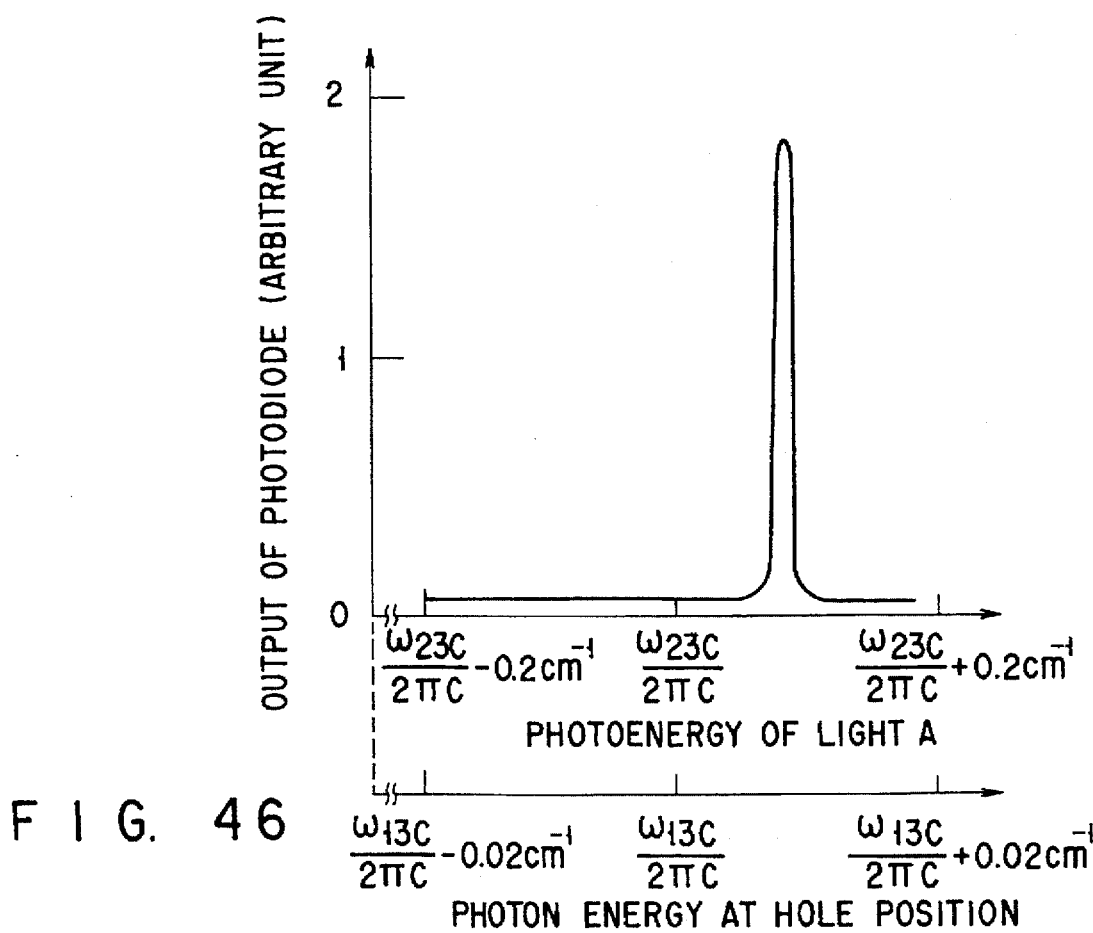
F I G. 46

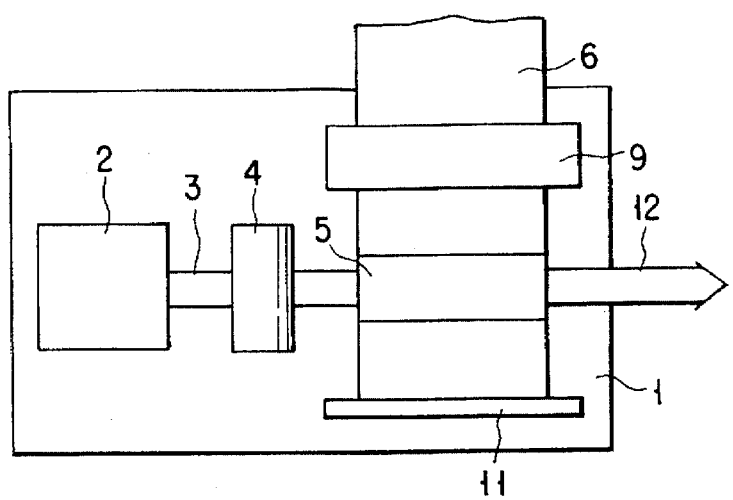
FIG. 47A
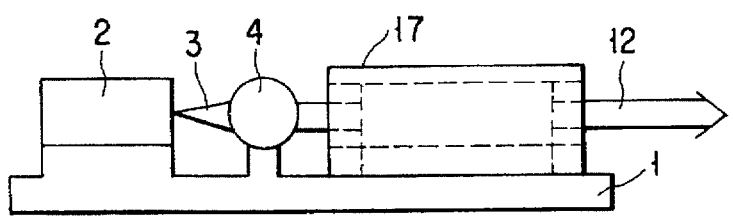
FIG. 47B
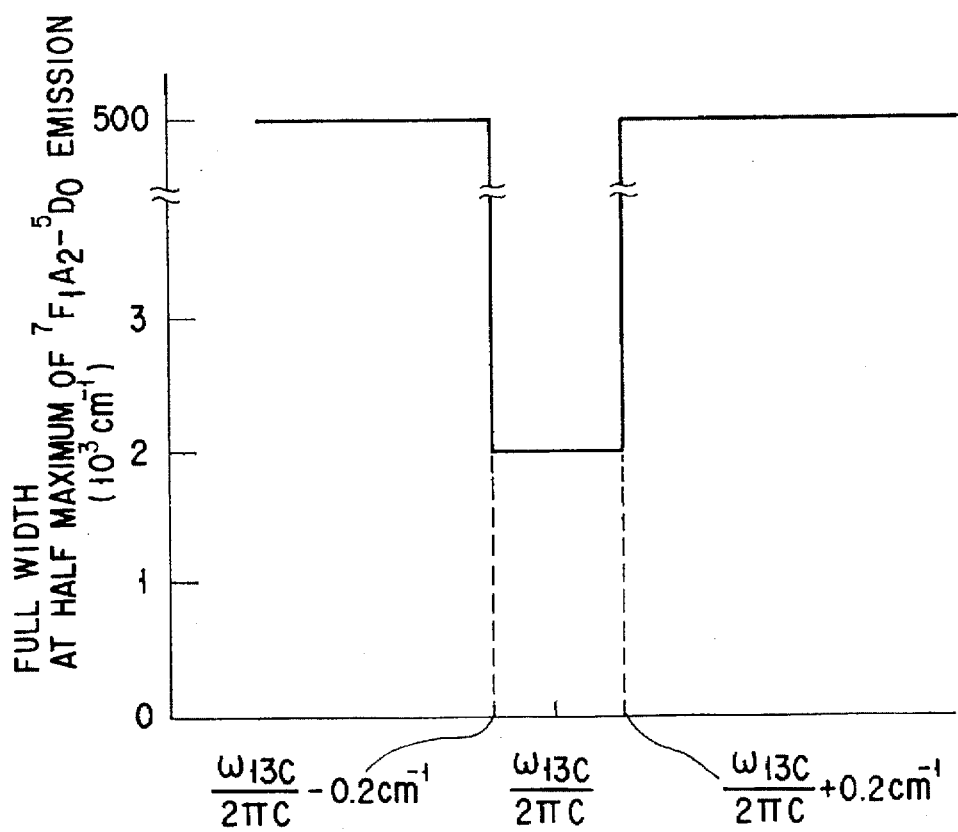
FIG. 48  PHOTON ENERGY OF EXCITED LIGHT

SOLID-STATE MATERIAL, METHOD OF MANUFACTURING THE SOLID-STATE MATERIAL, FREQUENCY-CONVERTING ELEMENT, AND FREQUENCY-MEASURING INSTRUMENT INCORPORATING THE ELEMENT, AND FREQUENCY MODULATOR/AMPLIFIER INCORPORATING THE ELEMENT

BACKGROUND OF THE INVENTION

1. Field of the Invention

The present invention relates to a solid-state material in which transition angular frequency is distributed in a particular manner and to a method of manufacturing the solid-state material. The invention also relates to a frequency-converting element, a frequency-measuring instrument incorporating the element, and a frequency modulator/amplifier incorporating the element.

2. Description of the Related Art

A new physical phenomenon observed in a gas system is reported in H. R. Gray et al., Optics Lett. 3(6), 218 (1978). This phenomenon called "population trapping" takes place in a three-level system which is undergoing two-photon resonance. In this phenomenon, the gas atom or molecules are not excited to increase in density at a higher energy level, despite the presence of light resonating between the ground state and excited state. The population trapping can be applied to laser oscillation which is accompanied by no population inversion, as is proposed in S. E. Harris, Phys. Rev. Lett. 62(9), 1033 (1989).

In order to achieve this new physical phenomenon in a solid-state material and to apply the phenomenon to an optical element, two requirements must be fulfilled. First, the solid-state material must be one which has at least three energy levels, i.e., the lowest level |1>, the intermediate level |2> and the highest level |3>. Second, the distribution of transition angular frequency among the energy levels at each site in the solid-state material must satisfy a certain condition.

To narrow the angular frequency width in which the absorbance is changed owing to population trapping and to increase the rate of the absorbance change, the following conditions need to be fulfilled.

Assume that energy transition is allowed between the levels |2> and |3> and also between the levels |1> and |3>. The levels |1>, |2> and |3> have a width each, because a crystal field behaves in the solid-state material in accordance with quantum statistical mechanics. Therefore, the transition angular frequency $\omega_{23}$ corresponding to the transition between the levels |2> and |3> has an inhomogeneous width, and so does the transition angular frequency $\omega_{13}$ corresponding to the transition between the levels |1> and |3>.

To narrow the above-mentioned angular frequency width and to increase the rate of the absorbance change, it is therefore required that the transition angular frequency be distributed along a straight line $\omega_{13}=a\cdot\omega_{23}+b$ (a and b are constants) in the $\omega_{13}-\omega_{23}$ plane (i.e., a two-dimensional plane) defined by the transition angular frequencies $\omega_{13}$ and $\omega_{23}$ (i.e., two coordinate axes), and that is distributed as little as possible along a line perpendicular to that straight line.

The inhomogeneous widths of the two energy transitions, one between the levels |2> and |3> and the other between the levels |1> and |3>, define a two-dimensional distribution of transition angular frequency. It is required that this two-dimensional distribution have a desired form. However, no technique has been hitherto known which can effectively process a two-dimensional distribution of transition angular frequency, thereby to fulfill this requirement.

A one-dimensional distribution of transition angular frequency which is defined by a inhomogeneous width of transition angular frequency corresponding to the transition between two energy levels may be processed by means of a method called known as "hole burning." In the hole burning, a monochromatic light beam is applied to a solid-state material. The light beam is narrower than the inhomogeneous width of transition angular frequency corresponding to the transition among the energy levels. The beam excites only the light-absorbing sites (e.g., impurity atoms or ions) or light-absorbing molecules, which exist in a particular crystal field. The crystal field surrounding the cites thus excited changes. This change or means for exciting the light-absorbing sites or the light-absorbing molecules to another energy level at which the spectrum changes. Only the contribution of the sites having transition energy corresponding to the photon energy of the monochromatic light beam applied to the material is thereby removed from the distribution of transition angular frequency, even after the application of the monochromatic light beam.

When the ordinary hole burning is employed, the width of transition angular frequency can be indeed narrowed. Nonetheless, if solid-state material is processed, thus narrowing the transition angular frequency width, an optical element made of the material thus processed and utilizing light absorption or changes in light absorption occurring in the material will have a reduced number of light-absorbing centers such as atoms, ions or molecules. As a consequence, the signal the optical element generates has but a small magnitude.

In a spectroscopic element, for example, the transition angular frequency must be distributed along a straight line defined by: $\omega_{13}-\omega_{23}$=constant. To impart good spectroscopic characteristics the element it is necessary to narrow the width of transition angular frequency along a line perpendicular to the straight line. However, the width cannot be as narrow as or narrower than the homogeneous width of transition angular frequency. It is therefore difficult to provide a spectroscopic element which exhibits good spectroscopic characteristics. Furthermore, the method using hole burning to process a two-dimensional distribution of transition angular frequency is disadvantageous in terms of not only the resolution achieved but also the process time required.

In the case of a gas system, the atoms have different transition energies because they move at different velocities. As a result, the width of transition angular frequency is inhomogeneous in the gas system. The inhomogeneous width of transition angular frequency, generally known as "Doppler width," can be eliminated by a method called "Doppler-free method." In the Doppler-free method, first and second light beams having angular frequencies $\omega_A$ and $\omega_B$ are applied to a mass of gas in the same direction. The difference between the angular frequencies $\omega_A$ and $\omega_B$ ($\omega_A-\omega_B$) is equal to the angular frequency $\omega_{12}$ which corresponds to the transition energy between the first and second levels of an atom not moving. In other words, the first light beam and the second light beam meet the requirement for two-photon resonance of $\Lambda$ type.

Gas atoms can thereby have angular frequencies which deviate from the resonance frequency for the first and second light beams by almost the same value, regardless of their velocities. Hence, any gas atom fulfills the requirement for two-photon resonance of Λ type. Namely, the transition angular frequency of the gas is distributed in the $\omega_{12}-\omega_{23}$ plane, along a line perpendicular to the straight line defined by: $\omega_{13}-\omega_{23}$=constant.

Gas can be applied a vacuum in the form of a supersonic stream, thereby decreasing the momentum of each gas atom which in a direction perpendicular to the supersonic stream and, ultimately, reducing the Doppler width extending in that direction. Also is it possible to change the kinetic energy to almost nil by means of laser cooling, thus narrowing the range of kinetic-energy distribution and, hence, decreasing the inhomogeneous width of transition angular frequency.

However, no technological means has ever been devised which can effectively distribute the transition angular frequency along a straight line defined by: $\omega_{13}-\omega_{23}$=constant and can also narrow the inhomogeneous distribution width of transition angular frequency, as much as possible along a line perpendicular to that straight line. As indicated above, a one-dimensional distribution of transition angular frequency defined by a inhomogeneous width of transition angular frequency which corresponds to the transition between two energy levels may be processed by means of hole burning. This method is disadvantageous, however, as described above.

The hole burning method cannot effectively perform distribution processing if the transition between the first level and the second level is a forbidden transition. In a solid-state system, an energy transition which must involve a narrow inhomogeneous width of transition angular frequency in order to cause population trapping effectively in a three-level system is a forbidden one in most cases. Thus, the method which uses the ordinary hole burning does not serve the purpose of causing population trapping.

Hitherto, frequency-converting elements of various types have been invented, among these elements are elements which convert the frequencies of light. Five popular types of these elements are as follows.

A frequency-converting element of the first type is based on multi-photon absorption and converts excited light (incident light) to blue-shifted light (output light).

A frequency-converting element of the second type is based on the fact that the initial absorption state differs from the final emission state. It converts excited light (incident light) to either red-shifted light or blue-shifted light.

A frequency-converting element of the third type multiplies the incident light by means of nonlinear medium (or, by virtue of nonlinear optical effect), and outputs the light thus multiplied.

A frequency-converting element of the fourth type generates by means of nonlinear medium (or, by virtue of nonlinear optical effect) light which has a frequency corresponding to the difference between the frequency of the incident light and that of other light.

A frequency-converting element of the fifth type is based on Raman scattering in which the scattered light undergoes red shift or blue shift.

These five types of frequency-converting elements have the following problems, however.

In the elements of the first and second types, light beams that can be used as incident light have discrete frequencies, each determined by only the quantum level applied or by only the order of multi-photon absorption performed. The light beams these elements output have discrete frequencies, like the incident light beams. The elements of the first and second types are not practical because they cannot use, as incident light, beams which have frequencies continuous over a particular range.

The element of the third type cannot amplify, as desired, only the frequency-modulated component of the incident light. Rather, it multiplies a combination of the modulated component and an offset component. The offset component needs to be removed by applying other light in order to amplify the modulated component only. More specifically, the frequency difference between the incident light and the other light must be obtained after obtaining the multiplication wave, by using the high-order nonlinear optical effect of a nonlinear medium. Thus, the element cannot convert the frequency of the incident light unless it has complicated structure. The element of the third type can output but a very weak light, since it utilizes high-order nonlinear optical effect. Further, its amplification factor is limited to integral multiples. The amplification factor is 5 at most as long as the element is made of the material usually selected for an element designed to multiply visible incident light. In brief, the element of the third type cannot attain a large amplification factor.

The elements of the fourth and fifth types are designed only to displace the frequency of the incident light. They cannot amplify the frequency-modulated component of the incident light.

SUMMARY OF THE INVENTION

An object of the present invention is to provide a solid-state material in which transition angular frequency is so distributed that new phenomenon such as population trapping takes place, and to provide a method of manufacturing the solid-state material.

Another object of the invention is to provide a frequency-converting element based on a novel principle, a frequency-measuring instrument incorporating the frequency-converting element, and a frequency modulator/amplifier incorporating the frequency-converting element. To be more specific, the invention aims at providing a frequency-converting element which operates on the basis of novel principle to set a frequency of a signal precisely at a desired value, more particularly a frequency-converting element which can amplify the frequency-modulated component of an input signal, and also at providing a frequency modulator/amplifier which incorporates this frequency-converting element and which can therefore amplify only the frequency-modulated component of an input signal.

According to a first aspect of this invention, there is provided a method of manufacturing a solid-state material, comprising a first step of preparing a starting material having an energy-level structure with at least first, second and third energy levels, each having a specific level width, the first energy level is the lowest of the three levels, one of the second and third energy levels changing the energy-level structure when light having a predetermined wavelength is applied to the material, and the energy-level structure remaining so changed even after the application of the light; and a second step of irradiating the starting material with a first coherent light beam resonating with transition between the first and third energy levels and a second coherent light beam resonating with transition between the second and third energy levels in a case that the third level is a level which changes the energy level structure, thereby changing a distribution of angular frequency in a plane one axis of which is a first transition angular frequency corresponding to the transition between the first and third energy levels and the other axis of which is a second transition angular frequency corresponding to the transition between the second and third energy levels, thereby to form a solid-state material having new distribution of transition angular frequency, wherein the second step includes a step of setting a spectral width of the second light beam, Rabi characteristic angular frequency for transition of the first light beam and Rabi characteristic angular frequency for transition of the second light beam within one of two inhomogeneous widths for the first and second transition angular frequencies which is broader than the other.

According to a first aspect of this invention, there is provided anther method of manufacturing a solid-state material, comprising a first step of preparing a starting material having an energy-level structure with at least first, second, third and fourth energy levels, each having a specific level width, the first energy level is the lowest of the four levels, the fourth energy levels changing the energy-level structure when light having a predetermined wavelength is applied to the material, and the energy-level structure remaining so changed even after the application of the light; and a second step of irradiating the starting material with a first coherent light beam resonating with transition between the first and third energy levels, a second coherent light beam resonating with transition between the second and third energy levels and a third light beam for directly or indirectly exciting the third energy level to the fourth energy level, thereby changing a distribution of angular frequency in a plane one axis of which is a first transition angular frequency corresponding to the transition between the first and third energy levels and the other axis of which is a second transition angular frequency corresponding to the transition between the second and third energy levels, thereby to form a solid-state material having new distribution of transition angular frequency, wherein the second step includes a step of setting a spectral width of the second light beam, Rabi characteristic angular frequency for transition of the first light beam and Rabi characteristic angular frequency for transition of the second light beam within one of two inhomogeneous widths for the first and second transition angular frequencies which is broader than the other.

With above method, the second step further comprises a step of changing the angular frequency of at least one of the first and second light beams, while applying the first and second light beams to the starting material, either continuously or intermittently. At least one of the first and second light beams includes a plurality of light beams each having different angular frequency.

According to the first aspect of the invention, there is provided a solid-state material having an energy-level structure with at least first, second and third energy levels, each having a specific level width, the first energy level is the lowest of the three levels, wherein a distribution of angular frequency in a plane one axis of which is a first transition angular frequency corresponding to the transition between the first and third energy levels and the other axis of which is a second transition angular frequency corresponding to the transition between the second and third energy levels has a part processed and removed, and a boundary between the removed part and remaining part of the distribution of angular frequency is in part not perpendicular to the axis of the first transition angular frequency.

According to the first aspect of this invention, there is provided another solid-state material having an energy-level structure with at least first, second and third energy levels, each having a specific level width, the first energy level is the lowest of the three levels, wherein a distribution of angular frequency in a plane one axis of which is a first transition angular frequency corresponding to the transition between the first and third energy levels and the other axis of which is a second transition angular frequency corresponding to the transition between the second and third energy levels has a part processed and removed, and the remaining part of the distribution of angular frequency has a band-shaped part which extends not perpendicular to the axis of the first transition angular frequency.

Preferable embodiments of the solid-state material according to the first aspect are as follows:

(1) The third energy level is higher than the second energy level, and the remaining part of the distribution of angular frequency is shaped such that the distribution keeps constant value extends along a predetermined straight line whose difference between the first and second transition angular frequencies (2) The third energy level is lower than the second energy level, and the remaining part of the distribution of angular frequency is shaped such that the distribution keeps constant value extends along a predetermined straight line whose sum of the first and second transition angular frequencies.

The method of manufacturing a solid-state material, according to the first aspect, is characterized in two respects. First, the starting material is a solid-state material which has its energy-level structure changed when applied with light. Second, the two-dimensional distribution of transition angular frequency is processed at high resolution, by using light which causes population trapping in a three-level system which is undergoing two-photon resonance three energy levels.

The solid-state material and the method of manufacturing the same, both according to the first aspect of the present invention, will be described below in detail.

In the following description, the atoms, ions, molecules or the like, which undergo energy transition because of light absorption in the solid-state material, will be referred to as "absorption centers." The first energy level, i.e., the lowest level, will be referred to as "level |1>," and the remaining two energy levels will be referred to as "level |2>" and "level |3>," respectively. The energy level |3> is higher than the energy level |2>. Further, the angular frequency corresponding to the transition between the levels |1> and |2>, occurring at the i-th site in the solid-state material (e.g., an absorption center such as an impurity atom, ion or the like, or an entity, e.g., a molecule, which changes the energy-level structure of the material) will be referred to as "angular frequency $\omega_{12}(i)$." Similarly, the angular frequency corresponding to the transition between the levels |1> and |3> and the angular frequency corresponding to the transition between the levels |2> and |3>, both transitions occurring at the i-th site, will be referred to as "angular frequency $|_{13}(i)$" and "angular frequency $\omega_{23}(i)$", respectively.

A model of the solid-state material according to the first aspect will be described first. In this model, three levels |1>, |2> and |3> have no distribution, and the angular frequencies $\omega_{12}(i)$, $\omega_{13}(i)$ and $\omega_{23}(i)$ have no inhomogeneous widths.

Assume that a coherent light beam A (second beam) resonating with the transition between the levels |2> and |3> and a coherent light beam B (first beam) resonating with the transition between the levels |1> and |3> are applied to the i-th site. Further assume that both light beams A and B are completely monochromatic and have angular frequencies $\omega_A$ and $\omega_B$, respectively. If the difference between the angular frequency $\omega_{23}(i)$ the angular frequency $\omega_A$, i.e., $\omega_{23}(i)-\omega_A$, is equal to the difference between the angular frequency $\omega_B$ the angular frequency $\omega_{13}(i)$, i.e., $\omega_B-\omega_{13}(i)$, the i-th site will be excited from the level |1> and will immediately transit to a linear combination of states, |->$_i$, which is expressed as follows:

$$|->_i=(\Omega_A(i)|1>-\Omega_B(i)|2>)/(\Omega_A(i)^2+\Omega_B(i)^2)^{1/2}$$

where $\Omega_A(i)$ is Rabi characteristic angular frequency of transition for the i-th site, caused by the light beam A, and $\Omega_B(i)$ is Rabi characteristic angular frequency of transition for the i-th site, caused by the light beam B.

The i-th site will not be excited any more. Thus, the i-th site would not be excited to the level |3> despite the light beam B is applied to it. In other words, population trapping occurs in the solid-state material. The angular frequencies $\omega_A$ and $\omega_B$ of the light beams A and B which cause the population trapping, have a range. The range of angular frequency $\omega_A$ and $\omega_B$ are determined by $\Omega_A(i)$ and $\Omega_B(i)$. Population trapping occurs at the i-th site irradiated with the light beam A fixed at the angular frequency $\omega_A$ when the angular frequency $\omega_B$ falls within the following range:

$$\omega_{13}(i)-\omega_{23}(i)+\omega_A-(\Omega_A(i)^2+\Omega_B(i)^2)^{1/2}/2$$

$$<\omega_B<$$

$$\omega_{13}(i)-\omega_{23}(i)+\omega_A+(\Omega_A(i)^2+\Omega_B(i)^2)^{1/2}/2 \quad (1)$$

The absorption spectrum detected with the light beam B while the light beam A is being applied has a transparent region. As shown in FIG. 1, the transparent region is located at the angular frequency $\omega_B(=\omega_{13}(i)-\omega_{23}(i))$ and has a width of about $(\Omega_A(1)^2+\Omega_B(i)^2)^{1/2}$.

In the solid-state material according to the first aspect, the angular frequencies have inhomogeneous widths, unlike in the model described above. The material exhibits a specific distribution of transition angular frequency in the $\omega_{13}-\omega_{23}$ plane, as is illustrated in FIG. 2. FIG. 2 shows only a region in which the distribution density is equal to or greater than half (½) the maximum value.

When coherent light beams A and B are applied to the solid-state material exhibiting this distribution of transition angular frequency, population trapping occurs in a region extending along a straight line which is defined as:

$$\omega_{23}=\omega_{13}-\omega_B+\omega_A \quad (2)$$

This region extends along line (2) and has a width of $(\omega_A^2+\omega_B^2)^{1/2}/2^{1/2}$, on the assumption that the i-dependency of $\Omega_A(i)$ and that of $\Omega_B(i)$ are not so great, that $\Omega_A(i)=\Omega_A$ (constant) and $\Omega_B(i)=\Omega_B$ (constant), and that the light beams A and B have no width at all.

When the widths of the light beams A and B are taken into account, the region in which population trapping takes place expand by about $(\Delta\omega_A+\Delta\omega_B)/2^{1/2}$. In other words, population trapping occurs in a band-shaped region which satisfies the following conditions:

$$\omega_{13}-\omega_B+\omega_A-\Delta\omega_A/2-\Delta\omega_B/2-(\Omega_A^2+\Omega_B^2)^{1/2}/2$$

$$<\omega_{23}<$$

$$\omega_{13}-\omega_B+\omega_A+\Delta\omega_A/2+\Delta\omega_B/2+(\Omega_A^2+\Omega_B^2)^{1/2}/2 \quad (3)$$

Of the sites resonating with the light beam B, those which undergo no population trapping are excited from the energy level |1>. Hence, any site that satisfies the following conditions (4) and (5) is repeatedly excited to the energy level |3> while it is being irradiated with the light beams A and B:

$$\omega_{23}<\omega_A-\Delta\omega_A/2-(\Omega_A^2+\Omega_B^2)^{1/2}/2$$

or $$\omega_A+\Delta\omega_A/2+(\Omega_A^2+\Omega_B^2)^{1/2}/2<\omega_{23} \quad (4)$$

and, $$\omega_B-\Delta\omega_B/2<\omega_{13}<\omega_B+\Delta\omega_B/2 \quad (5)$$

If energy transition occurs with a certain probability, altering the energy-level structure of the material after the site has been excited to the level |3>, only the sites which satisfy both conditions (4) and (5) will undergo efficient spectral changes. Energy is distributed in the solid-state material in the $\omega_{13}-\omega_{23}$ plane, as is illustrated in FIG. 2. As seen from FIG. 2, resonance holes (non-distributed regions are formed) is absorbed in the region which satisfies both conditions (4) and (5). The two-dimensional distribution of transition angular frequency can thereby be processed to an accuracy equal to or less than the homogeneous width of any angular frequency involved.

No energy transition may occur to alter the energy-level structure of the material from energy the level |3> after the site has been excited to the level |3>. Even so, holes can be formed in the region which satisfies both conditions (4) and (5) by applying to a light beam C which excites the site from the level |3> or from a level |3'> lower than the level |3>, to an energy level at which the energy-level structure of the material is altered.

Instead of light having a specific angular frequency, light beams A1, A2, . . . and An having different angular frequencies $\omega_{A1}$, $\omega_{A2}$, . . . and $\omega_{A3}$ may be applied to the solid-state material, as light which is to resonate with the transition between the levels |2> and |3>. If this is the case, the distribution of transition angular frequency will remain in only those regions which satisfy the following condition, whereas holes are formed in any other regions:

$$\omega_{A1}-\Delta\omega_{A1}/2-(\Omega_{A1}^2+\Omega_B^2)^{1/2}/2$$

$$<\omega_{23}<$$

$$\omega_{A1}+\Delta\omega_{A1}/2+(\Omega_{A1}^2+\Omega_B^2)^{1/2}/2,$$

or $$\omega_{A2}-\Delta\omega_{A2}/2-(\Omega_{A2}^2+\Omega_B^2)^{1/2}/2$$

$$<\omega_{23}<$$

$$\omega_{A2}+\Delta\omega_{A2}/2+(\Omega_{A2}^2+\Omega_B^2)^{1/2}/2,$$

or

. . . , or $$\omega_{An}-\Delta\omega_{An}/2-(\Omega_{An}^2+\Omega_B^2)^{1/2}/2$$

$$<\omega_{23}<$$

$$\omega_{An}+\Delta\omega_{An}/2+(\Omega_{An}^2+\Omega_B^2)^{1/2}/2 \quad (6)$$

where $\Delta_{A1}$, $\Delta_{A2}$, . . . and $\Delta_{An}$ are the spectrum widths of the light beams A1, A2, . . . and An, and $\Omega_{A1}$, $\Omega_{A2}$, . . . and $\Omega_{An}$ are Rabi characteristic angular frequencies of transitions caused by the light beams A1, A2, . . . and An.

In the case where the light beam A has three angular frequencies, the holes are formed as is illustrated in FIG. 3. Since the holes are formed in this manner, a two-dimensional distribution of transition angular frequency can be processed in a plurality of discrete regions in the $\omega_{13}-\omega_{23}$ plane.

Let us assume that the energy-level structure of the solid-state material does not change from the level |3> despite the light beams applied to a specific site. In this case, a light beam C is applied to the site, together with the light beams A and B, thereby exciting the site to the energy level at which the energy-level structure is should be changed. The angular frequencies of the light beams A and B are swept, while satisfying the following condition:

$$\omega_B - \omega_A = \text{constant} \qquad (7)$$

Then, only the distribution of transition angular frequency for the slanting band-shaped region will remain as is illustrated in FIG. 4. This band-shaped region satisfies the conditions described as:

$$\omega_{13} - \omega_B + \omega_A - \Delta\omega_A/2 + \Delta\omega_B/2 - (\Omega_A^2 + \Omega_B^2)^{1/2}/2$$

$$< \omega_{23} <$$

$$\omega_{13} - \omega_B + \omega_A + \Delta\omega_A/2 - \Delta\omega_B/2 - (\Omega_A^2 + \Omega_B^2)^{1/2}/2 \qquad (8)$$

The band-shaped region has a width which is expressed as:

$$\{\Delta\omega_A - \Delta\omega_B + (\Omega_A^2 + \Omega_B^2)^{1/2}\}/2^{1/2} \qquad (9)$$

It should be noted that the transition angular frequency corresponding to the transition between the levels |2> and |3> has an inhomogeneous width $\Delta\omega_{23inhomo}$, and the transition angular frequency corresponding to the transition between the levels |1> and |3> has an inhomogeneous width $\Delta\omega_{13inhomo}$. If the above-mentioned band-shaped region has a width which is equal to or less than the inhomogeneous width $\Delta\omega_{23inhomo}$ or the inhomogeneous width $\Delta\omega_{13inhomo}$, or both, the distribution of transition angular frequency can be processed to maintain a part of the energy-level distribution in the $\omega_{13}-\omega_{23}$ plane.

Therefore, the above-mentioned conditions are satisfied in the present invention by setting the width $\omega_A$ of the light beam A, the Rabi characteristic angular frequency $\Omega_A$ of transition caused by the light beam A, and the Rabi characteristic angular frequency $\Omega_B$ of transition caused by the light beam A, each at a value which is equal to or less than the broader of the inhomogeneous widths $\Delta\omega_{23inhomo}$ and $\Delta\omega_{13inhomo}$.

FIG. 5 shows the distribution of transition angular frequency which is obtained when the light beam A has three different angular frequencies and these angular frequencies are swept under the condition of: $\omega_B - \omega A = (\text{constant})$. The light beam A may be intermittently applied and the three angular frequencies may be swept under the same condition. In this case, there will be obtained the distribution of transition angular frequency illustrated in FIG. 6.

The width of distribution represented by the equation (9) may be set at a value less than the homogeneous width $\Delta\omega_{23homo}$ of the transition angular frequency corresponding to the transition between the levels |2> and |3> and also less than the homogeneous width $\Delta\omega_{13homo}$ of the transition angular frequency corresponding to the transition between the levels |1> and |3>, thereby satisfying the following condition:

$$\{\Delta\omega_A - \Delta\omega_B + (\Omega_A^2 + \Omega_B^2)^{1/2}\}/2^{1/2} < \Delta\omega_{23homo}, \Delta\omega_{13homo} \qquad (10)$$

Then, the width of the band-shaped distribution of transition angular frequency, which extends along the straight line defined by $\omega_{23} = \omega_{13} - \omega_B + \omega_A$ can be rendered equal to or less than the homogeneous width of transition angular frequency.

In this case, it is not necessary to sweep the angular frequencies $\omega_A$ and $\omega_B$ two-dimesionally in the region of holes so as to maintain the distribution of transition frequency in a band-shaped region extending along the straight line. It suffices to sweep the straight line, while satisfying the condition of the equation (7). The two-dimensional distribution of transition angular frequency can therefore be processed within a short time.

The light beam B may be intermittently applied, instead of the light beam A. Alternatively, both light beams A and B may be intermittently applied. In either case, the angular frequency $\omega$Aor the angular frequency $\omega_B$, or both are swept.

The solid-state material according to the first aspect of the invention is not limited to the one described above, in which the energy level |3> is higher than the energy level |2>. Rather, the first aspect of the present invention encompasses solid-state material in which the energy level |3> is lower than the energy level |2>. The above description can apply to this material, provided symbols "$\omega_{23}$" and "$\omega_A$" are changed to "$-\omega_{23}$" and "$-\omega_A$," respectively. According to a second aspect of the present invention, there is provided a method of manufacturing a solid-state material, comprising a first step of preparing a starting material having an energy-level structure with at least first, second and third energy levels, the second energy level being higher than the first energy level and lower than the third energy level, wherein a part is excited to the third energy level and a field near the part changes, whereby the part acquires a different energy level in a distribution of angular frequency in a plane one axis of which is a first transition angular frequency corresponding to the transition between the first and third energy levels and the other axis of which is a second transition angular frequency corresponding to the transition between the second and third energy levels, and a reciprocal of transverse relaxation time for transition between the first and second energy levels is less than an inhomogeneous width of a transition angular frequency corresponding to the transition between the first and second energy levels; and a second step of irradiating the starting material with a train of light pulses having a pulse width which is less than a reciprocal of a transition angular frequency corresponding to transition between the first and second energy levels, and having a center angular frequency which is an angular frequency resonating with transition between the first and third energy levels and simultaneously with transition between the second and third energy levels.

In this method it is desirable to satisfy the condition of: $\omega_{12C} - \Delta\omega_{12}/2 < 2\pi N\nu < \omega_{12C} + \Delta\omega_{12}/2$. Here, $\omega_{12C}$ is the center transition angular frequency corresponding to the transition between the first and second energy levels which are distributed not homogeneously, $\Delta\omega_{12}$ is the inhomogeneous width of the angular frequency corresponding to this transition, $\nu$ is the repetition frequency of pulsed light, and N is a natural number.

According to a second aspect of the invention, there is provided another method of manufacturing a solid-state material, comprising a first step of preparing a starting material having an energy-level structure with at least first, second, third and fourth energy levels, the second energy level being higher than the first energy level and lower than the third energy level, and the fourth energy level being different from the first, second and third energy levels, wherein a part is excited from the third energy level directly or indirectly to the fourth energy level and a field near the part changes, whereby the part acquires a different energy level in a distribution of angular frequency in a plane one axis of which is a first transition angular frequency corresponding to the transition between the first and third energy levels and the other axis of which is a second transition angular frequency corresponding to the transition between the second and third energy levels, and a reciprocal of transverse relaxation time for transition between the first and second energy levels is less than an inhomogeneous width of a transition angular frequency corresponding to the transition between the first and second energy levels; and a second step of irradiating the starting material with excited light causing a transition from the third energy level directly or indirectly to the fourth energy level and with a train of light pulses having a pulse width which is less than a reciprocal of a transition angular frequency corresponding to transition between the first and second energy levels, and having a center angular frequency which is an angular frequency resonating with transition between the first and third energy levels and simultaneously with transition between the second and third energy levels.

According to a second aspect of this invention, there is provided still another method of manufacturing a solid-state material, comprising a first step of preparing a starting material containing ions capable of assuming a first valence and a second valence grater than the first valence, and having an energy-level structure wherein ions of the first valence have at least first, second and third energy levels, the second energy level being higher than the first energy level and lower than the third energy level, ions of the first valence are excited to the third energy level, thereby emitting electrons and assuming the second valence, ions of the second valence receives the electrons, thereby assuming the first valence, and a reciprocal of transverse relaxation time for transition between the first and second energy levels is less than an inhomogeneous width of a transition angular frequency corresponding to the transition between the first and second energy levels; and a second step of irradiating the starting material with a train of light pulses having a pulse width which is less than a reciprocal of a transition angular frequency corresponding to transition between the first and second energy levels, and having a center angular frequency which is an angular frequency resonating with transition between the first and third energy levels and simultaneously with transition between the second and third energy levels.

According to a second aspect of this invention, there is provided a further method of manufacturing a solid-state material, comprising a first step of preparing a starting material containing ions capable of assuming a first valence and a second valence grater than the first valence, and having an energy-level structure wherein ions of the first valence have at least first, second, third and fourth energy levels, the second energy level being higher than the first energy level and lower than the third energy level and the fourth energy level being different from the first, second and third energy levels, ions of the first valence are excited from the third energy levels directly or indirectly to the fourth energy level, thereby emitting electrons and assuming the second valence, ions of the second valence receives the electrons, thereby assuming the first valence, and a reciprocal of transverse relaxation time for transition between the first and second energy levels is less than an inhomogeneous width of a transition angular frequency corresponding to the transition between the first and second energy levels; and a second step of irradiating the starting material with excited light causing a transition from the third energy level directly or indirectly to the fourth energy level and with a train of light pulses having a pulse width which is less than a reciprocal of a transition angular frequency corresponding to transition between the first and second energy levels, and having a center angular frequency which is an angular frequency resonating with transition between the first and third energy levels and simultaneously with transition between the second and third energy levels.

It is desirable that solid-state material of a specific type be manufactured by the methods according to the second aspect of the present invention. This material is characterized in that: (i) the absorption centers near a certain transition angular frequency are distributed more densely than in the starting material; and (ii) the absorption centers in a region of other transition angular frequencies are distributed less densely than in the starting material.

In any method according to the second aspect, atoms, ions or molecules which have transition energy of a specific value and which can transit between two energy levels are subjected population trapping, whereas the other atoms, ions or molecules are excited. In the starting material used, the atoms, ions or molecules exited influence an adjacent local field (e.g., a crystal field) and acquire new transition energy falling within an inhomogeneous distribution range when they undergo relaxation and return to their initial quantum state.

Atoms, ions or molecules which do not have a specific transition energy to cause population trapping are repeatedly excited until they acquire the specific transition energy. Hence, the starting material changes to solid-state material in which the transition angular frequency is distributed in a specific limited region.

The solid-state material and the method of manufacturing the same, both according to the second aspect of the present invention, will be described below in detail.

In the following description, the first energy level (i.e., the lowest level) will be referred to as "level |1>," the second energy level (i.e., the intermediate level), and the third level (i.e., the highest level) will be referred to as "level |2>" and "level |3>," respectively, as in the description of the first aspect of the invention. Further, as in the description of the first aspect, the angular frequency corresponding to the transition between the levels |1> and |2>, the angular frequency corresponding to the transition between the levels |1> and |3>, and the angular frequency corresponding to the transition between the levels |2> and |3> will be referred to as "angular frequency $\omega_{12}(i)$," "angular frequency $\omega_{13}(i)$" and "angular frequency $\omega_{23}(i)$," respectively.

Let us pay attention to the i-th absorption center only. This absorption center is irradiated with light pulses which have a width $\tau_p$ and a center angular frequency $\omega_{PC}$. The width $\tau_p$ and the center angular frequency $\omega_{PC}$ satisfy the following conditions:

$$\tau_p \leq 1/\omega_{12}(i) \quad (11)$$

$$\omega_{13}(i) - 1/(2\tau_p) < \omega_{pc} < \omega_{23}(i) + 1/(2\tau_p) \quad (12)$$

FIG. 7 illustrates the relationship between the spectrum of a light pulse satisfying the condition (12) and the energy level of an absorption center. The i-th absorption center will assume a state called "coherent trapping" if the repetition frequency $\nu$ of the light pulse satisfies the following resonance condition:

$$2\pi N\nu = \omega_{12}(i) \quad (13)$$

where N is a natural number. The probability for the i-th absorption center to be excited to the level |3> is lower than in the case where the i-th absorption center is not undergoing coherent trapping. As a result, population trapping takes place, whereby the energy level of the i-th absorption center transits to either the level |1> or the level |12>.

The resonance width, i.e., the range of transition angular frequency in which the population trapping can occur, has the following relationship with the repetition frequency $v$ of the light pulse:

$$2\pi Nv - 1/\tau_2 - (\frac{1}{2})(4\pi^2\mu^2|E_A|^2/\hbar^2)T_2$$

$$<\omega_{21}(i)<$$

$$2\pi Nv + 1/\tau_2 + (\frac{1}{2})(4\pi^2\mu^2|E_A|^2/\hbar^2)T_2 \qquad (14)$$

where $|E_A|^2$ is the square means of electric-field intensity of the light pulse, $T_2$ is the transverse relaxation time between the levels $|3\rangle$ and $|1\rangle$ and between the levels $|3\rangle$ and $|2\rangle$, $\mu$ is the momentum of the transition dipole between the levels $|3\rangle$ and $|1\rangle$ and between the levels $|3\rangle$ and $|2\rangle$, and $\tau_2$ is the transverse relaxation time between the levels $|2\rangle$ and $|1\rangle$.

$|E_A|^2$ is defined as follows:

$$|E_A|^2 = \int_0^T |E(t)|^2 dt \cdot v(T=\tau_p) \qquad (15)$$

where $E(t)$ is the electric field. For simplicity, it is assumed here that the transverse relaxation time between the levels $|3\rangle$ and $|1\rangle$ is equal to the transverse relaxation time between the levels $|3\rangle$ and $|2\rangle$ and that the transition dipole moment between the levels $|3\rangle$ and $|1\rangle$ is equal to the transition dipole moment between the levels $|3\rangle$ and $|2\rangle$.

As seen from the relationship (14), the greater the Rabi characteristic angular frequency $\mu|EA|/\hbar$ defined by the mean electric-field intensity $|E_A|$ of the light pulse, and the shorter the transverse relaxation time $\tau_2$ between the lower two levels, the broader the resonance width.

A model of the solid-state material according to the second aspect will be described. This model has a plurality of absorption centers and an inhomogeneous width of transition angular frequency because of the statistically distributed transition energies of the absorption centers. In the model, the transition angular frequencies of the absorption centers are distributed, as shown in FIG. 8, in the $\omega_{13}-\omega_{23}$ plane whose coordinate axes are transition angular frequencies $\omega_{13}$ and $\omega_{23}$. Shown in FIG. 8 is only the region where the distribution density is equal to or greater than half ($\frac{1}{2}$) the maximum value. In FIG. 8, $\omega_{12C}$ is the center transition angular frequency corresponding to the transition between the levels $|1\rangle$ and $|2\rangle$ which are distributed not homogeneously, $\omega_{13C}$ is the center transition angular frequency corresponding to the transition between the levels $|1\rangle$ and $|3\rangle$ which are distributed not homogeneously, and $\omega_{23C}$ is the center transition angular frequency corresponding to the transition between the levels $|2\rangle$ and $|3\rangle$ which are distributed not homogeneously.

When a train of light pulses satisfying the relations (11) and (12) is applied to a solid-state material exhibiting this specific distribution of transition angular frequency, population trapping occurs in a region extending along a straight line which is defined as:

$$\omega_{23}=\omega_{13}-2\pi Nv \qquad (16)$$

where $N$ is a natural number. This region has a width, which is expressed as:

$$2^{1/2}/\tau_2 + 2^{-1/2}(4\pi^2\mu^2|E_A|^2/\hbar^2)T_2 \qquad (17)$$

The region is a band-shaped one which satisfies the following conditions:

$$\omega_{13}-2\pi Nv-1/\tau_2-(\frac{1}{2})(4\pi^2\mu^2|E_A|^2/\hbar^2)T_2$$

$$<\omega_{23}<$$

$$\omega_{13}-2\pi Nv+1/\tau_2+(\frac{1}{2})(4\pi^2\mu^2|E_A|^2/\hbar^2)T_2 \qquad (18)$$

FIG. 9 represents this region in which population trapping takes place and in which only one natural number $N_1$ exists, satisfying the following condition of: $\omega_{12C}-\Delta\omega_{12inhomo}<2\pi N v<\omega_{12C}+\Delta\omega_{12inhomo}$, where $\Delta\omega_{12inhomo}$ is the inhomogeneous width of transition energy between the level $|1\rangle$ and the level $|2\rangle$.

The region where no population trapping occurs is expressed as follows:

$$\omega_{13}-2\pi Nv+1/\tau_2+(\frac{1}{2})(4\pi^2\mu^2|E_A|^2/\hbar^2)T_2<\omega_{23}$$

or, $$\omega_{23}<\omega_{13}-2\pi Nv-1/\tau_2-(\frac{1}{2})(4\pi^2\mu^2|E_A|^2/\hbar^2)T_2 \qquad (19)$$

An absorption center in this region is excited to the level $|3\rangle$ with a higher probability than any absorption center present in the region which is expressed by the relation (18) and in which population trapping occurs. The local field (e.g., a crystal field) adjacent to the absorption center which has just been excited to the level $|3\rangle$ therefore changes. Hence, the transition energy changes within the inhomogeneous width of transition angular frequency. The absorption center will acquire, with certain probability, the transition energy of any region that undergoes population trapping.

The probability that a point representing the transition angular frequency of the absorption center once excited to the level $|3\rangle$ appears is considered almost equal for the region in which population trapping occurs and any region adjacent to this region, in terms of the unit area of the $\omega_{13}-\omega_{23}$ plane. Therefore, if light pulses are continuously applied to the solid-state material, the transition energy will move in the $\omega_{13}-\omega_{23}$ plane until it reaches a region where population trapping is to take place. As a result, the transition energy will eventually be concentrated in the region where population trapping is to occur.

The local field (e.g., a crystal field) adjacent to the absorption center changes because the absorption center may be excited to the level $|4\rangle$, changing the transition energy changes within the inhomogeneous width of transition angular frequency. In this case, too, the transition energy will be concentrated, as long as light for directly or indirectly exciting the absorption center from the level $|3\rangle$ to the level $|4\rangle$ is applied to the solid-state material, together with the train of light pulses.

While applying the train of light pulses to the solid-state material, an electric field, a magnetic field or a stress, two of these items, or all these items may be applied to the material. This measure taken, the local region can be changed with high efficiency, as the absorption center is excited to either the level $|3\rangle$ or the level $|4\rangle$. For instance, if an electric field is applied to the material, the height of the potential barrier can be reduced, promoting the changing of the local field, provided that potential energies exist whose minimum values are located at ions or atoms and that the local field changes from one minimum value to another minimum value.

If $1/\tau_p$ and $\omega_{PC}$ for a light pulse satisfy the following condition with respect to $\omega_{13C}$ and $\Delta\omega_{13inhomo}$ of the solid-state material, the transition energy concentrated in the region in which population trapping is to occur will act on all absorption centers.

$$\omega_{pc}-1/(2\tau_p)<\omega_{13c}-\Delta\omega_{13inhomo}/2,$$

and $$\omega_{13c}+\Delta\omega_{13inhomo}/2<\omega_{pc}+1/(2\tau_p) \qquad (20)$$

This is diagrammatically explained in FIG. 10. Even if $1/\tau_p$ and $\omega_{PC}$ do not satisfy the condition (20), the transition energy concentrated in that region will act on at least those absorption centers which satisfy the following condition (21), provided that a region which satisfies the condition (21) exists.

$$\omega_{13c} - \Delta\omega_{13inhomo}/2 < \omega_{13} < \omega_{13\ c} + \Delta\omega_{13inhomo}/2, \text{ and}$$

$$\omega_{pc} - 1/(2\tau_p) < \omega_{13} < \omega_{pc} + 1/(2\tau_p) \quad (21)$$

Thus, the transition angular frequencies can be distributed, concentratedly in the region represented by the relations (18), without changing the total number of absorption centers existing in the inhomogeneous width of transition angular frequency, from the value known before the absorption centers are excited. No part of the energy-level distribution needs to be removed at all, unlike in the method employing hole burning is to process a two-dimensional distribution of transition angular frequency. Therefore, an element made of the solid-state material according to the second aspect can generates signals having a sufficient magnitude.

The width of the region in which transition angular frequencies are concentrated is expressed by the relation (17). The transition angular frequencies can be distributed, densely in a narrow region by adjusting the intensity of the light applied to the material, if the transverse relaxation time $\tau_2$ is sufficiently long and if the intensity $|E_A|^2$ of the light applied is properly adjusted. That is, if $1/\tau_2$ is less than the angular frequency corresponding to the inhomogeneous width of the energy transition between the levels |1> and |2>, the transition angular frequencies can be concentrated in a region which is narrower than the initial inhomogeneous width. Moreover, if $1/\tau_2$ is much less than the homogeneous width of the energy transition between the levels |1> and |3> and the homogeneous width of energy transition between the levels |2> and |3>, the transition angular frequencies can be concentrated in a region which is narrower than either homogeneous width.

Another solid-state material according to the second aspect of the invention will be described, in which the absorption centers are m-valance ions $M^m$ and n-valence ions $M^n$, where n=m+1. When the ions $M^m$ are excited, they change to ions $M^n$, emitting electrons.

Each ion $M^m$ can take three energy levels |1>, |2> and |3>. The levels |1>, |2> and |3> are the lowest, the intermediate and the highest, respectively, as in the solid-state materials described above. The levels |1> and |3> are connected by allowed transition. So are the levels |2> and |3>. $\omega_{12C}$ indicates the center value for the transition energy between the levels |1> and |2>, $\omega_{13C}$ the center value for the transition energy between the levels |1> and |3>, and $\omega_{23C}$ the center value for the transition energy between the levels |2> and |3>.

When a train of light pulses satisfying the relations (11) and (12) is applied to a solid-state material exhibiting this specific distribution of transition angular frequency, population trapping occurs in a region extending along a straight line which is defined as:

$$\omega_{23} = \omega_{13} - 2\pi N v \quad (22)$$

where N is a natural number. This region has a width, which is expressed as:

$$2^{1/2}/\tau_2 + 2 \cdot 2^{-1/2}(4\pi^2\mu^2|E_A|^2/\hbar^2)T_2 \quad (23)$$

The region is a band-shaped one which satisfies the following conditions:

$$\omega_{13} - 2\pi N v - 1/\tau_2 - (1/2)(4\pi^2\mu^2|E_A|^2/\hbar^2)T_2$$

$$< \omega_{23} <$$

$$\omega_{13} - 2\pi N v + 1/\tau_2 + (1/2)(4\pi^2\mu^2|E_A|^2/\hbar^2)T_2 \quad (24)$$

The region where no population trapping occurs is expressed as follows:

$$\omega_{13} - 2\pi(N-1)v + 1/\tau_2 + (1/2)(4\pi^2\mu^2|E_A|^2/\hbar^2)T_2$$

$$< \omega_{23} <$$

$$\omega_{13} - 2\pi N v - 1/\tau_2 - (1/2)(4\pi^2\mu^2|E_A|^2/\hbar^2)T_2 \quad (25)$$

An absorption center in this region is excited to the level {3> with a higher probability than any absorption center present in the region which is expressed by the relation (24) and in which population trapping occurs. The m-valence ions $M^m$ are excited to the level |3> and change to n-valence ions $M^n$, emitting electrons, as illustrated by the following formula:

$$M_A^m \rightarrow M_A^n + e^- \quad (26)$$

Generally, the emitted electrons move in the solid-state material and captured by other n-valence ions $M_B$n. The ions $M_B^n$ therefore have their valence reduced to m, as illustrated by the following formula:

$$M_B^n + e^- \rightarrow M_B^m \quad (27)$$

In the formulas (26) and (27), subscripts A and B indicate the positions the ions take.

The formulas (26) and (27) show that the ions at position A have moved to position B. Generally, ions of the same valence which are located at different positions have different transition energies. Hence, any ion excited to the level |3> can be regarded as having transition energy different from the transition energy it had before excitation—within the inhomogeneous width of energy transition.

How ions behave in the $\omega_{13}$–$\omega_{23}$ plane will be discussed.

In the $\omega_{13}$–$\omega_{23}$ plane, m-valence ions $M^m$ present in the band-shaped region defined by the relations (24) are excited with low probability once population trapping occurs in this region. By contrast, the m-valence ions $M^m$ present in any other regions are repeatedly excited to the level |3> and move in the $\omega_{13}$–$\omega_{23}$ plane, within the inhomogeneous width of energy transition. If the m-valence ions $M^m$ thus moving enter the population trapping region, they can no longer escape from this region. As a result, the transition energy is concentratedly distributed in the population trapping region defined by the relations (24).

Thus, the transition energy is concentrated by utilizing the exchange between ions $M^m$ and ions $M^n$. The ratio x of the density of ions $M^n$ to that of ions $M^m$, all ions dispersed the solid-state material, is given as follows:

$$[M^n]/[M^m] = x \quad (28)$$

In this mechanism of concentrating the transition energy, the upper limit $\{Mm\}_{max1}$ of the density of the ions $M^m$ per unit area of the $\omega_{13}$–$\omega_{23}$ plane depends on the ratio x of the equation (28), as shown in the following equation:

$$\{M^m\}_{max1} = (1+x)\{M^m\} \quad (29)$$

where $\{M^m\}$ is the density of the ions $M^m$ per unit area, which is observed before the transition energy is concentrated. The ratio of the ion density $\{M^m\}_{pt}$ in the energy-concentrated region to the ion density $\{M^m\}_{npt}$ in any other region is expressed as:

$$M^m\}_p/\{M^m\}_{np} > x+1 \tag{30}$$

FIGS. 11A and 11B schematically illustrate how the transition energy is concentrated sufficiently in a relatively small region.

The mechanism, in which the transition energy is concentrated by utilizing the exchange between ions $M^m$ and ions $M^n$, shall be referred to as "mechanism 1". Transition energy is considered to be actually concentrated also in another mechanism Which is different the mechanism 1 . After the ions $M_A^m$ at position A acquire valance n in the process of the formula (26), the ions $M_A^n$ take the electrons emitted from the other ions to become m-valence ions $M_A^m$, as indicated by the following formula:

$$M_A^n + e^- \to M_A^m \tag{31}$$

If the ions have exactly the same transition energy as they had before becoming n-valence ions, only the mechanism 1 works. In this case, the upper limit $\{M^m\}_{max1}$ of the density of the ions $M^m$ is given by the equation (29).

However, the upper limit $\{M^m\}_{max1}$ is no longer be defined by the equation (29) if the ions acquire transition energy different from the value they had before becoming n-valence ions again, within the inhomogeneous range of energy transition. It follows that the transition energy can be sufficiently concentrated even if the density of the ions $M^n$ is low. This transition-energy concentration mechanism which uses the changes in the transition energy of the same ion in the $\omega_{13}$–$\omega_{23}$ plane will be called "mechanism 2."

The ions dispersed in the actual solid-state material move with respect to the adjacent atoms to have their valence changed. As a result of this, the field near the ions changes locally. The ions may therefore remain, within the inhomogeneous width, at the energy level different from the level they were at before they were excited—even after they regain the original valence and return to the initial quantum state. Therefore, it is considered that both the mechanism 1 and the mechanism 2 cause the transition energy to concentrate when a train of light pulses is applied to a solid-state material.

The ions $M^m$ may change in their valence, changing the transition energy, when they are excited to the level |4>. If this is the case, the transition energy will be concentrated in the same way, provided that light which directly or indirectly excites the ions from the level |3> to the level |4> is applied to the solid-state material, together with the train of light pulses.

Exactly for the same reason as mentioned above, the field can be more efficiently changed as the ions are excited to the level |3> or to the level |4>, by applying an electric field, a magnetic field or a stress, two of these items, or all these items to the solid-state material, along with the train of light pulses. In other words, it is possible to promote the function of the mechanism 2.

According to a third aspect of this invention, there is provided a frequency-converting element comprising: a solid-state material having an energy-level structure with at least first, second and third energy levels, each having a specific level width, the first energy level is the lowest of the three levels, and having a band-shaped distribution of angular frequency in a plane one axis of which is a first transition angular frequency corresponding to the transition between the first and third energy levels and the other axis of which is a second transition angular frequency corresponding to the transition between the second and third energy levels, the band-shaped distribution extending along a straight line defined by: $\omega_{23} = a\omega_{13} + b$, $|a| > 1$ here a and b are constants, $\omega_{13}$ is the first transition angular frequency, and $\omega_{23}$ is the second transition angular frequency.

According to a second aspect of this invention, there is provided another frequency-converting element comprising: a solid-state material having an energy-level structure with at least first, second and third energy levels, each having a specific level width, the first energy level is the lowest of the three levels, and having a band-shaped distribution of angular frequency in a plane one axis of which is a first transition angular frequency corresponding to the transition between the first and third energy levels and the other axis of which is a second transition angular frequency corresponding to the transition between the second and third energy levels, the band-shaped distribution extending along a straight line defined by: $\omega_{23} = a\omega_{13} + b$, $|a| > 1$ here a and b are constants, $\omega_{13}$ is the first transition angular frequency, and $\omega_{23}$ is the second transition angular frequency.

According to a third aspect of this invention, there is provided a frequency-measuring instrument comprising: a frequency-converting element of a type defined in claim 21, for converting incident light resonating with transition between the second and third energy levels and generating output light resonating with transition between the first and third energy levels; means for irradiating solid-state material in the frequency-converting element, with coherent light which resonates with the transition between the second and third energy levels; and means for detecting light resulting from transition between the first and third energy levels and passing through the solid-state material.

According to a third aspect of this invention, there is provided a frequency modulator/amplifier comprising: a frequency-converting element of a type defined in claim 24, for converting incident light resonating with transition between the second and third energy levels and generating output light resonating with transition between the first and third energy levels; and means for irradiating solid-state material in the frequency-converting element, with coherent light which has a frequency width corresponding to a frequency-modulation width of the incident light and which resonates with the transition between the first and third energy levels.

Both the a frequency-converting element and the frequency-measuring instrument according to the present invention are made of solid-state material which exhibits a specific distribution of transition angular frequency. The element and the instrument can select light of any desired angular frequency falling within a continuous range and can use this light as incident light. In addition, they can amplify the frequency-modulated component of the incident light.

The third aspect of the present invention will be described below in detail.

In the description that follows, the first energy level, or the lowest level), will be referred to as "level |1>," and the second energy level and the third level be referred to as "level |2>" and "level |3>," respectively, as in the description of the first aspect of the invention. Further, as in the description of the first aspect, The level |3> is higher than the level |2>. Further, as in the description of the first aspect, the angular frequency corresponding to the transition between the levels |1> and |2>, the angular frequency corresponding to the transition between the levels |1> and |3>, and the angular frequency corresponding to the transition between the levels |2> and |3>, each at the i-th site in the solid-material (e.g., an absorption center such as an impurity atom or ion, or a molecule), will be referred to as "angular frequency $\omega_{12}(i)$," "angular frequency $\omega_{13}(i)$" and "angular frequency $\omega_{23}(i)$," respectively.

The absorption spectrum detected with a light beam B applied to the material, while a light beam A is being applied has a transparent region. As shown in FIG. 1, the transparent region is located at the angular frequency $\omega_B(=\omega_{13}(i)-\omega_{23}(i)+\omega_A)$ and has a width of about $(\Omega_A(1)^2+\Omega_B(i)^2)^{1/2}$.

Assume the solid-state material according to the third aspect of the invention has an inhomogeneous width of transition angular frequency. Present in this material is a group of absorption centers such as impurity atoms or ions, or a group of molecules. The transition angular frequencies of these atoms, ions or molecules are distributed along a straight line in the $\omega_{13}$–$\omega_{23}$ plane, which is defined by:

$$\omega_{23}=a\cdot\omega_{13}+b \quad (32)$$

where a and b are constants.

FIG. 12 represents the distribution of transition angular frequency observed when the constant a is given as follows:

$$|a|>1 \quad (33)$$

That is, the slope of the straight line is greater than 1 in the $\omega_{13}$–$\omega_{23}$ plane. FIG. 12 shows only a region in which the distribution density is equal to or greater than half (½) the maximum value.

When coherent light beams A and B are applied to the solid-state material exhibiting this distribution of transition angular frequency, population trapping occurs in a region extending along a straight line which is defined as:

$$\omega_{23}=\omega_{13}-\omega_B+\omega_A \quad (34)$$

Here, it is assumed that the i-dependency of $\Omega_A(i)$ and that of $\Omega_B(i)$ are not so great and that $\Omega_A(i)=\Omega_A$ and $\Omega_B(i)=\Omega_B$. It is also assumed that the light beams A and B have small widths $\Delta\omega_A$ and $\Delta\omega_A$. That is, $$\Delta\omega_A<<\Omega_A$$

$$\Delta\omega_B<<\Omega_B \quad (35)$$

Then, population trapping occurs in the region which extends along the straight line defined by the equation (34) and which has a width $\Delta\omega_{pt}$ of $(\Omega_A^2+\Omega_B^2)^{1/2}/2^{1/2}$. That is, population trapping takes place as shown in FIG. 13, in a band-shaped region which satisfies the following condition:

$$\omega_{13}-\omega_B+\omega_A-(\Omega_A^2+\Omega_B^2)^{1/2}/2$$

$$<\omega_{23}<$$

$$\omega_{13}-\omega_B+\omega_A+(\Omega_A^2+\Omega_B^2)^{1/2}/2 \quad (36)$$

The absorption centers or the molecules in this band-shaped region contribute nothing to the absorption of light having angular frequency $\omega_B$. If $\omega_A$ is fixed and $\omega_B$ is swept, the absorption of the light remarkably decreases when two conditions are satisfied. The first condition is that any absorption center or any molecule resonating with the light beam B should undergo population trapping when $_A$ and $_B$ satisfy the following:

$$\omega_A=a\cdot\omega_B+b \quad (37)$$

The second condition is that the light absorption achieved by homogeneous width of absorption centers or molecules which do no undergo population trapping does not involve the angular frequency $\omega_B$ of the light beam B.

The condition for satisfying these two conditions is as follows:

$$\Delta\omega_{13homo}<\{2^{1/2}\Delta\omega_{pt}-(a^2+1)^{1/2}\Delta\omega_d\}/(a-1) \quad (38)$$

where $\Delta\omega_{13homo}$ is the homogeneous width of the transition angular frequency corresponding to the transition between the levels |1> and |3> and $\Delta\omega_d$ is the length of the minor axis of the distribution of transition energy.

FIG. 14 illustrates the case which satisfies the condition of the relation (38). The region in which the absorption of the light remarkably decreases has a width which is given as:

$$(2^{1/2}\Delta\omega_{pt}+(a^2+1)^{1/2}\Delta\omega_d+(a-1)\Delta\omega_{13homo})/a \quad (39)$$

On the other hand, the region in which no light is absorbed has a width defined by:

$$(2^{1/2}\Delta\omega_{pt}-(a^2+1)^{1/2}\Delta\omega_d-(a-1)\Delta\omega_{13homo})/a \quad (40)$$

The width $\Delta\omega_d$ and the homogeneous width $\Delta\omega_{13homo}$ of the transition angular frequency corresponding to the transition between the levels |1> and |3> are much less than the population trapping width $\Delta\omega_{pt}$—that is:

$$\Delta\omega_{pt}>>\{(a^2+1)/2\}^{1/2}\Delta\omega_d,$$

$$\Delta\omega_{pt}>>\{(a-1)/2^{1/2}\}\Delta\omega_{13homo} \quad (41)$$

If so, the light absorption quickly decreases to zero as is illustrated in FIG. 15. The region where no light absorption occurs has a width which is given as:

$$(2^{1/2}/a)\Delta\omega_{pt} \quad (42)$$

Thus, a transparent region located at the angular frequency $\omega_B=(1/a)\omega_A-b/a$ and having a width $(2^{1/2}/a)\Delta\omega_{pt}(=1/a)(\Omega_A^2+\Omega_B^2)^{1/2}$ can be provided in the absorption spectrum in accordance with the angular frequency $\omega_A$ of the light beam. In other words, a region can be provided, where holes are formed. The width of this transparent region can be reduced sufficiently by adjusting the intensities of the light beams A and B.

Assuming that the light beam A is controlled by an angular-frequency error $\delta\omega$, the relative positional error of the transparent region is given $\delta\omega/a$. Therefore, the angular-frequency error for the case where $|a|>1$ can be decreased, enhancing the resolution for processing the two-dimensional distribution of transition angular frequency. This makes it possible to set a desired frequency with high accuracy.

Hence, the angular frequency of the light corresponding to the light beam B can be measured with an error of only 1/a of the relative error of the light used to sweep the angular frequency $\omega_B$ of the beam B, by sweeping the light beam A, changing the angular frequency for the transparent region, and detecting the light passing through the transparent region. Thus, a frequency-measuring instrument having high resolution can be provided.

Assume that $$|a|<1 \quad (43)$$

that is, the slope of the straight line along which the transition angular frequencies of the atoms, ions or molecules are distributed is less than 1 in the $\omega_{13}$–$\omega_{23}$ plane. In this case, the transition angular frequency is distributed as shown in FIG. 16. FIG. 16 shows only a region in which the distribution density is equal to or greater than half (½) the maximum value.

When coherent light beams A and B are applied to the solid-state material exhibiting this distribution of transition angular frequency, population trapping occurs in a region extending along a straight line defined by thee equation (34), as can be understood from FIG. 17. In this case, too, the absorption of the light remarkably decreases if any absorption center or any molecule resonating with the light beam B undergoes population trapping when $_A$ and $_B$ satisfy the condition of the equation (37) and if the light absorption achieved by homogeneous distribution of absorption centers or molecules undergoing no population trapping does not involve the angular frequency $\omega_B$ of the light beam B.

The condition for satisfying these two conditions is as follows:

$$\Delta\omega_{13homo} < \{2^{1/2}\Delta\omega_{pf} - (a^2+1)^{1/2}\Delta\omega_d\}/(1-a) \quad (44)$$

FIG. 18 explain the case where the condition of relation (44) is satisfied. In this case, the width of the region where the light absorption decreases is given as:

$$(2^{1/2}\Delta\omega_{pf} + (a^2+1)^{1/2}\Delta\omega_d - (a-1)\Delta\omega_{13homo})/a \quad (45)$$

The region where no light absorption occurs has a width which is given as:

$$(2^{1/2}\Delta\omega_{pf} - (a^2+1)^{1/2}\Delta\omega_d + (a-1)\Delta\omega_{13homo})/a \quad (46)$$

The width $\Delta\omega_d$ and the homogeneous width $\Delta\omega_{13homo}$ of the transition angular frequency corresponding to the transition between the levels |1> and |3> are much less than the population trapping width $\Delta\omega_{pf}$—that is:

$$\Delta\omega_{pf} \gg \{(a^2+1)/2\}^{1/2}\Delta\omega_d$$

$$\Delta\omega_{pf} \gg \{(1-a)/2^{1/2}\}\Delta\omega_{13homo} \quad (47)$$

If so, the light absorption quickly decreases to zero. The region where no light absorption occurs has a width defined by:

$$(2^{1/2}/a)\Delta\omega_{pf} \quad (48)$$

Thus, a transparent region located at the angular frequency $\omega_B = (1/a)\omega_A - b/a$ and having a width $(2^{1/2}/a)\Delta\omega_{pf} (=1/a)(\Omega_A{}^2 + \Omega_B{}^2)^{1/2}$ can be provided in the absorption spectrum in accordance with the angular frequency $\omega_A$ of the light beam. In other words, a region can be provided, where holes are formed. The width of this transparent region can be reduced sufficiently by adjusting the intensities of the light beams A and B.

If the light beam A is controlled by an angular-frequency error $\delta\omega_A$, the angular frequency of the transparent region will change to $(1/a) \times \delta\omega_A$. Therefore, the change in the angular frequency has been increased since |1/a|>1.

In other words, the solid-state material having the energy distribution shown in FIG. 16 may be irradiated with light corresponding to the light beam B and light having a frequency width which corresponds to the change in the angular frequency of the light beam A, more precisely light having an angular-frequency component whose frequency falls within the range of $(1/a)(\omega_{ac} - \delta\omega_A) + b/a < \omega_B < (1/a)(\omega_{ac} + \delta\omega_B) + b/a$. If so, and if the light corresponding to the light beam A has its frequency modulated to a value falling within the range of $\omega_{ac} - \delta\omega_B < \omega_A < \omega_{ac} + \delta\omega_A$, the solid-state material will emit light (i.e., output light) as shown in FIG. 19, obtained by amplifying the frequency-modulated component of the incident light by 1/a times. Thus, the material according to the third aspect of the invention can be used to provide a frequency modulator/amplifier.

As described above, the operating principle of the frequency-converting element according to the present invention resides in the use of solid-state material. In the material, the absorption centers such as impurity atoms or ions or molecules have their energy levels distributed such that the angular frequency $\omega_{13}$ is the function of the angular frequency $\omega_{23}$, that is, $\omega_{13} = f(\omega_{23})$, in the $\omega_{13} - \omega_{23}$ plane. The hole transport region is formed in a region by population trapping, whereby the frequency of the incident light, which corresponds to the angular frequency $\omega_{23}$ is converted to the angular frequency $\omega_{13}(=f(\omega_{23}))$.

The descriptions above are based on the assumption that the level |3> is higher than the level |2>. Even if the level |3> is lower than the level |2>, the descriptions hold true, provided $\omega_{23}$ and $\omega_A$ are changed to $-\omega_{23}$ and $-\omega_A$, respectively.

As has been indicated, according to the first aspect of the present invention, solid-state material exhibiting a novel distribution of transition angular frequency can be provided since it is possible to process a two-dimensional distribution of transition angular frequency, defined by two energy transitions connecting three energy levels.

Further, according to the second aspect of the invention, it is possible to provide solid-state material which exhibits a distribution of transition angular frequency, desirable to induce new physical phenomenon such as popular trapping observed in a gas system.

Moreover, according to the third aspect of the present invention, solid-state material which exhibits a particular distribution of transition angular frequency and which can convert light-range frequencies is used, providing a frequency-converting element which can set a output-light frequency with high accuracy and a frequency-converting element which can amplify the frequency-modulated component of the incident light with a large amplification factor. These frequency-converting elements may be used to provide a frequency-measuring instrument having high resolution and a frequency modulator/amplifier having a high amplification factor.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a diagram illustrating still another distribution of transition angular frequency, obtained by the present invention;

FIG. 6 is a diagram showing a further distribution of transition angular frequency, obtained by this invention;

FIG. 10 is a graph depicting the relationship between the distribution of transition angular frequency, observed in a solid-state material according to the invention, and the spectrum of a light pulse applied to this material;

FIG. 12 is a diagram representing the distribution of transition angular frequency, along a straight line defined by $\omega_{23}=a\omega_{13}+b$, where $|a|>1$;

FIG. 13 is a diagram showing a region in which population trapping occurs when light beams having angular frequencies $\omega_A$ and $\omega_B$ are applied to a solid-state material in which transition angular frequency is distributed along a straight line defined by $\omega_{23}=a\omega_{13}+b$, where $|a|>1$;

FIG. 17 is a diagram showing a region in which population trapping occurs when light beams having angular frequencies $\omega_A$ and $\omega_B$ are applied to a solid-state material in which transition angular frequency is distributed along a straight line defined by $\omega_{23=a\omega13}+b$, where $|a|<1$;

FIG. 19 is a diagram explaining that a frequency-modulated component of incident light can be amplified by a solid-state material in which transition angular frequency is distributed along a straight line defined by $\omega_{23}=a\ \omega_{13}+b$, where $|a|<1$);

FIG. 20 is a diagram showing the energy-level structure of the solid-state material used in a first embodiment of the invention, which is BaClF crystal containing ions $Sm^{2+}$ dispersed in concentration of 0.5%;

FIG. 25 is a diagram showing the relationship between the transition energy distribution in the material made by a method according to a first embodiment and the emission spectrum of the material;

FIG. 26 is a diagram illustrating the position and width of a transparent region formed by population trapping and observed in the absorption spectrum of the solid-state material according to the first embodiment;

FIGS. 30A to 30D are diagrams explaining the reason why the absorption spectrum becomes flat with the material according to the third embodiment;

FIG. 37 is a diagram showing the emission spectrum the solid-state material exhibited before irradiated with light pulses, and the emission spectrum the material exhibited after irradiated with light pulses;

FIG. 38 is a diagram illustrating the photon energy-intensity relationship which the solid-state material exhibited before irradiated with light pulses, and the photon energy-intensity relationship the material exhibited after irradiated with light pulses;

FIG. 41 is a graph representing the relationship between the full width at half maximum of the solid-state material used in the instrument and the photon energy of the excited light applied to the material;

FIG. 42 is a graph showing the peak photon energy of the material used in the instrument and the photon energy of the excited light applied to the material;

FIG. 43 is a diagram depicting the transition-energy distribution of the solid-state material used in the instrument shown in FIGS. 40A and 40B;

FIG. 44 is a diagram showing the relationship between the transition-energy distribution and emission spectrum of the solid-state material used in the instrument shown in FIGS. 40A and 40B;

FIG. 45 is a diagram explaining the position and width of a transparent region formed by population trapping and observed in the absorption spectrum of the material used in the instrument shown in FIGS. 40A and 40B;

FIG. 46 is a graph explaining the resolution of the frequency-measuring instrument shown in FIGS. 40A and 40B;

FIGS. 47A and 47B are sectional views of a frequency modulator/amplifier incorporating a frequency-converting element, which is a ninth embodiment of the present invention;

FIG. 48 is a graph representing the relationship between the full width at half maximum of the solid-state material used in the modulator/amplifier and the photon energy of the excited light applied to the material;

DETAILED DESCRIPTION OF THE PREFERRED EMBODIMENTS

Embodiments of the present invention will now be described, with reference to the accompanying drawings.
(First Embodiment)

FIG. 20 shows the energy-level structure of the solid-state material used in the present embodiment (i.e., BaClF crystal containing ions $Sm^{2+}$ dispersed in concentration of 0.5%). Specified in FIG. 20 are only the energy levels related to light beams A, B and C (later described) applied to this solid-state material.

The light beam C is applied to excite the material to energy level ($4f^55d$) at which the energy-level structure is changed. The light beam C may either be a coherent one or a non-coherent one. In the present embodiment, it is a coherent light beam (i.e., a laser beam). The light beams A and B should be coherent ones (i.e., laser beams).

In the first embodiment, the light beams A, B and C are applied to the solid-state material, thereby converting it to a new solid-state material which has a different energy-level structure (i.e., a distribution of transition angular frequency). A method of converting the solid-state material to the new solid-state material will be explained.

First, the solid-state material was placed in a cryostat. While maintained at temperature of 2 K, the material was irradiated with light having a photon energy of about 14540 $cm^{-1}$, resonating with the energy transition between the levels $^7F_0$ and $^5D_0$ and being swept. The light was emitted from the ring-dye laser excited by an argon-ion laser. Oscillating frequency of the ring-dye laser had a width (beam width) adjusted to about 500 KHz.

Next, the solid-state material was excited with light having the angular frequency $\omega_{13C}$ and emitted light. The emission spectrum of the material was analyzed by a monochromater. Observed in this emission spectrum, at about the wavelength of 14240 $cm^{-1}$, was a peak resulting from the transition between the level $^7F_1A_2$ and the level $^5D_0$. This peak had an angular frequency of $\omega_{23C}$.

Figure 1:
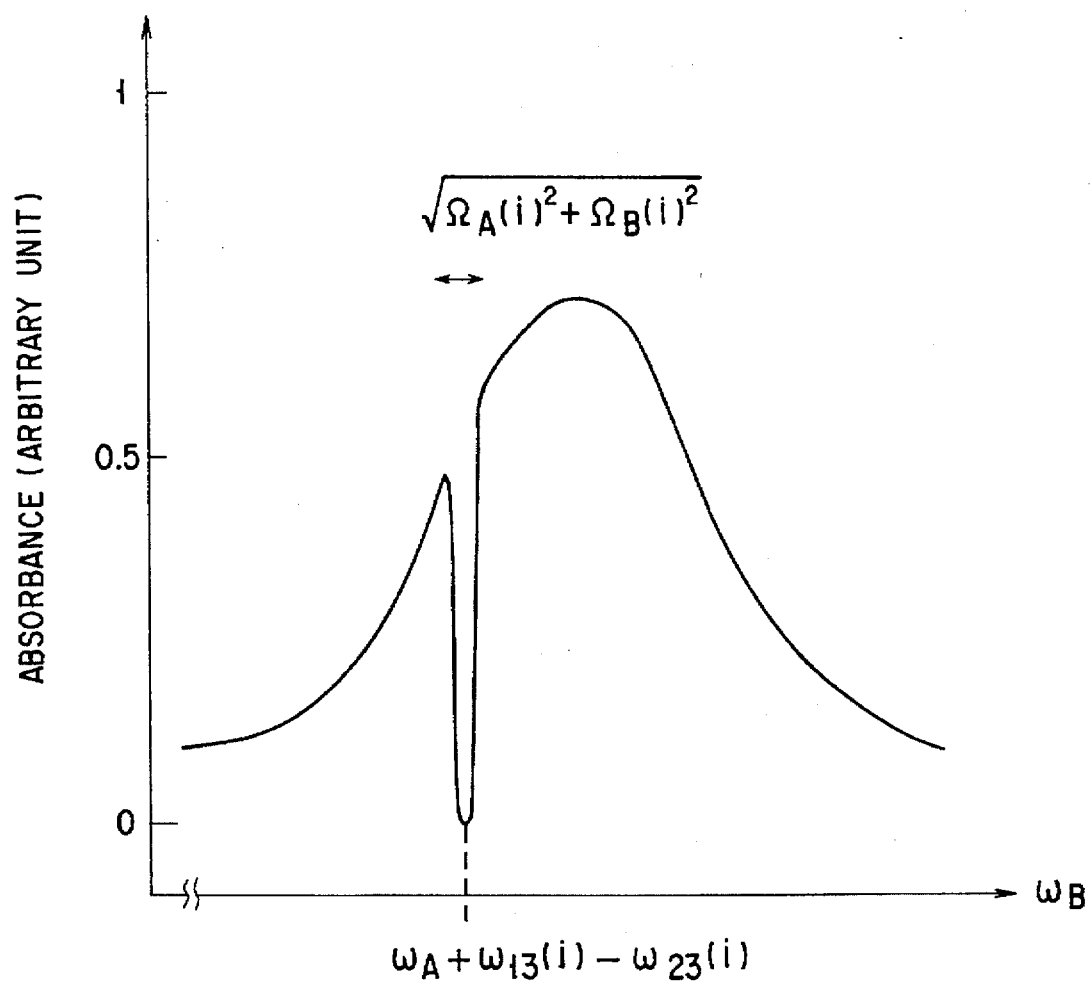
FIG. 1 is a diagram representing an absorption spectrum observed when a light beam A is applied to a molecular, or the i-th absorption center.
Figure 2:
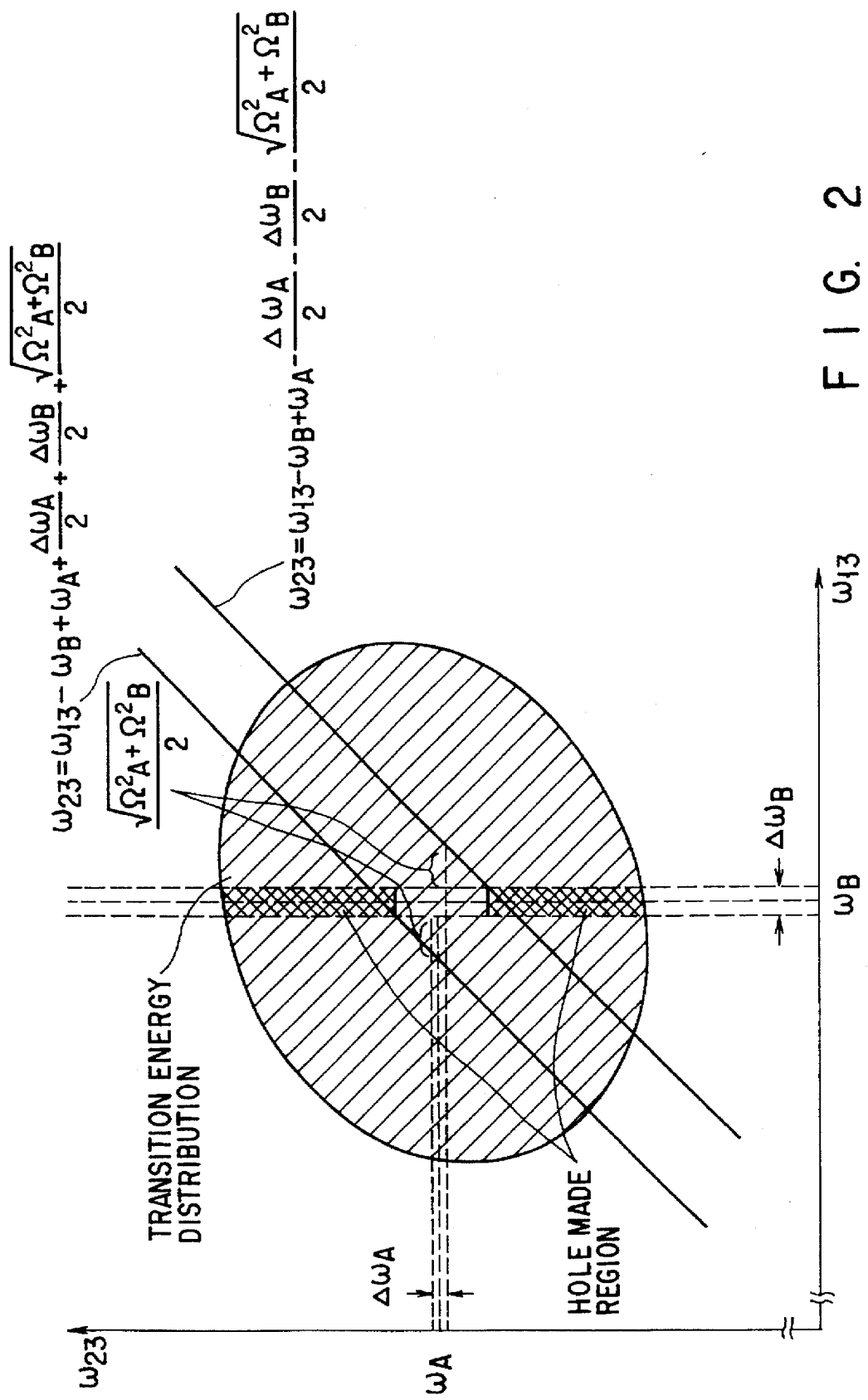
FIG. 2 is a diagram showing a distribution of transition angular frequency observed in an inhomogeneous width of transition angular frequency.
Figure 3:
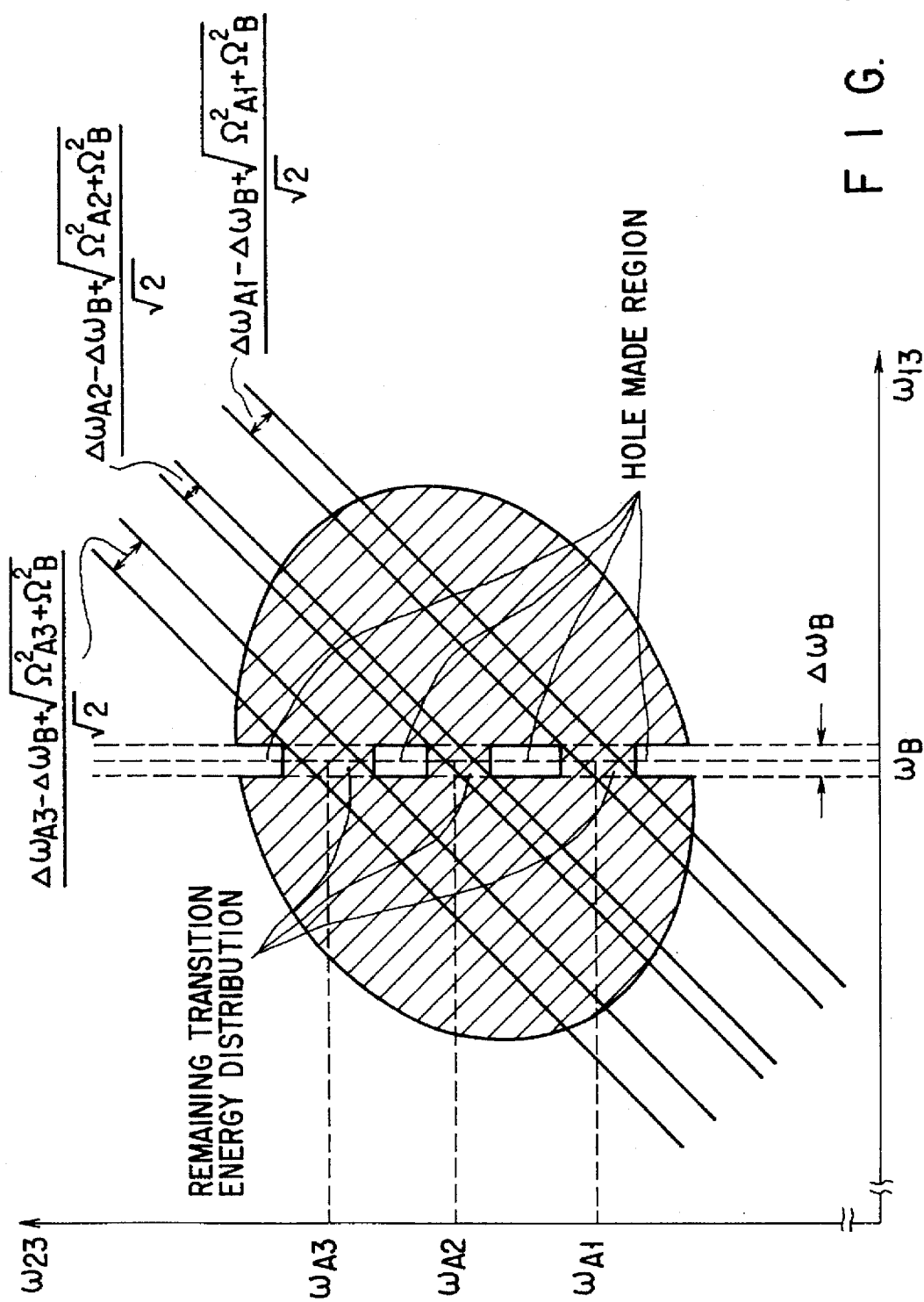
FIG. 3 is a diagram illustrating a distribution of transition angular frequency, obtained by this invention.
Figure 4:
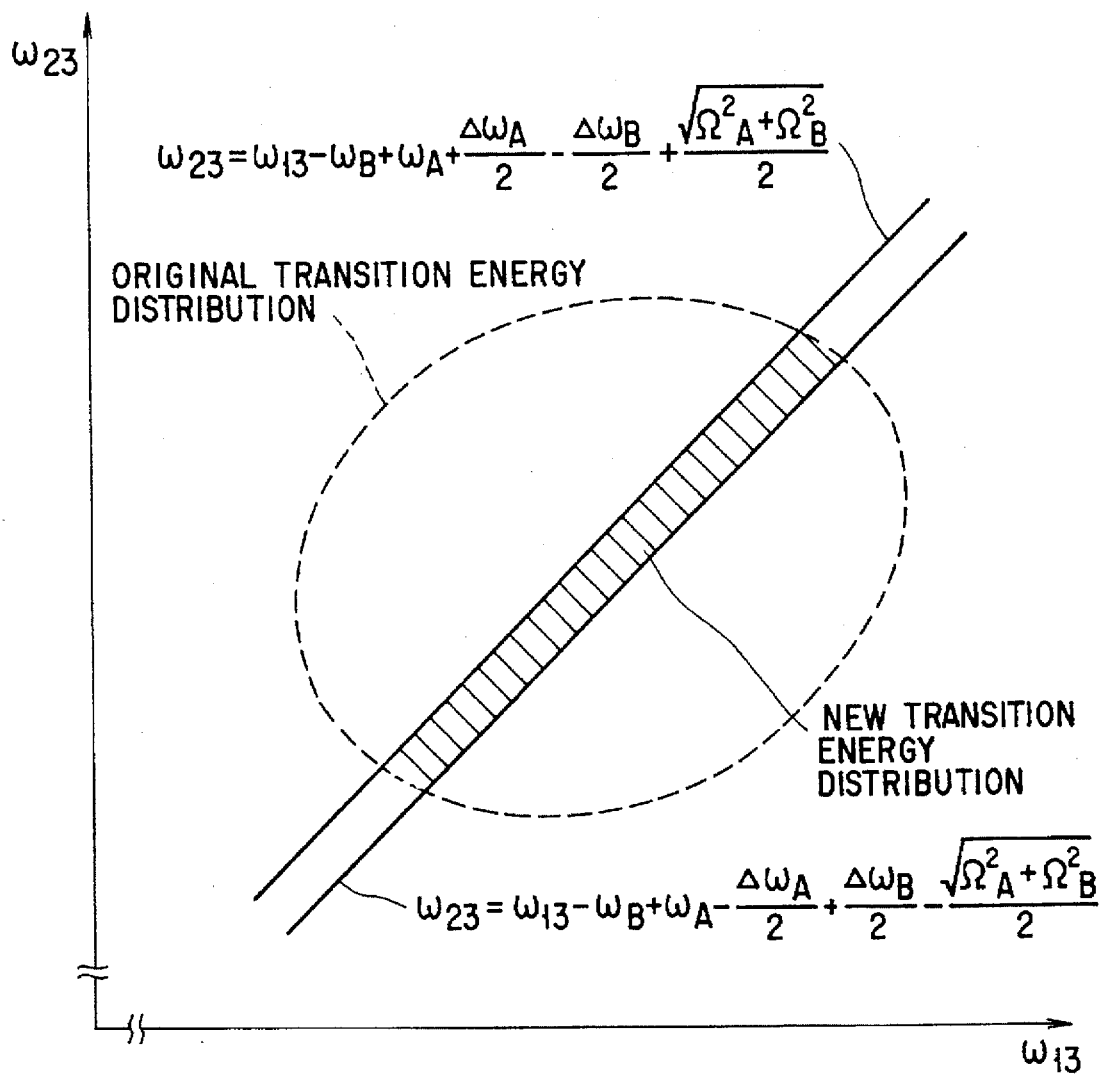
FIG. 4 is a diagram depicting another distribution of transition angular frequency, which is obtained by the present invention.
Figure 7:
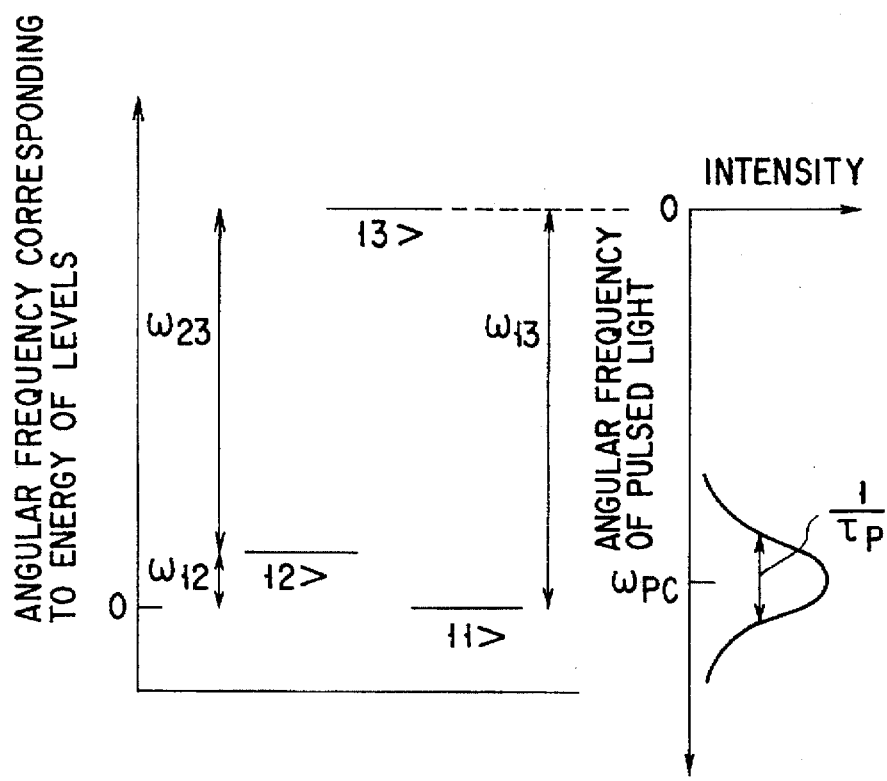
FIG. 7 is a graph illustrating the relationship between the energy levels of a solid-state material and the spectrum of a light pulse applied to the material.
Figure 8:
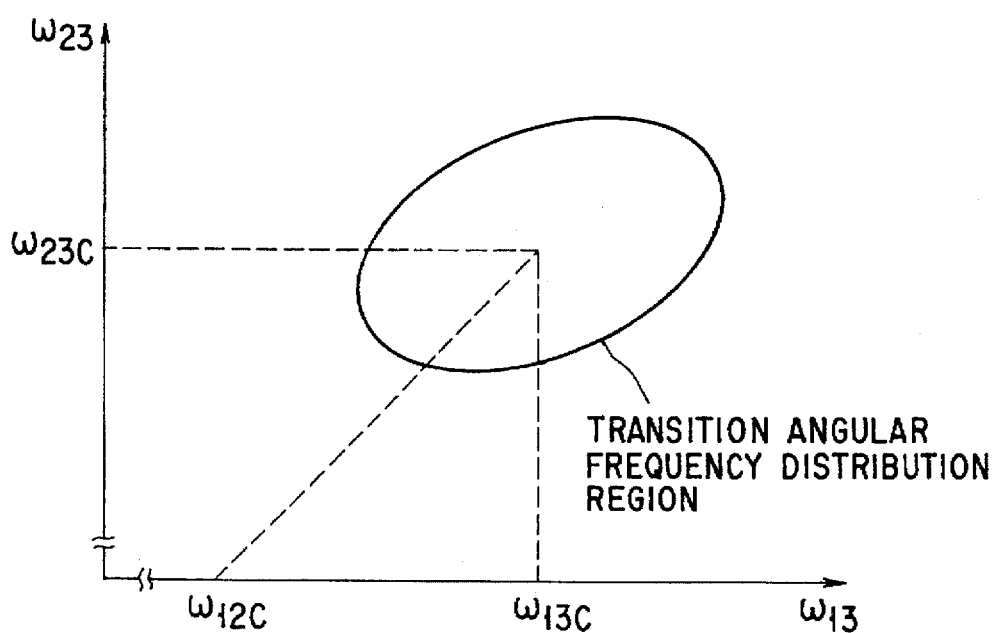
FIG. 8 is a diagram representing the distribution of transition angular frequency, observed in a solid-state material which is outside the scope of this invention.
Figure 9:
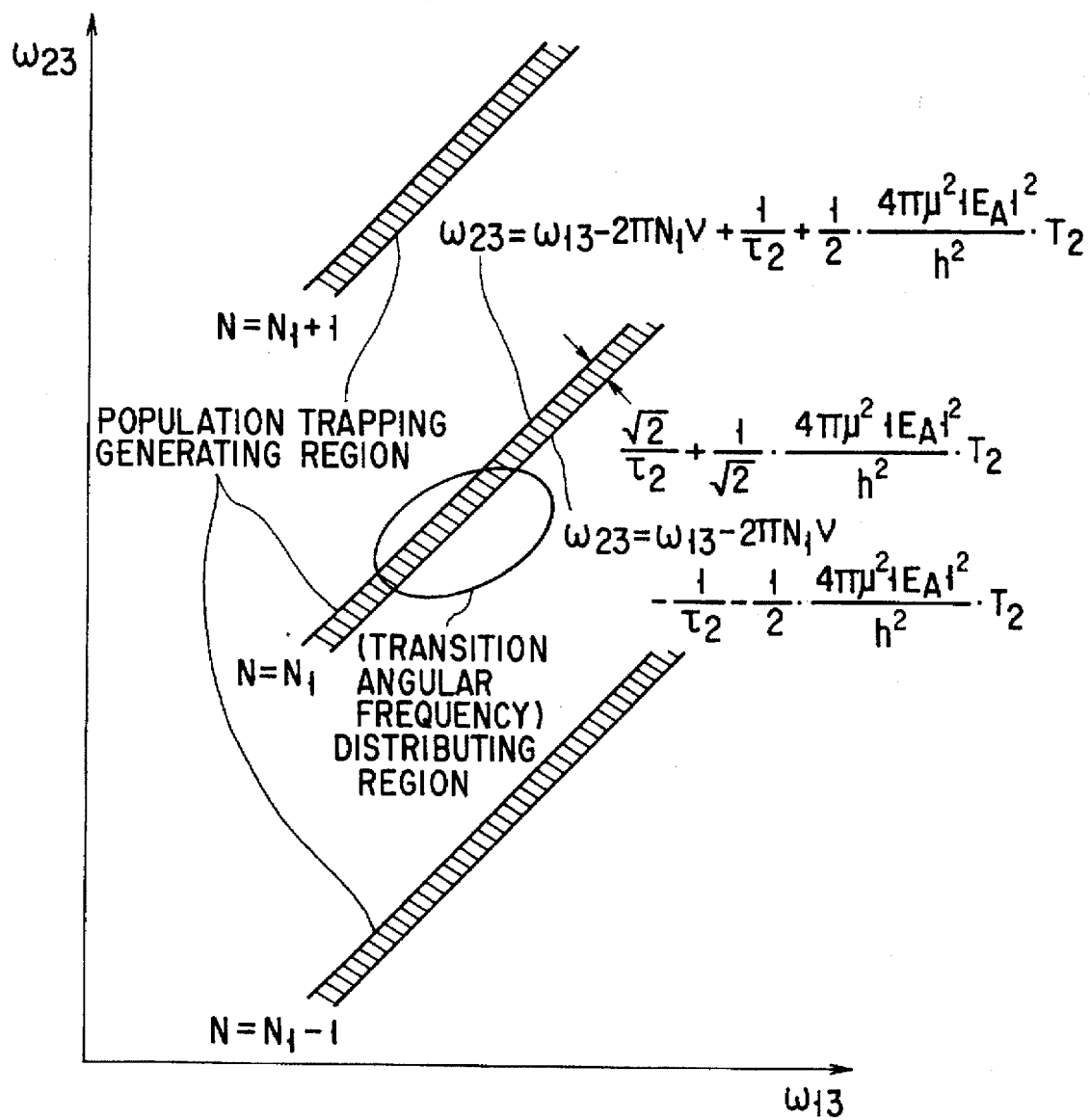
FIG. 9 is a diagram representing a region occurring population trapping in a solid-state material according to the present invention.
Figure 11A:
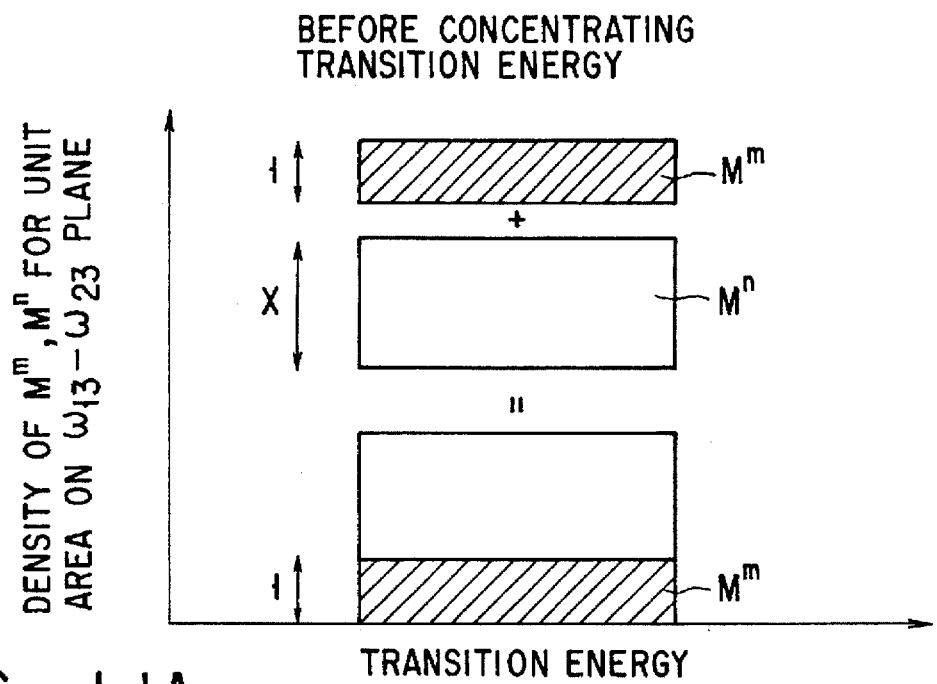
FIGS. 11A and 11B are diagrams explaining a method of concentrating transition energy by exchanging the ion valences.
Figure 11B:
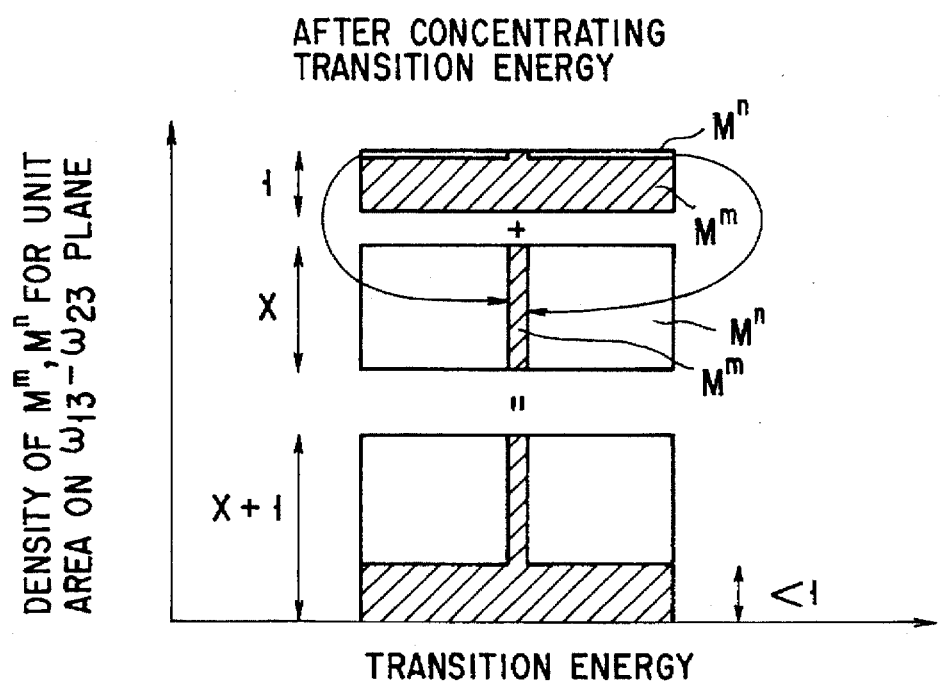
Figure 14:
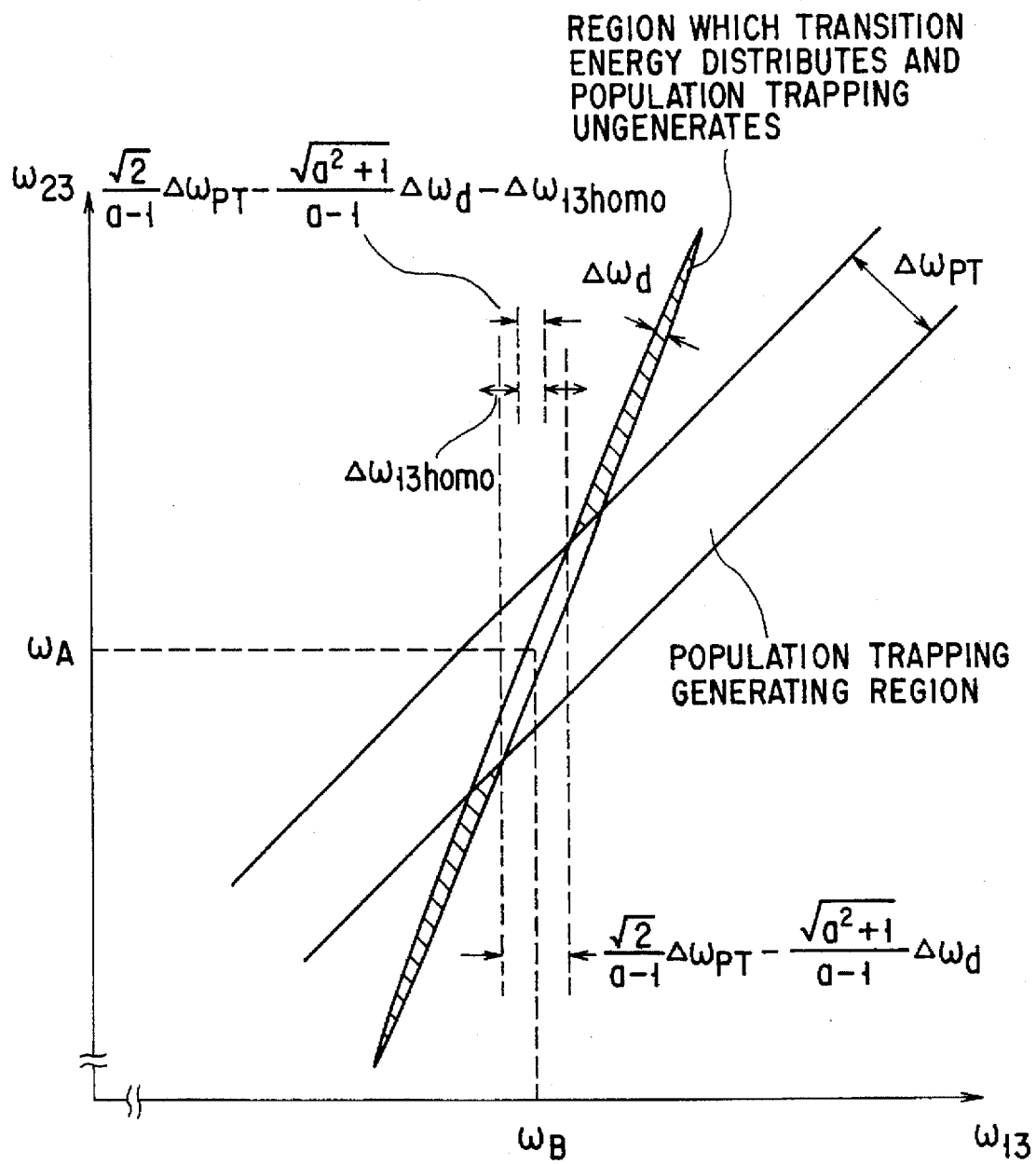
FIG. 14 is a diagram explaining the conditions for forming a transparent region by virtue of population trapping caused by applying light beams of angular frequencies $\omega_A$ and $\omega_B$ to a solid-state material in which transition angular frequency is distributed along a straight line defined by $\omega_{23}=a\omega_{13}+b$, where $|a|>1$.
Figure 15:
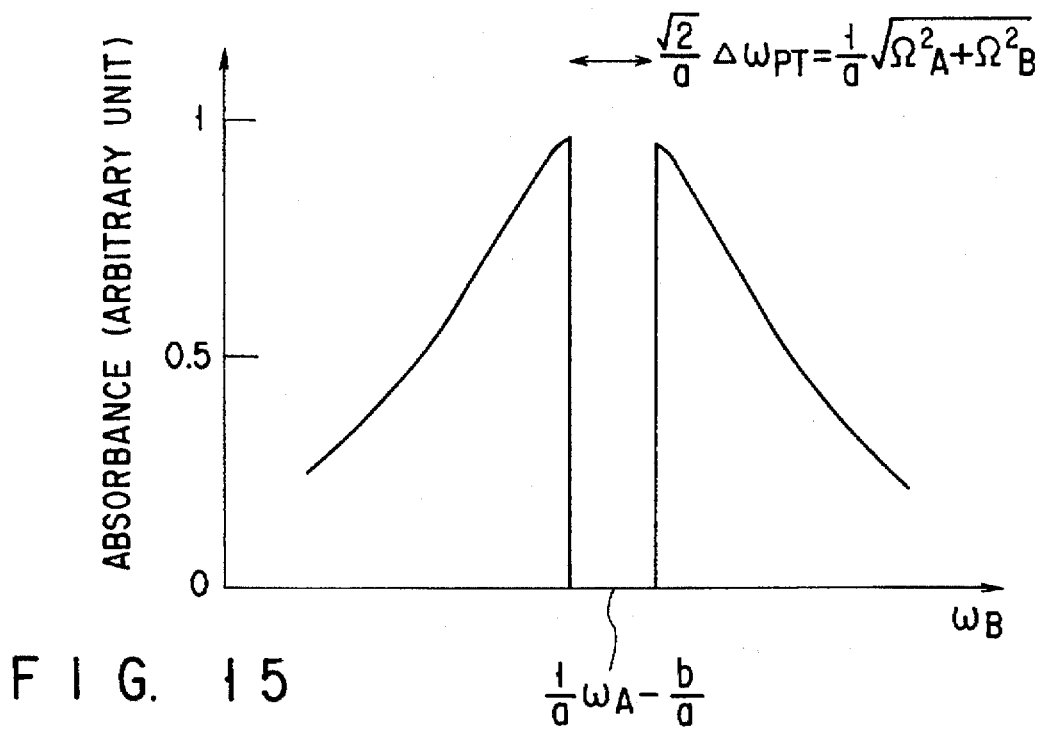
FIG. 15 is a diagram showing a transparent region observed in the absorption spectrum of a solid-state material in which transition angular frequency is distributed along a straight line defined by $\omega_{23}=a\omega_{13}+b$, where $|a|>1$, and the width of the distribution and the homogeneous width of the transition between levels |1> and |3> are much less than the region in which population trapping occurs.
Figure 16:
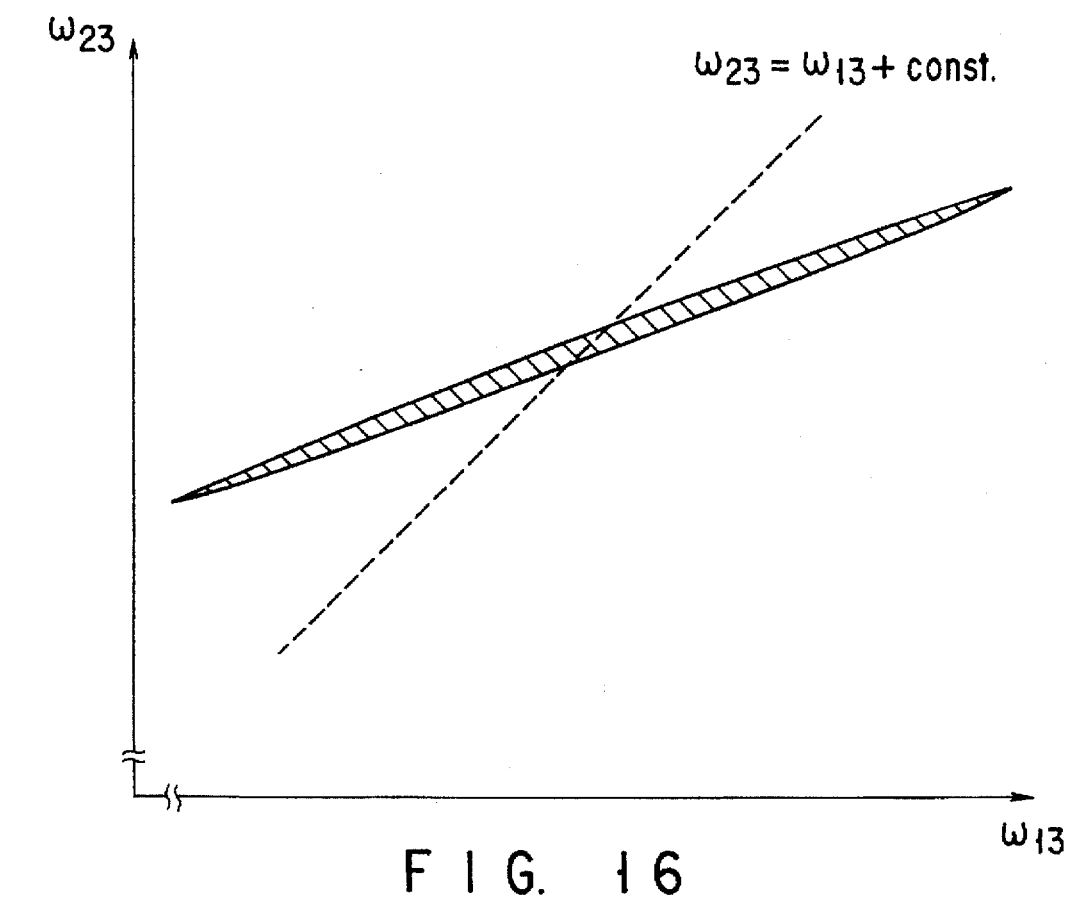
FIG. 16 is a diagram representing the distribution of transition angular frequency, along a straight line defined by $\omega_{23}=a\ \omega_{13}+b$, where $|a|<1$.
Figure 18:
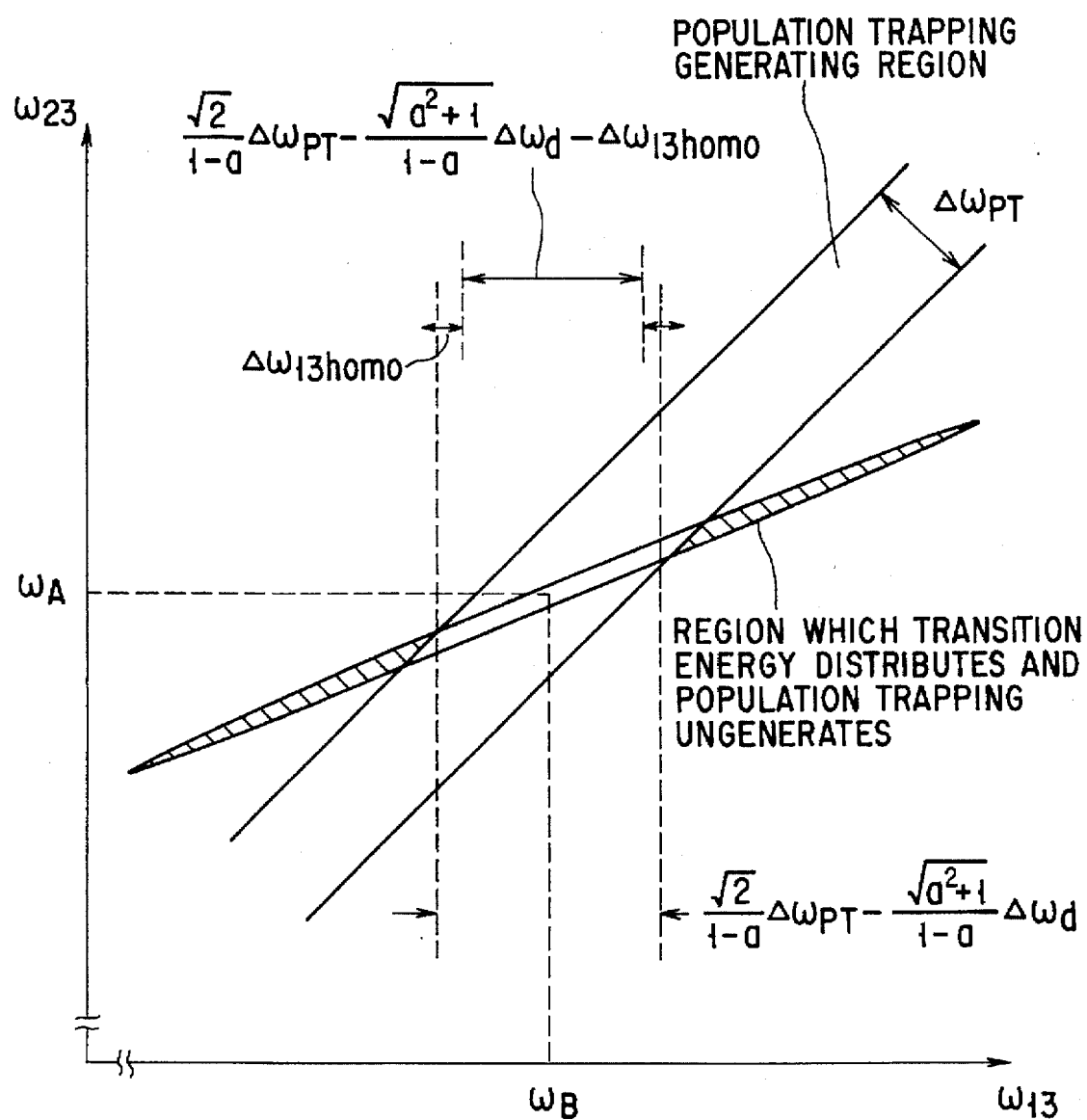
FIG. 18 is a diagram explaining the conditions for forming a transparent region by virtue of population trapping caused by applying light beams of angular frequencies $\omega_A$ and $\omega_B$ to a solid-state material in which transition angular frequency is distributed along a straight line defined by $\omega_{23}=a\omega_{13}+b$, where $|a|<1$)
Figure 21:
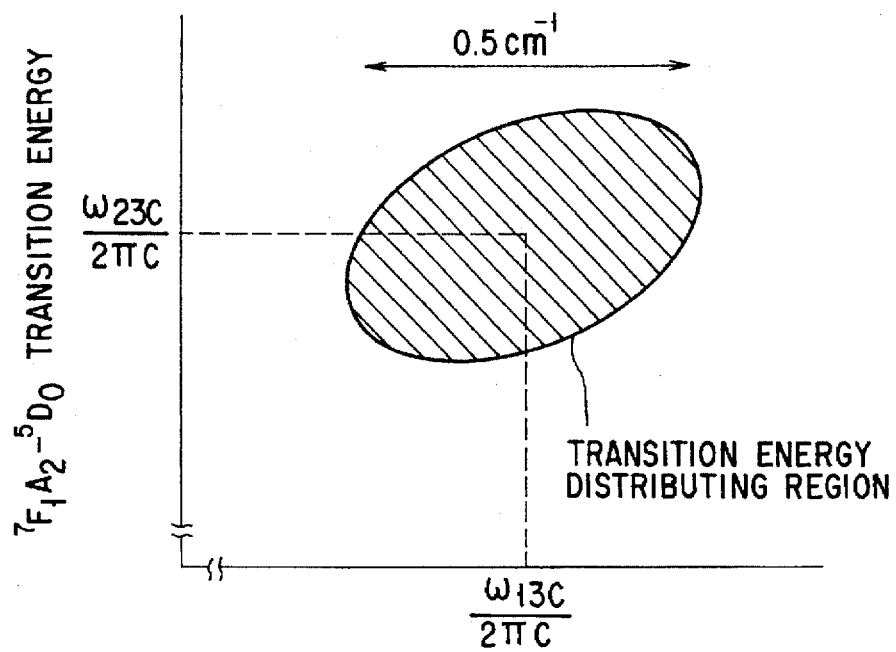
FIG. 21 is a graph illustrating the distribution of transition energy observed in the solid-state material having the energy-level structure shown in FIG. 20.

FIG. 21 is a graph illustrating the distribution of transition angular frequency, in the solid-state material. Plotted on the abscissa is the transition energy $\omega_{13}/(2\pi c)$ between the levels $^7F_0$ and $^5D_0$. Plotted on the ordinate is the transition energy $\omega_{23}/(2\pi c)$ between the levels $^7F_1A_2$ and $^5D_0$. Here, $c=2.99792458 \times 10^{10}$ cm/s. FIG. 21 shows only a region in which the distribution density is equal to or greater than half (½) the maximum value. This region is elliptical because of the inhomogeneous expansion of the transition energy at each ion $Sm^{2+}$ (i.e., each site).

Light having a wavelength of 19440 $cm^{-1}$ and emitted from an argon-ion laser was applied to the solid-state material in which the transition energy is distributed as shown in FIG. 21. Simultaneously, there were applied to the material two light beams A and B emitted from two continuously oscillating, ring-dye lasers, respectively. The light beam A resonated with the energy transition between the levels $^7F_1A_2$ and $^5D_0$, and the light beam B resonated with the energy transition between the levels $^7F_0$ and $^5D_0$. Further, the angular frequency $\omega_B$ was wept from $\omega_{13C}-2\pi c$ 0.05 $cm^{-1}$ to $\omega_{13C}+2\pi c$ 0.05 $cm^{-1}$, while maintaining the following relation between the angular frequencies $\omega_A$ and $\omega_B$:

$$\omega_B-\omega_A=\omega_{13c}-\omega_{23c} \tag{49}$$

At this time, the intensities of the light beams A and B were adjusted, thereby setting the Rabi characteristic angular frequencies $\Omega_A$ and $\omega_B$ of the light beams A and B at 300 MHz and 6 MHz, respectively.

After the angular frequency $\omega_B$ had been thus swept, emission spectrum of the solid-state material was observed. The emission spectrum resulting from the energy transition between the levels $^7F_1A_2$ and $^5D_0$ depended on the photon energy of the excited light. The photon energy-dependency of the spectrum was measured by a monochromater of high resolution. The results were as shown in FIG. 22.

Figure 22:
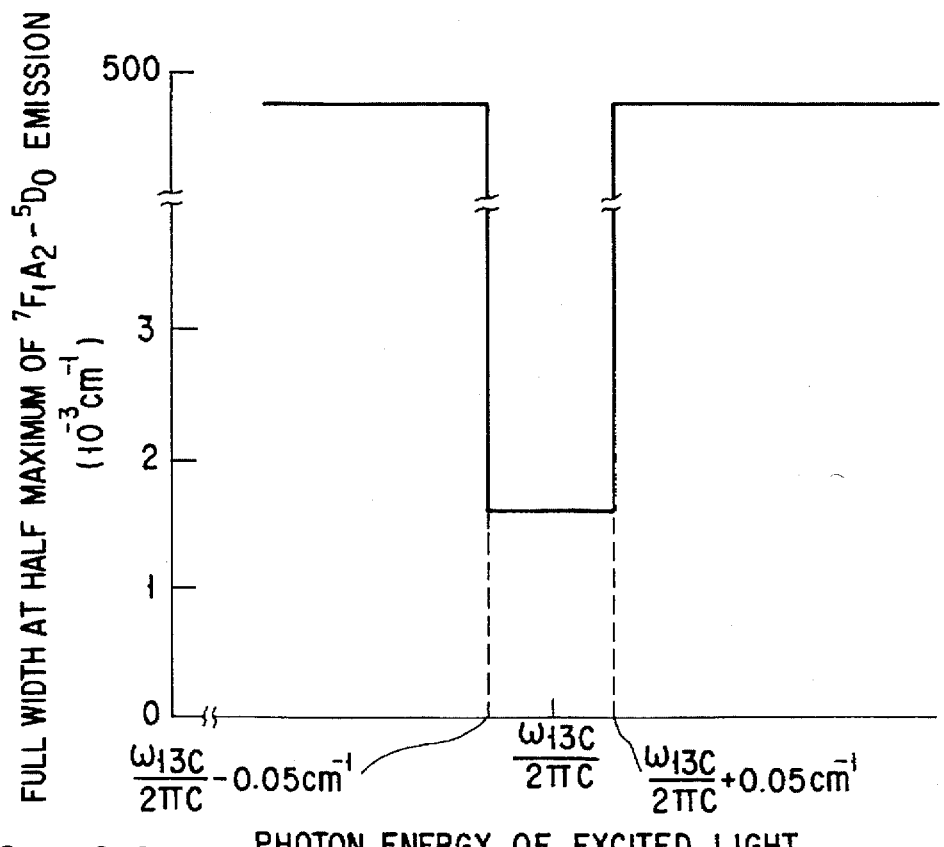
FIG. 22 is a graph representing the relationship between the full width at half maximum of the solid-state material made in the first embodiment and the photon energy of the excited light applied to the material.

FIG. 22 is a graph representing the relationship between the full width at half maximum of this emission spectrum and the photon energy of the excited light. As seen from FIG. 22, the full width at half maximum was reduced in the region where the photon energy of the excited light ranges from $\omega_{13C}/(2\pi c)-0.05$ $cm^{-1}$ to $\omega_{13C}/(2\pi c)+0.05$ $cm^{-1}$. More precisely, the full width at half maximum was reduced to $1.6 \times 10^{-3}$ $cm^{-1}$.

Figure 23:
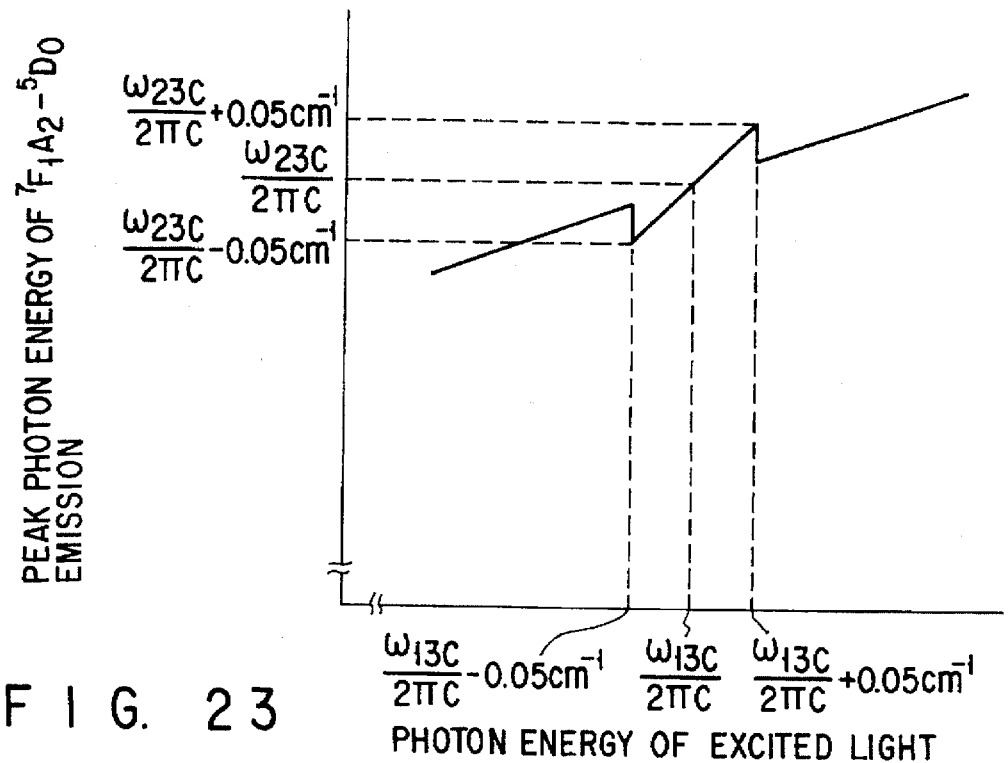
FIG. 23 is a graph illustrating the relationship between the peak photon energy in the solid-state material made in the first embodiment and the photon energy of the excited light applied to the material.

FIG. 23 illustrates the relationship between the peak photon energy in the emission spectrum and the photon energy of the excited light, which was observed in the solid-state material after excitation by the three beam (A, B and C). As can be understood from FIG. 23, the characteristic line much inclined in the region where the photon energy of the excited light ranges from $\omega_{13C}/(2\pi c)-0.05$ $cm^{-1}$ to $\omega_{13C}/(2\pi c)+0.05$ $cm^{-1}$.

Figure 24:
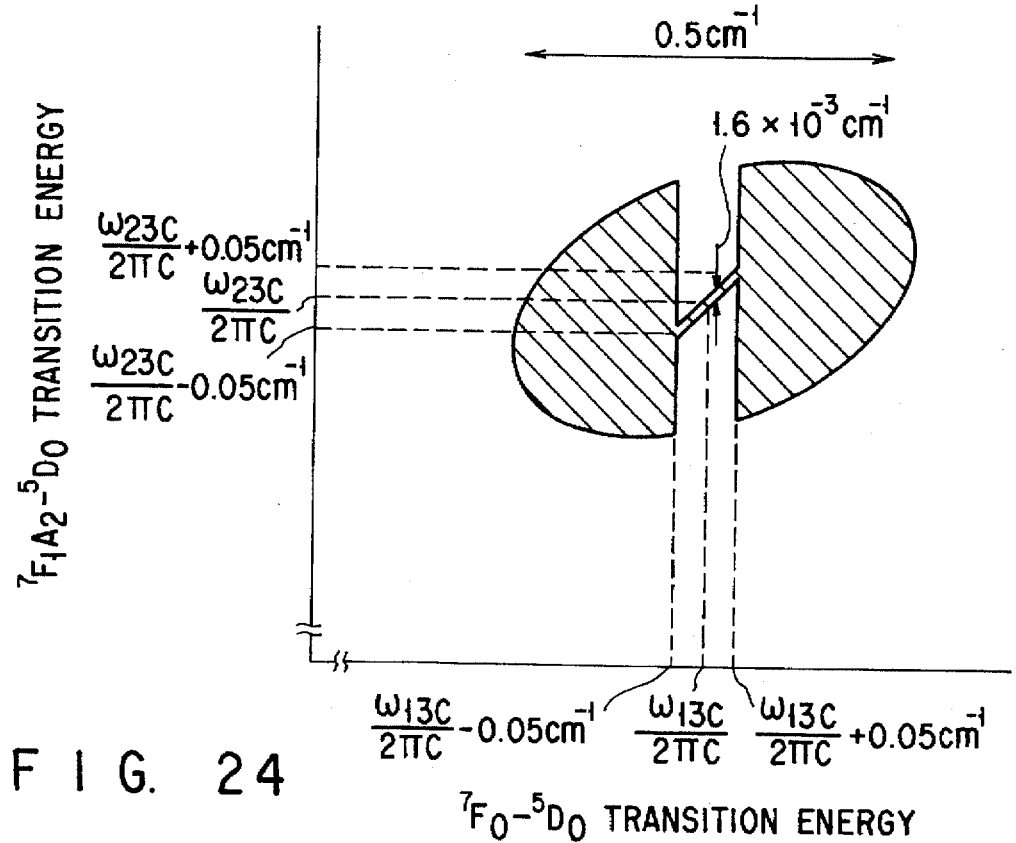
FIG. 24 is a diagram depicting the distribution of transition energy, observed in the solid-state material made in the first embodiment.

The results shown in FIGS. 22 and 23 means that the transition energy was distributed in the $\omega_{13}-\omega_{23}$ plane as shown in FIG. 24, after the light beams A, B and C had been applied to the solid-state material. In other words, when the material was irradiated with the light beams A, B and C, the transition energy was distributed over a range of $\omega_{13C}-2\pi c \cdot 0.05$ $cm^{-1} < \omega_{13} < \omega_{13C}+2\pi c \cdot 0.05$ $cm^{-1}$, in a band-shaped region which extended along a straight line defined by $\omega_{23}=\omega_{13}-\omega_{13C}+\omega_{23C}$ and which had a width of $|\Delta\omega_A-\Delta\omega_B+(\Omega_A^2+\Omega_B^2)^{1/2}|/2^{1/2}$, where $\Delta\Omega_A$ was the width of the light beam A and $\Delta\omega_B$ is the width of the light beam B.

FIG. 25 is a diagram for explaining how the emission spectrum of the solid-state material exhibiting the above-mentioned new transition energy distribution behaves when a light beam B having an angular frequency $\omega_{B1}$ is applied to the material and how it behaves when a light beam B having an angular frequency $\omega_{B2}$ is applied to the material. As is evident from FIG. 25, the center angular frequency of the emission spectrum changed along the dash-dotted line. The full width at half maximum was determined by the distribution of the angular frequency $\omega_{23}$ at the angular frequency $\omega_{13}$ of the excited light.

Next, the intensity of the light beam A was adjusted, while maintaining the Rabi characteristic angular frequency $\Omega_B$ of the light beam B at 6 MHz. The Rabi characteristic angular frequency $\Omega_A$ of the light beam A was thereby decreased to 12 MHz. Light was then applied to a different solid-state material of the same composition, in the same way as described above. In the region where the photon energy ranged from $\omega_{13C}/(2\pi c)-0.05$ cm$^{-1}$ to $\omega_{13C}/(2\pi c)+0.05$ cm$^{-1}$, the full width at half maximum of the resultant emission spectrum due to transition between the levels $^7F_1A_2$ and $^5D_0$ was approximately $4.2\times10^{-4}$ cm$^{-1}$, which was almost equal to the homogeneous width of the transition between the levels $^7F_1A_2$ and $^5D_0$. That is the difference between the half-value full width and the homogeneous width was small, falling within a range of allowable error.

Assume that the angular frequency $\omega_{23}$ is distributed in the $\omega_{13}-\omega_{23}$ plane, over a width equal to greater than the homogeneous width and at the photon energy falling within the range from $\omega_{13C}/(2\pi c) -0.05$ cm$^{-1}$ to $\omega_{13C}/(2\pi c)+0.05$ cm$^{-1}$. Then, the resultant emission spectrum must have a full width at half maximum greater than the homogeneous width of $4.2\times10^{-4}$ cm$^{-1}$. Obviously, the energy level was distributed in the solid-state material, over a width less than the homogeneous width and along a straight line defined by $\omega_{13}-\omega_{23}=$(constant).

Furthermore, the solid-state material obtained by processing the two-dimensional distribution of transition energy and having new energy-level structure was irradiated with a light beam A which had Rabi characteristic angular frequency $\Omega_A$ of 940 MHz, a width of $\Delta\omega_A$ of 500 KHz, a center angular frequency $\omega_A$ of $\omega_{23C}+2\pi c\cdot 0.02$ cm$^{-1}$. The resultant absorption spectrum between the levels $^7F_0$ and $^5D_0$ was detected and examined. The results were as is shown in FIG. 26.

As indicated by the solid-line curve in FIG. 26, the absorption spectrum had a transparent region positioned at the photon energy of $\omega_{23C}+2\pi c\cdot 0.02$ cm$^{-1}$ and having a width of about $5\times10^{-3}$ cm$^{-1}$. The broken line in FIG. 26 indicates the absorption spectrum which might have been observed if the light beam A had not been applied to the solid-state material.

This particular absorption spectrum was observed, for the following reason.

In the present embodiment, the transition energy was distributed over a range of $\omega_{13C}-2\pi c\cdot 0.05$ cm$^{-1}$ $<\omega_B<\omega_{13C}+2\pi c\cdot 0.05$ cm$^{-1}$, in a band-shaped region which extended along a line defined by $\omega_{23}=\omega_{13}-\omega_{13C}+\omega_{23C}$ and which had a width of $\{\Delta\omega_A-\Delta\omega_B+(\Omega_A^2+\Omega_B^2)^{1/2+\epsilon}\}/2^{+\epsilon,\mathrm{fra}\ 1/2}$ to $(\Omega_A^2+\Omega_B^2)^{1/2}/2^{1/2}=12$ MHz.

The angular frequency $\omega_B$ may satisfy the following condition while the light beam A ($\omega_A=\omega_{23C}+2\pi c\cdot 0.02$ cm$^{-1}$) is being applied to the material:

$$\omega_{13C}+2\pi c\cdot 0.02 \text{ cm}^{-1}-470 \text{ MHz}$$

$$<\omega_B<$$

$$\omega_{13C}+2\pi c\cdot 0.02 \text{ cm}^{-1}+470 \text{ MHz} \quad (50)$$

Figure 27A:
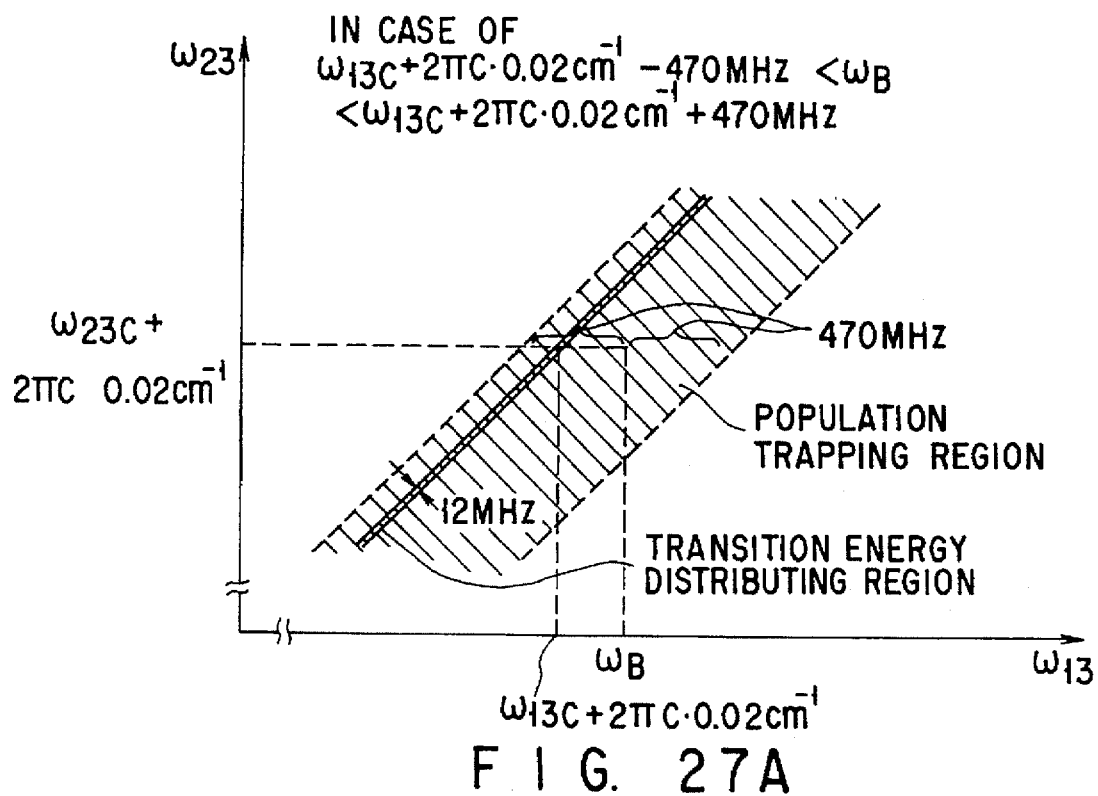
FIGS. 27A and 27B are diagrams explaining the width of a transparent region formed by population trapping.
Figure 27B:
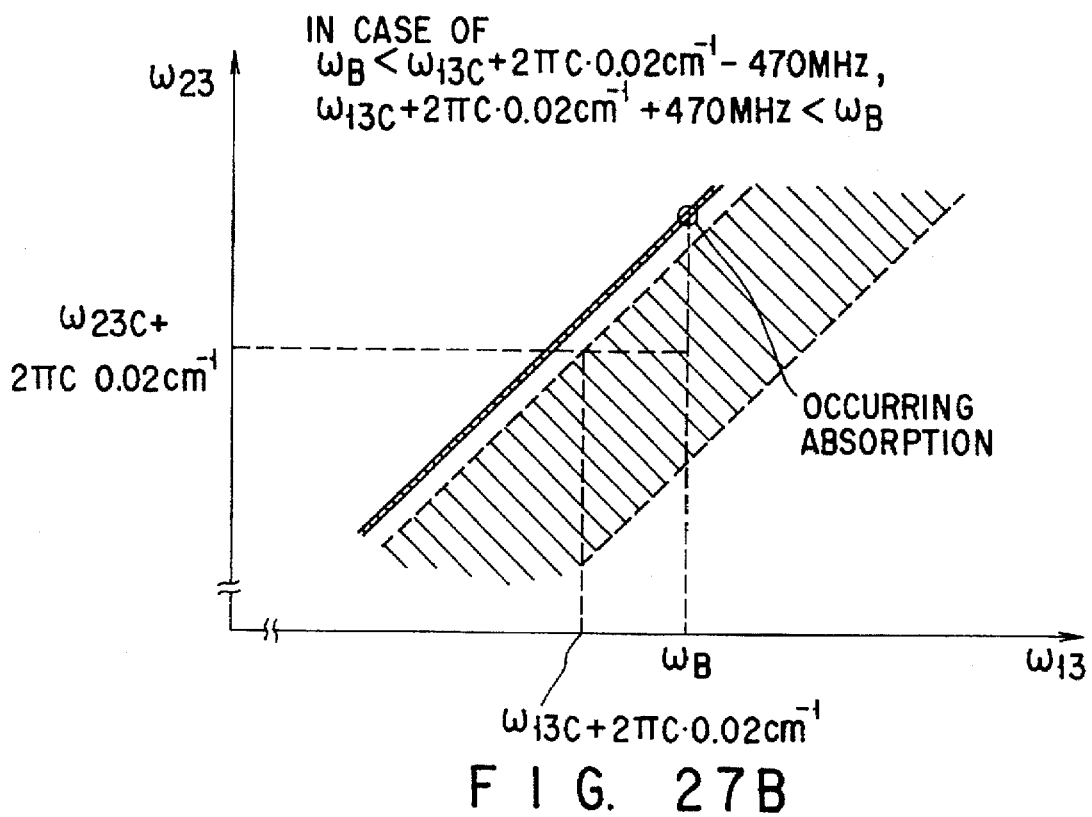

Then, almost all ions Sm$^{2+}$ which are at $\omega_B-\Delta\omega_B/2<\omega_{13}<\omega_B+\Delta\omega_B/2$ will satisfy the population trapping condition of the relation (3), as can be understood from FIG. 27A. Absorption will occur outside the region defined by the relation (50), as shown in FIG. 27B. Thus, when light was applied to the material as mentioned above, population trapping occurred in the region defined by the relation (50), forming a transparent region. This is why the absorption spectrum shown in FIG. 26 was observed.

Moreover, none of the light beams A, B and C was applied to the same solid-state material, and the absorption spectrum of this material was detected while applying the light beam A to the material, in the same way as described above. The light absorption decreased by 5% at most, and no transparent region so prominent as the one shown in FIG. 26 was not observed in the resultant absorption spectrum. This may be because the energy level was distributed too much in a direction perpendicular to a straight line defined by $\omega_{13}-\omega_{23}=$(constant), and the sites present in the region of $\omega_B-\Delta\omega_B/2<\omega_{23}<\omega_B+\Delta\omega_B/2$.

In order to form a transparent region in the absorption spectrum, by population trapping and not by employing the method of the present embodiment, it is necessary to irradiate the material with light beams which have so large Rabi characteristic angular frequencies that is larger than the width of distribution of transition angular frequency $(\Omega_A^2+\Omega_B^2)^{1/2}$. In this case, however, the light applied to the material needs to have so high an intensity that the material may be optically damaged. Should the material not damaged at all, it would be impossible to form a narrow transparent region in the absorption spectrum.

As has been described, the method according to the first embodiment of the invention can provide solid-state material whose two-dimensional distribution of transition energy (i.e., two-dimensional distribution of transition angular frequency) can be processed to an accuracy equal to or less than the homogeneous width of any angular frequency involved, and in which population trapping can occur to form a narrow transparent region at any desired photon energy level.

(Second Embodiment)

First, SmF$_3$ was added in an amount of 3 wt % to fluoride glass made of 28.2 mol % of AlF$_3$, 12.2 mol % of HfF$_4$, 8.3 mol % of YF$_3$, 3.5 mol % of MgF$_2$, 8.3 mol % of CaF$_2$, 13.1 mol % of SrF$_2$, 12.6 mol % of BaF$_2$ and 3.8 mol % of NaF$_3$. The resultant mixture was melted, thereby providing fluoride glass containing Sm$^{2+}$. The Sm$^{2+}$-containing fluoride glass, or solid-state material, was placed in a cryostat and maintained at 4 K.

Then, the solid-state material was irradiated with light having a photon energy of about 14700 cm$^{-1}$ and resonating with the transition between the levels $^7F_0$ and $^5D_0$ of the Sm$^{2+}$ contained in the material, while sweeping the wavelength of the light. The excitation spectrum of the resultant emission spectrum was examined. The center angular frequency of the transition was found to be $\omega_{13C}$, from the peak photon energy of the excitation spectrum. The source of the light used to determine the center angular frequency of the transition was a continuously oscillating, ring-dye laser which was light when excited with the light from the argon-ion laser. By using this ring-dye laser, the spectral width of oscillating frequency was adjusted to about 500 KHz.

Next, the solid-state material was excited with light having angular frequency $\omega_{13C}$, and the resultant emission spectrum was examined by a monochromater. A peak resulting from the transition between the levels $^7F_1A_2$ and $^5D_0$ was found in the vicinity of 14400 cm$^{-1}$. The angular frequency of this peak was identified with the angular frequency $\omega_{23C}$.

Further, the solid-state material was irradiated with two light beams A and B emitted from two continuously oscillating, ring-dye lasers, respectively, which were excited with the light from an argon-ion laser. The light beam A resonated with the energy transition between the levels $^7F_1A_2$ and $^5D_0$, while the light beam B resonated with the energy transition between the levels $^7F_0$ and $^5D_0$. The angular frequency $\omega_B$ was swept from $\omega_{13C}-2\pi c \cdot 0.05$ cm$^{-1}$ to $\omega_{13C}+2\pi c \cdot 0.05$ cm$^{-1}$, while maintaining the relation between the angular frequencies $\omega_A$ and $\omega_B$ which is defined by the equation (49). At this time, the intensities of the light beams A and B were adjusted, setting the Rabi characteristic angular frequency $\Omega_A$ of the beam A at 300 MHz and the Rabi characteristic angular frequency $\Omega_B$ of the beam B at 6 MHz.

The solid-state material thus excited is further excited with the light emitted from the ring-dye laser and resonating with the energy transition between the levels $^7F_0$ and $^5D_0$. The full width at half maximum of the emission spectrum resulting from the transition between the levels $^7F_1A_2$ and $^5D_0$ was measured by means of a high-resolution monochromater. The full width at half maximum was $5 \times 10^{-1}$cm$^{-1}$. The difference between this value and the homogeneous width of the transition between the levels $^7F_1A_2$ and $^5D_0$ was small, falling within a range of allowable error.

It was then determined how much the angular frequency $\omega_{max}$ of the peak in the emission spectrum resulting from the transition between the levels $^7F_1A_2$ and $^5D_0$ depended on the angular frequency $\omega_{ex}$ of the excited light. The following relationship was found to exist:

$$\omega_{max} = \omega_{ex} - \omega_{13c} + \omega_{23c} \qquad (51)$$

From this relationship it is clear that the transition energy of the solid-state material was distributed in the $\omega_{13}-\omega_{23}$ plane, along a straight line defined by $\omega_{13}-\omega_{23}=$(constant) and in a region which was narrower than the homogeneous width. Even if the energy-level structure of the Sm$^{2+}$-containing fluoride glass is changed, forming a transparent region, the transition-energy distribution in any other region in the $\omega_{13}-\omega_{23}$ plane remains uninfluenced.

In the second embodiment, the transition energy can be distributed along the straight line defined by $\omega_{23}=\omega_{13}-\omega_{13C}+\omega_{23C}$, over the range of $\omega_{13C}-2\pi c\ 50$ cm$^-<\omega_{13}<\omega_{13C}+2\pi c\ 50$ cm$^{-1}$, which is almost the entire region in which the transition energy was distributed in the $\omega_{13}-\omega_{23}$ plane before the solid-state material was processed. That is, the transition energy (i.e., transition angular frequency) can be distributed in a larger region than in the first embodiment.

(Third Embodiment)

Figure 28:
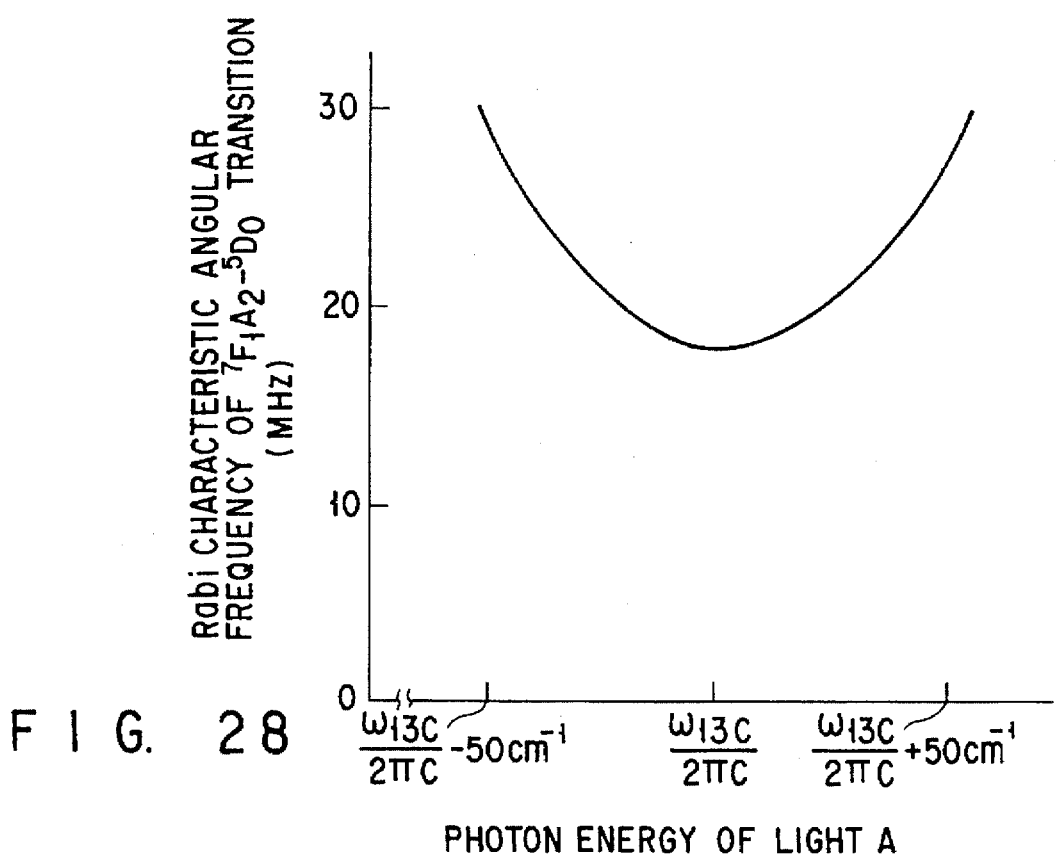
FIG. 28 is a diagram explaining the essence of a method of manufacturing solid-state material, which is a third embodiment of the present invention.

The third embodiment is different from the second embodiment, only in that the intensity of the light beam A was continuously changed when the angular frequency $\omega_B$ was swept from $\omega_{13C}-2\pi c\cdot 50$ cm$^{-1}$ to $\omega_{13C}+2\pi c\cdot 50$ cm$^{-1}$, while maintaining the relation between the angular frequencies $\omega_A$ and $\omega_B$ which is defined by the equation (49). The Rabi characteristic angular frequency $\Omega_A$ for the transition between the levels $^7F_1A_2$ and $^5D_0$ was thereby changed between 30 MHz and 18 MHz, as indicated by the FIG. 28 As a result, the absorption spectrum of the material exhibits little wavelength-dependency in the range from $\omega_{13C}/(2\pi c)$ $-50$ cm$^{-1}$ to $\omega_{13C}/(2\pi c)+50$ cm$^{-1200}$. The material can therefore acquire a flat absorption spectrum.

Figure 29:
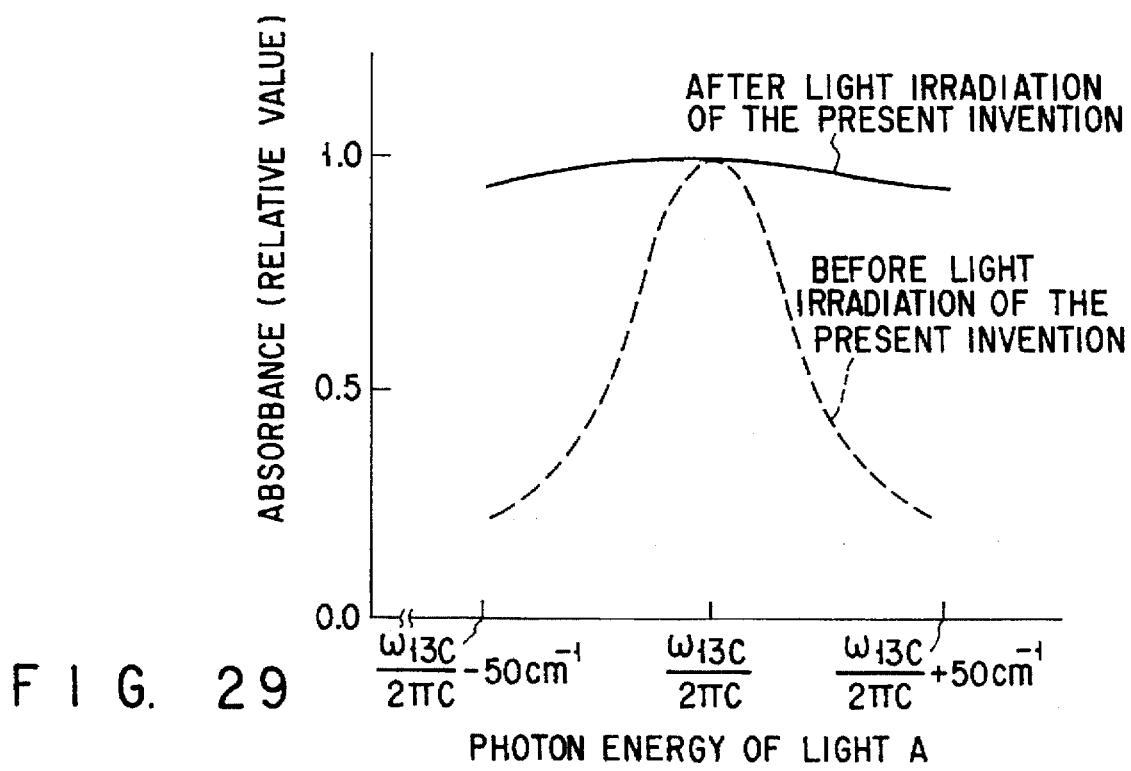
FIG. 29 is a diagram illustrating the absorption spectra observed with the solid-state material before and other light is applied to the material according to the third embodiment.

FIG. 29 is a diagram illustrating the absorption spectrum observed with the solid-state material according to the third embodiment, before and after light is applied to the material. This absorption spectrum was obtained by normalizing the original spectrum with the absorption peak. As seen from FIG. 29, the solid-state material irradiated with light by the method according to the third embodiment had a flat absorption spectrum.

The reason why the material acquires the flat absorption spectrum will be explained, with reference to FIGS. 30A to 30D.

The light beams A and B are swept, while changing the Rabi characteristic angular frequency of the light beam A as shown in FIG. 30A and maintaining the relation between the angular frequencies $\omega_A$ and $\omega_B$ defined by the equation (49). Then, the transition energy remains distributed in accordance with the Rabi characteristic angular frequency of the light beam A. This transition-energy distribution is narrow in the center angular-frequency region where distribution density is high as illustrated in FIG. 30B. Hence, the absorption spectrum observed at the transition between the levels $^7F_0$ and $^5D_0$ depends only a little on the wavelength in the center angular-frequency region, as is illustrated in FIGS. 30C and 30D. FIG. 30D is different from FIG. 30C only in that the scale of absorption (i.e., ordinate) is extended.

(Fourth Embodiment)

Figure 31A:
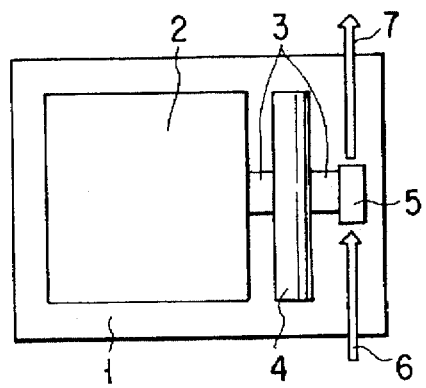
FIGS. 31A and 31B are sectional views of a spectroscopic element which is a fourth embodiment of the present invention.
Figure 31B:
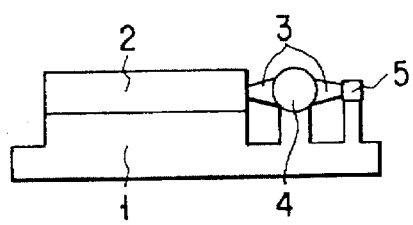
Figure 32:
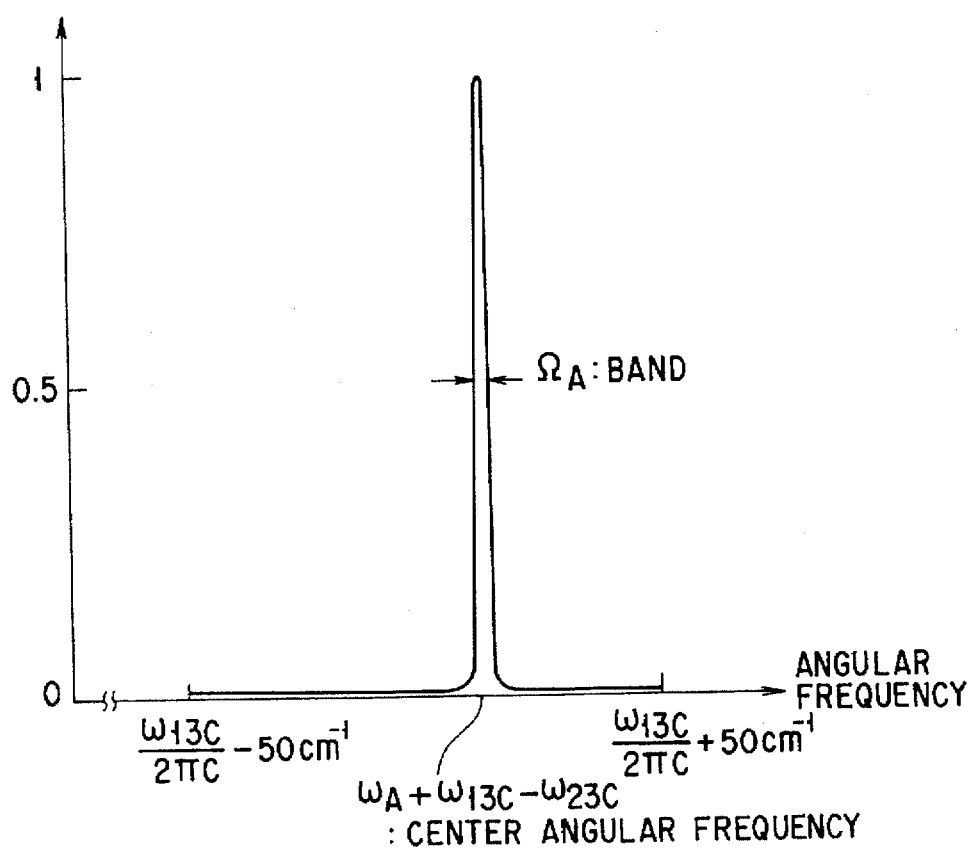
FIG. 32 is a diagram depicting the transmittance spectrum of the spectroscopic element shown in FIGS. 31A and 31B.

FIGS. 31A and 31B show a spectroscopic element which is a fourth embodiment of the present invention. FIG. 31A is a sectional plan view, and FIG. 31B a section side view.

As shown in FIGS. 31A and 31B, the spectroscopic element comprises an aluminum substrate 1, a variable-wavelength semiconductor laser 2, a cylindrical lens 4, a solid-state member 5. The semiconductor laser 2 is made of $Ga_xIn_{1-x}As_yP_{1-y}$ mixed crystal. Its oscillating wavelength depends on an electric current or temperature.

The variable-wavelength semiconductor laser 2 emits a laser beam 3. The laser beam 3 is focused by the cylindrical lens 4 made of quartz and having a diameter of 1 mm. The laser beam 3 thus focused is applied to the solid-state member 5 which has a size of 0.5 mm×0.5 mm×1 mm. The member 5 is made of the solid-state material manufactured by the method according to the third embodiment and has flat absorption characteristic. Hence, the laser beam 3 has its angular frequency adjusted to the transition levels $^7F_1A_2$ and $^5D_0$. Like the laser 2, the cylindrical lens 4 and the solid-state member 5 are secured to the aluminum substrate 1.

Incident light 6 was applied to the solid-state member 5 in a direction perpendicular to the laser beam 3. A part of the incident light 6 was absorbed by the member 5. The transmitted light 7 was detected, thereby examining the absorption spectrum of the solid-state member 5. More specifically, the intensity of the laser beam 3 was adjusted, whereby the Rabi characteristic angular frequency $\Omega_A$ of the transition between the levels $^7F_1A_2$ and $^5D_0$ was set at 120 MHz, and the angular frequency $\omega_A$ of the laser beam 3 was set at $\omega_{23}+2\pi c2$ cm$^{-1}$. It was then found that absorption spectrum had a non-absorbing region having a width of about $6\times10^{-4}$ cm$^{-1}$ and a center angular frequency at $\omega_{13C}+2\pi c2$ cm$^{-1}$.

The Rabi characteristic angular frequency $\Omega_A$ was changed to 60 MHz or less, the absorption spectrum had a transparent region having a width of about $\Omega_A$. This means that the width of the spectrum can be controlled by the Rabi characteristic angular frequency. Further, the center angular frequency of transparent region was changed in the range from $\omega_{23}-2\pi c\cdot 50$ cm$^{-1}$ to $\omega_{23}+2\pi c\cdot 50$ cm$^{-1}$ when $\omega_A$ was changed. In this case, the absorption spectrum had a transparent region at the angular frequency of $\omega_A+\omega_{13C}\omega_{23C}$.

The member 5 is made the solid-state material whose absorption spectrum is flat in the range from $\omega_{13C}/(2\pi c)-50$ cm$^{-1}$ to $\omega_{13C}/(2\pi c)+50$ cm$^{-1}$. Therefore, the spectroscopic element exhibited a constant signal/noise ratio over the entire variable wavelength range, which was the ratio of the intensity of the light passing through the transparent region to the intensity of the light passing through the other wavelength region, not absorbed therein. FIG. 23 shows the transmittance spectrum of the spectroscopic element.

As mentioned above, the spectroscopic element according the fourth embodiment of the invention can have its spectrum width and its center wavelength controlled by the Rabi characteristic angular frequency $\omega_A$ and the angular frequency of $\omega_A$, respectively. The spectroscopic element can therefore be small and have high resolution.

(Fifth Embodiment)

The fifth embodiment of the invention is a spectroscopic element which differs from the fourth embodiment, in two respects. First, the solid-state member 5 is made of the solid-state material manufactured by the method according to the first embodiment, not the third embodiment. Second, the Rabi characteristic angular frequency $\Omega_A$ of the light beam A is set at 12 MHz to distribute the transition energy.

Like the fourth embodiment, the spectroscopic element according the fifth embodiment can have its spectrum width and its center wavelength controlled by the Rabi characteristic angular frequency $\omega_A$ and the angular frequency of $\omega_A$, respectively. Its signal/noise ratio does not depend on the wavelength. The spectroscopic element can therefore be small and have high resolution.

A light having a center photon energy 14540 cm$^{-1}$, a line width 10 cm$^{-1}$ and an intensity 25 mW/cm$^2$ as a spectral light is irradiated to the spectral element according to the embodiment and the element is evaluated. As a result, no change of an optical characteristics such as absorption spectrum of the solid-state material caused by irradiating a light thereto and it was observed to be able to obtain a stable spectral characteristics.

(Sixth Embodiment)

Another method of manufacturing solid-state material will be described below. The material made by this method is identical to the material manufactured by the method according to the first embodiment. The solid-state material according to the sixth embodiment therefore has the energy-level structure shown in FIG. 20. Hence, the sixth embodiment will be described briefly for any aspect similar to the first embodiment.

Excited light and a train of light pulses were applied to the starting material. The transition energy between the levels $^7F_1A_2$ and $^5D_0$ was thereby concentrated in a narrow energy region defined by the repetition frequency $\nu$ of the light pulse. Thus, the starting material was converted to solid-state material which has new distribution of transition angular frequency (i.e., the distribution of transition energy).

As in the first embodiment, the solid-state material thus provided was placed in a cryostat and maintained at 4 K. Then, the solid-state material was irradiated with light having a wavelength of about 14540 cm$^{-1}$ and resonating with the transition between the levels $^7F_0$ and $^5D_0$, while sweeping the wavelength of the light. The emission spectrum of the resultant excitation spectrum was examined. The peak angular frequency $\omega_{13C}$ was observed in the excitation spectrum. The source of the light used to determine the peak angular frequency in the excitation spectrum was a continuously oscillating, ring-dye laser which was excited with the light from the argon-ion laser. By using this ring-dye laser, the with of oscillating frequency was adjusted to about 500 KHz.

Next, the solid-state material was excited with light having angular frequency $\omega_{13C}$, as in the first embodiment.

The resultant emission spectrum was examined by a monochromater. A peak resulting from the transition between the levels $^7F_1A_2$ and $^5D_0$ was found in the vicinity of 14240 cm$^{-1}$. The angular frequency of this peak was identified with the angular frequency $\omega_{23C}$. A transition-energy distribution was attained which was similar to the one obtained in the first embodiment and illustrated in FIG. 21.

Then, the solid-state material having this transition-energy distribution was irradiated with light pulses emitted from a mode-locked semiconductor laser. The light pulses had been compressed to 20 fs and were applied at repetition frequency $\nu$ of 30 GHz. The center angular frequency $\omega_{PC}$ of the light pulses was set at $2.7111\times10^{18}$ Hz, or 14390 cm$^{-1}$ in terms of transition energy. The intensity of the light pulses was adjusted, thereby setting the value $(4\pi^2\mu^2/E_A^2/\hbar^2)T_2$ at 600 MHz. This value had been obtained by multiplying the square of the Rabi characteristic angular frequency converted from the average light intensity defined by the equation (15) by the transverse relaxation time $T_2$ for the level $^5D_0$. The momentum $\mu$ of the transition dipole used was one between the levels $^5D_0$ and $^7F_1A_2$.

Applied to the material along with the light pulses was the light having a wavelength of 19440 cm$^{-1}$ emitted from an argon-ion laser. This light and the light pulses were applied to the material for about 10 seconds. Then, light having an angular frequency of $\omega_{13C}$ was applied to the material, to excite.

Figure 33A:
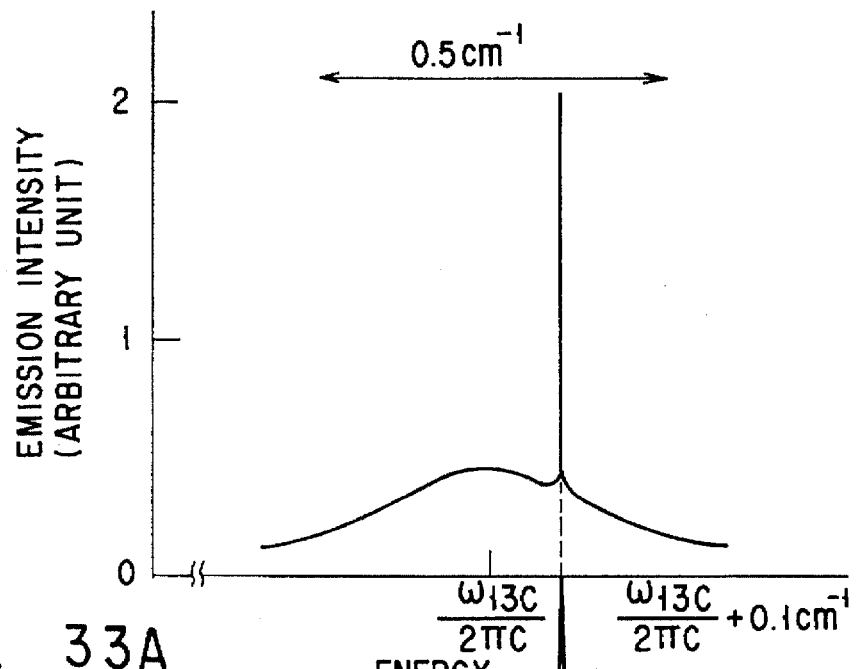
FIGS. 33A and 33B is a diagram representing the emission spectrum of a solid-state material made by a method which is a sixth embodiment of the invention.
Figure 33B:
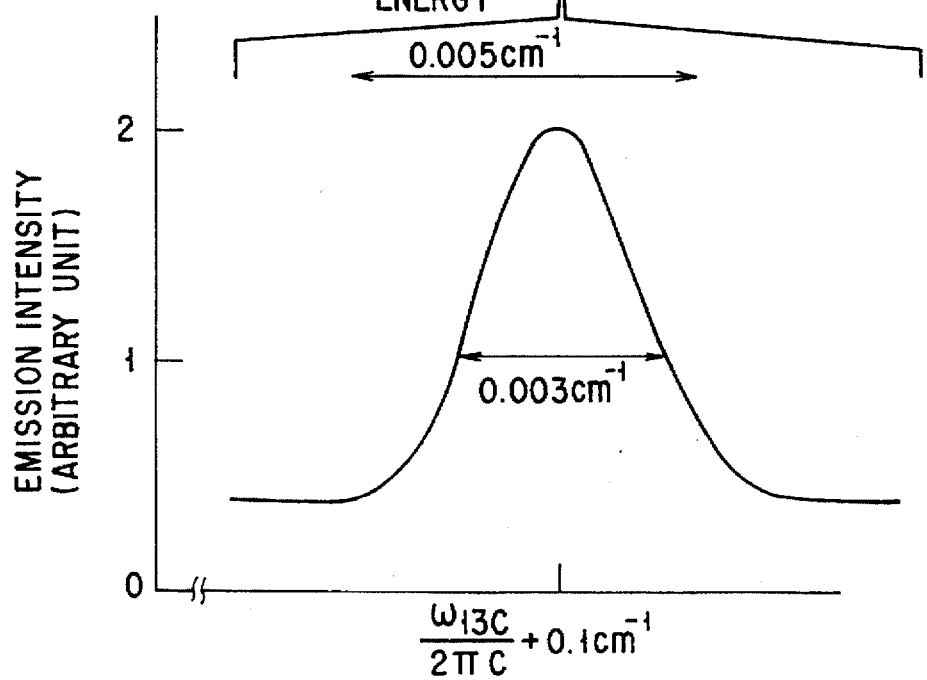

The resultant emission spectrum for the transition between the levels $^7F_1A_2$ and $^5D_0$ was analyzed by a high-resolution spectroscope. The analysis results were as shown in FIGS. 33A and 33B. FIG. 33B is different from FIG. 33A in that the scale of photon energy (i.e., abscissa) is extended. As is clear from FIG. 33A and 33B, a narrow emission spectral line was observed, overlapping a Gauss-type emission spectrum having a width of about 0.3 cm$^{-1}$. The narrow peak had a width of 0.003 cm$^{-1}$.

Figures 35A, 35B:
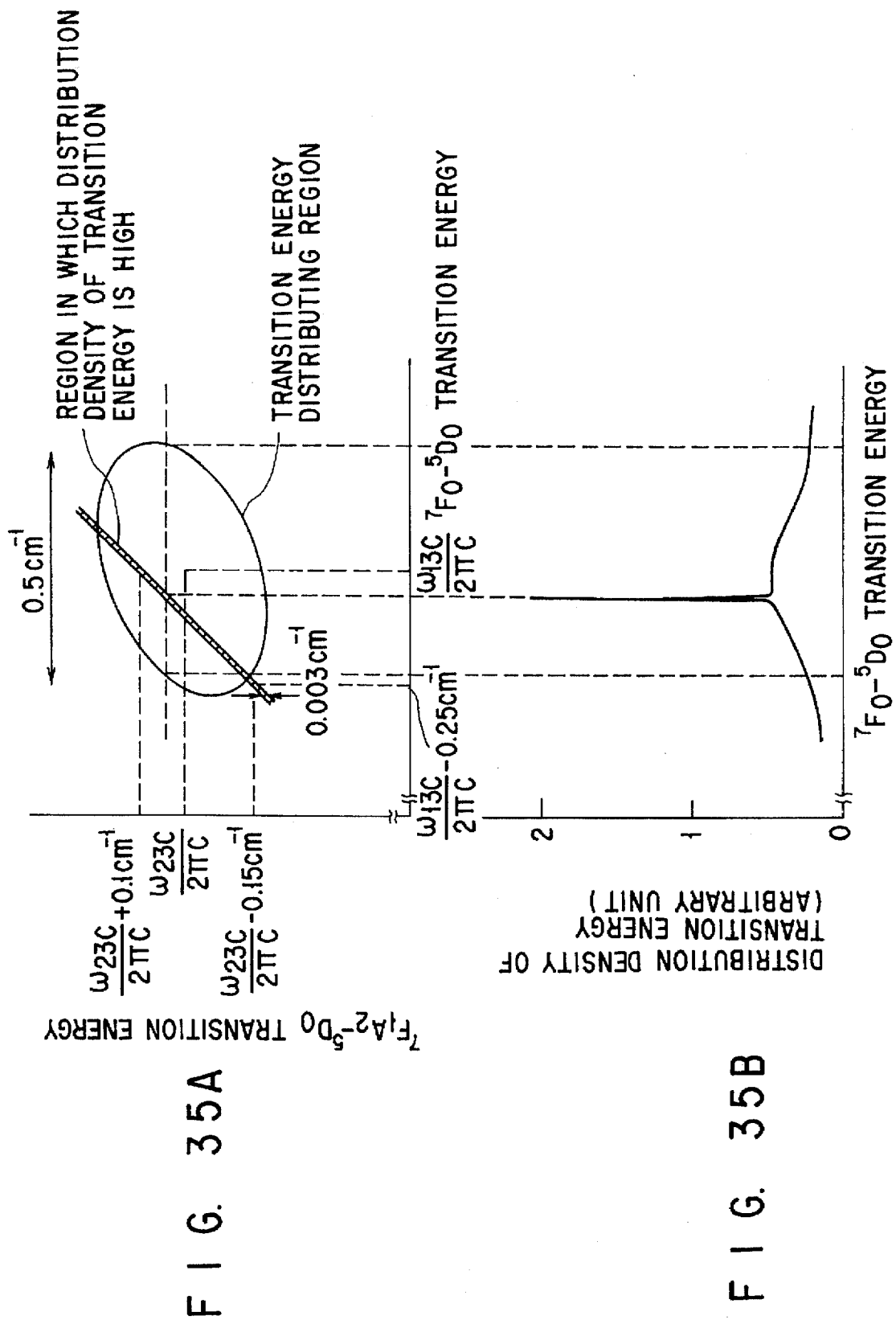
FIGS. 35A and 35B are diagram illustrating the transition-energy distribution in the solid-state material manufactured in the sixth embodiment.
Figure 34:
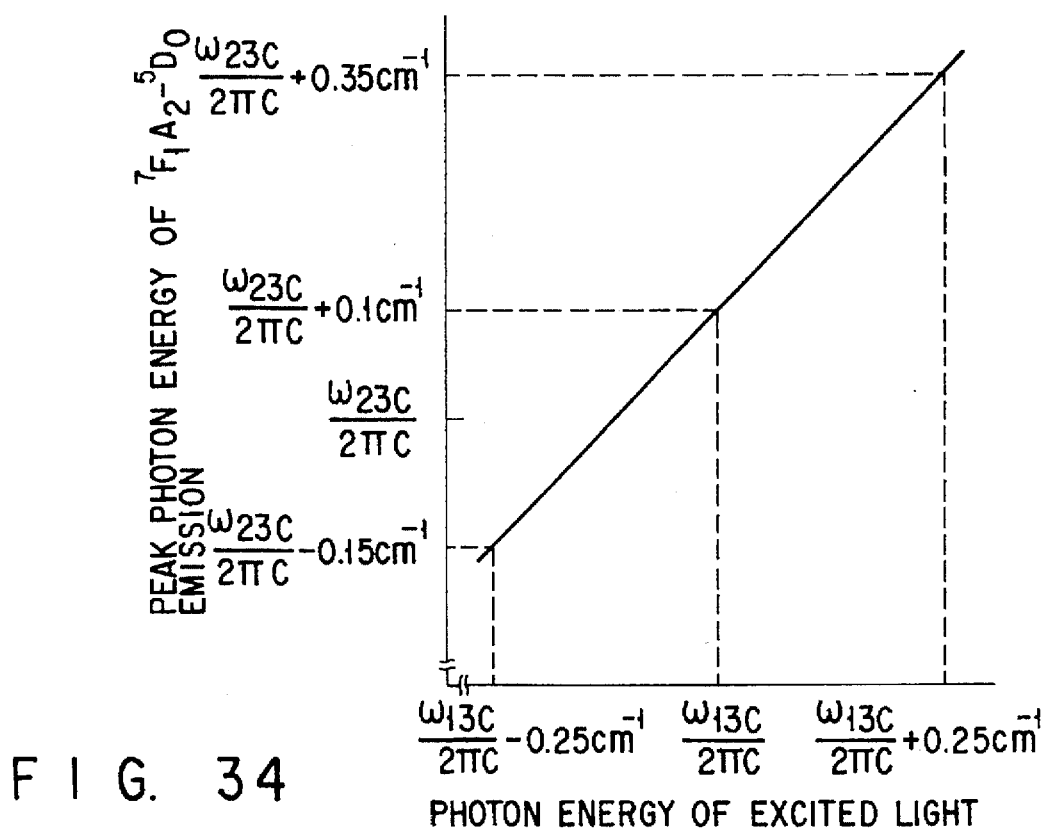
FIG. 34 is a graph showing the relationship between the photon energy of excited light and the photon energy at the peak of the emission spectrum for $^7F_4A_2-^5D_0$ transition.

FIG. 34 shows the relationship between the photon energy of excited light and the photon energy at the peak of the emission spectrum for $^7F_1A_2$–$^5D_0$ transition. The position $\omega_{1max}$ of the emission peak and the angular frequency $\omega_{ex}$ of the excited light had the relationship of: $\omega_{1max}=\omega_{ex}+\omega_{23C}-\omega_{13C}+0.1\times(2\pi c)$. This relationship means that the transition energy was distributed in the $\omega_{13}$–$\omega_{23}$ plane as shown in FIG. 35A after the material had been irradiated with the light pulses and the argon-ion laser beam. Shown in FIG. 35A is a band-shaped region in which the transition energy was distributed densely. FIG. 35B illustrates how Sm$^{+2}$ was distributed along the broken line shown in FIG. 35A. The angular frequency $\omega_{12}$ in the band-shaped region (FIG. 35A) is given as: $\omega_{12}=2\pi N\nu$, where N is a natural number. Natural number N is about 300.

When the light pulses were applied at a relatively higher repetition frequency $\nu$ by value of 10 MHz, the angular frequency $\omega_{12}$ in the band-shaped region shifted about 18 GHz toward high energy side. This means that the transition angular frequency the transition between the levels $^7F_0$ and $^7F_1A_2$ can be distributed, with the desired angular frequency $\omega_{12}$ ($=2\pi m\nu$) used as the center value, by adjusting the repetition frequency $\nu$.

Figure 36:
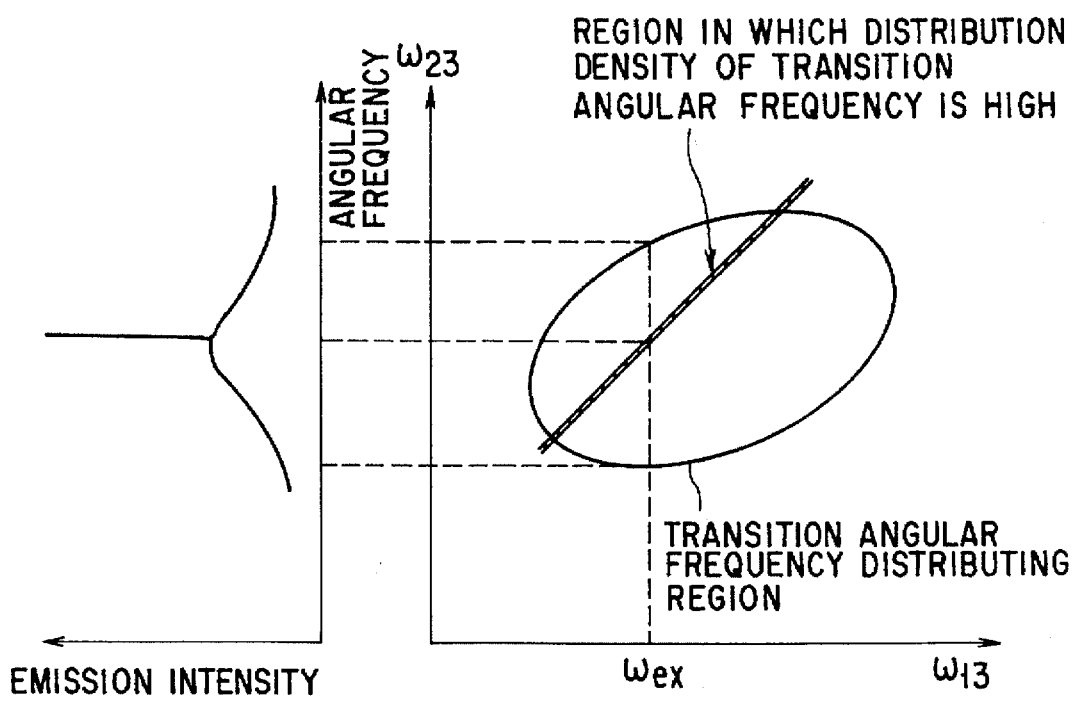
FIG. 36 is a graph representing the relationship between the transition-energy distribution and emission spectrum of the material manufactured in the sixth embodiment.

FIG. 36 illustrates how the emission energy of the material exhibiting this new transition-energy distribution behaves when the material is irradiated with excitation light having the angular frequency $\omega_{ex}$. The center angular frequency of the emission spectrum changes along the dotted line shown in FIG. 36. The shape of the spectrum is determined by the distribution of angular frequency $\omega_{23}$ at the angular frequency $\omega_{13}$ which corresponds to the angular frequency of the excited light.

FIG. 37 shows the emission spectrum which the solid-state material exhibited before irradiated with light pulses, and also the emission spectrum which the material exhibited after irradiated with light pulses. The material was excited with light having an angular frequency of $\omega_{13C}$ before irradiated with light pulses. Further, it was excited with the same light after irradiated with the light pulses. In FIG. 37, the dash-dotted line indicates the spectrum observed with the material before the light pulses were applied to the material. As can be understood from FIG. 37, the emission peak resulting from the light pulses applied to the material was four times as great as the value recorded before the application of the light pulses.

The ratio of the density of $Sm^{2+}$ to the density of $Sm^{3+}$, both dispersed in the starting solid-state material, i.e., $[Sm^{3+}]/[Sm^{2+}]$, is 2. The transition-energy density therefore increase by the factor $3(=2+1)$ when the mechanism (mechanism 1) of concentrating the transition energy by virtue of exchange between the exchange between $Sm^{2+}$ and $Sm^{3+}$ operates. However, the results of the emission spectrum analysis suggest that the transition-energy density increases four times in the region where the transition energy is concentrated. Another mechanism (mechanism 2) of concentrating transition energy seems to operate, in which the Sm ions move in the $\omega_{13}-\omega_{23}$ plane to undergo population trapping, when their valance reduces from 3 to 2 and change the local field located near the Sm ions.

FIG. 38 shows the emission spectrum which the solid-state material exhibited when optically processed in the same way as described above, except that the irradiation time was sufficiently long. The material was excited with light having an angular frequency of $\omega_{13C}$. As seen from FIG. 38, the emission peak was observed at the center value of $\omega_{23C}/2\pi c+0.1$ cm$^{-1}$. The emission intensity at the angular frequency was far higher than the value recorded before the application of the light pulses. At any other angular frequency, the emission intensity was lower than the value recorded before the application of the light pulses. This fact teaches that the light pulses applied changed the transition-energy distribution of the $Sm^{2+}$, converting the material to one having new transition-energy distribution (new distribution of transition angular frequency). The $Sm^{2+}$ therefore moved into the region extending along a straight line defined by $\omega_{23}=\omega_{13}+\omega_{23C}-\omega_{13C}+0.1\times 2\pi c$. As a result, the transition energy (transition angular frequency) was concentrated in this region.

In the sixth embodiment, the population trapping induced by a train of light pulses applied is utilized to provide new solid-state material in which the transition angular frequency between two energy levels is concentrated in a desired region, without decreasing the number of absorption centers.

(Seventh Embodiment)

A method of manufacturing solid-state material, witch is the seventh embodiment of the invention, will be described below. This method differs from the sixth method in two respects only. First, an electric field of $10^6$ V/m is applied to the material at the same time a train of light pulses and an argon-ion laser beam are applied to the solid-state material. Second, the light pulses and the argon-ion laser beam are applied for 3 minutes.

Figure 39:
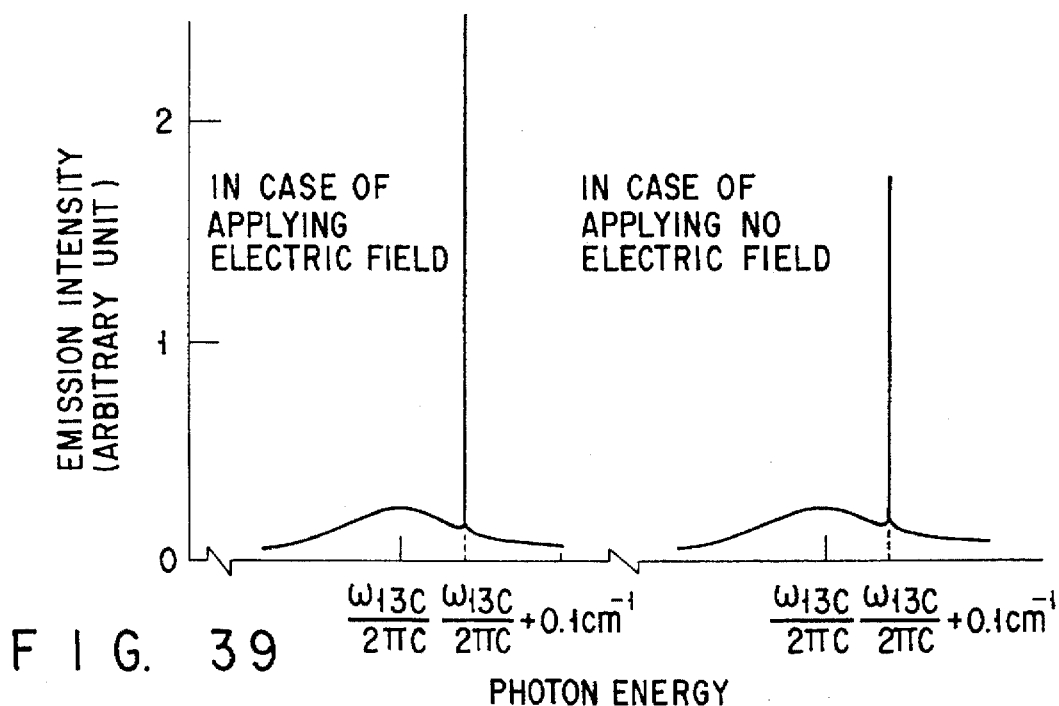
FIG. 39 is a diagram representing the photon energy-intensity relationship observed when an electric field was applied to the material, and also the photon energy-intensity relationship observed when no electric field was applied to the material.

The emission spectrum of the solid-state material thus prepared was examined, along with the emission spectrum of a solid-state material applied with light pulses and the laser beam for 3 minutes, but not applied with an electric field. The results were as shown in FIG. 39. The excited light applied to both types of materials had angular frequency $\omega_{13C}$, and the emission spectrum examined of both types of materials was one for the transition between the levels $^7F_1A_2$ and $^5D_0$.

As may be seen from FIG. 39, the material applied with the electric field had an emission peak at $\omega_{23C}/2\pi c+0.1$ cm$^{-1}$, whose intensity was 30% hither than that of the emission peak of the material applied with no electric field. This makes it clear that an electric field promotes the concentration of transition energy. Hence, the seventh embodiment can provide a solid-state material in which transition angular frequency is concentrate in a desired region more effectively.

(Eighth Embodiment)

Figure 40A:
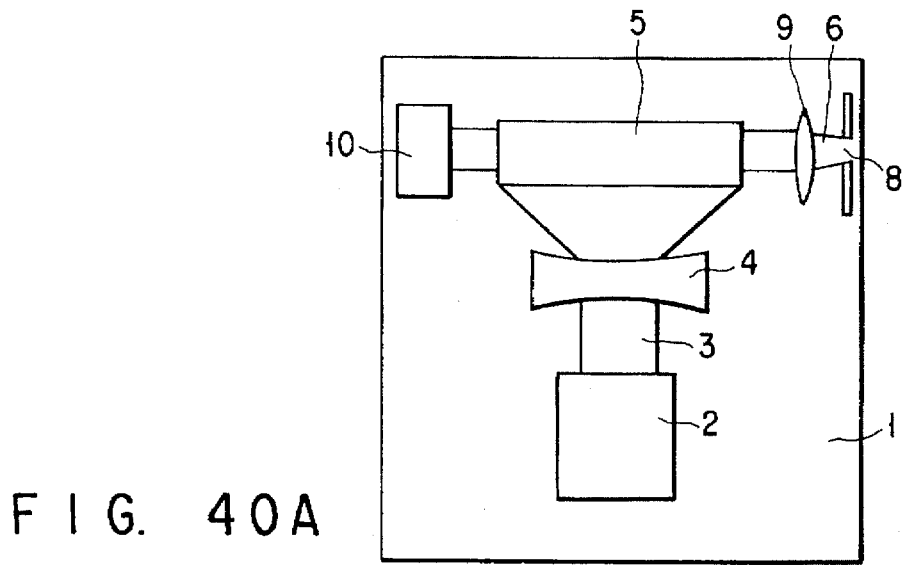
FIGS. 40A and 40B are sectional views of a frequency-measuring instrument incorporating a frequency-converting element according to an eighth embodiment of the invention.
Figure 40B:
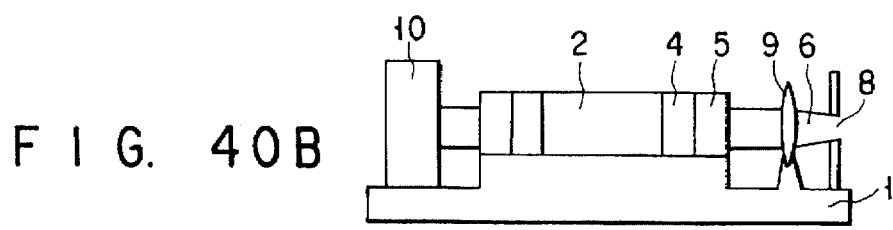

A frequency-measuring instrument using frequency-converting element which is the eighth embodiment of the invention will be described, with reference to FIGS. 40A and 40B. FIG. 40A is a sectional plan view, and FIG. 40B is a sectional side view. The frequency-measuring instrument incorporates a frequency-converting element. The components identical to those shown in FIGS. 31A and 31B are designated at the same reference numerals.

In operation, the variable-wavelength semiconductor laser 2, which is made of $Ga_xIn_{1-x}As_yP_{1-y}$ mixed crystal and whose oscillating wavelength depends on an electric current or temperature, emits a laser beam 3. The laser beam 3 is applied to the cylindrical lens 4 made of quartz. The lens 4 has a thin middle portion and thick end portions. The middle portion has a diameter of 0.7 mm, while the end portions have a diameter of 1 mm. The cylindrical lens 4 focuses the laser beam 3, which is applied to the solid-state member 5. The member 5 has a size of 1 mm×1 mm×4 mm and is made of the solid-state material made of BaClF crystal containing $Sm^{2+}$ and having an adjusted distribution of transition energy of $Sm^{2+}$.

Incident light 6 is applied through a light passage 8 to a collimating lens 9, which converts the light 6 to collimated light. The collimated light 6 passes through the solid-state member 5 and reaches a photodiode 10.

The variable-wavelength semiconductor laser 2, cylindrical quartz lens 4, solid-state member 5, light passage 8, collimating lens 9, and photodiode 10 are secured to an aluminum substrate 1.

The solid-state material of the member 5 has been processed, distributing the transition energy of the $Sm^{+2}$ in the BaClF crystal in a long band-shaped region in a $\omega_{13}-\omega_{23}$ plane. Here, $\omega_{13}$ is the transition angular frequency corresponding to the transition between level |1> (i.e., level $^7F_0$) and level |3> (i.e., level $^5D_0$), and $\omega_{23}$ is the transition angular frequency corresponding to the transition between level |2> (i.e., level $^7F_1A_2$) and level |3> (i.e., level $^5D_0$). Since the solid-state material has been thus process, a frequency-converting element of the type described above is provided.

In the process, the solid-state material is irradiated with a coherent light beam A corresponding to the transition between levels |2> and |3> and a light beam B corresponding to the transition between levels |1> and |3>. Population trapping is thereby induced on those ions which have transition energy satisfying a certain condition, preventing these ions from being excited to the level |3>. The other ions excited to the level |3> have their valence changed from 2 to 3 when a third light beam C is applied to the solid-state material. They no longer exist in the $\omega_{13}-\omega_{23}$ plane. Hence, a hole region is formed in the distribution of transition energy (transition angular frequency).

From a statistical point of view, Sm ions whose valence changes from 3 to 2 exist at this time, somewhere in the $\omega_{13}-\omega_{23}$ plane. Nonetheless, a transparent region remains in the $\omega_{13}-\omega_{23}$ plane if ions far less than all ions have moved from the $\omega_{13}-\omega_{23}$ plane. Thus, three light beams A, B and C are applied to the solid-state material, thereby processing the distribution of transition energy (transition angular frequency).

The solid-state material used in the eighth embodiment has the energy-level structure shown in FIG. 20. Namely, it is identical, in energy-level structure, to the material used in the first embodiment.

Light having a wavelength of 19440 cm$^{-1}$ was applied from an argon-ion laser to the solid-state material having the transition-energy distribution shown in FIG. 21, as in the first embodiment. At the same time, two light beams A and B were applied to the material from two continuously oscillating, ring-dye lasers, respectively, which were excited with the light from an argon-ion laser. The light beam A resonated with the energy transition between the levels $^7F_1A_2$ and $^5D_0$, while the light beam B resonated with the energy transition between the levels $^7F_0$ and $^5D_0$. The angular frequency $\omega_B$ was swept from $\omega_{13C}-2\pi c \cdot 0.02$ cm$^{-1}$ to $\omega_{13C}+2\pi c \cdot 0.02$ cm$^{-1}$, while maintaining the following relation between the angular frequencies $\omega_A$ and $\omega_B$:

$$\omega_A = 10\omega_B + \omega_{23c} - 10\omega_{13c} \tag{52}$$

At this time, the intensities of the light beams A and B were adjusted, setting the Rabi characteristic angular frequency $\Omega_A$ of the beam A at 3.8 GHz and the Rabi characteristic angular frequency $\Omega_B$ of the beam B at 6 MHz.

The resultant emission spectrum for the transition between the levels $^7F_1A_2$ and $^5D_0$ was then analyzed by a high-resolution spectroscope, in order to determine how much this spectrum depended on the photon energy of the excited light. The results of the analysis were as shown in FIG. 41. More precisely, FIG. 41 represents the relationship between the full width at half maximum of the emission spectrum and the photon energy of the excited light.

As is evident from FIG. 41, the full width at half maximum in the region where the photon energy of the excited light ranged from $\omega_{13c}/(2\pi c)-0.02$ cm$^{-1}$ to $\omega_{13c}/(2\pi c)+0.02$ cm$^{-1}$ was $2\times 10^{-2}$ cm$^{-1}$.

FIG. 42 shows the relation between the peak photon energy observed in the emission spectrum for the transition between the levels $^7F_1A_2$ and $^5D_0$, on one hand, and the photon energy of the excited light applied to the solid-state material, on the other. This relationship resulted from the fact that the transition-energy distribution on the $\omega_{13}-\omega_{23}$ plane changed to the one illustrated in FIG. 43, after the material had been irradiated with the light beams A and B.

FIG. 44 shows how the emission spectrum of the solid-state material having the new transition-energy distribution behaves if the excited light beam B has an angular frequency $\omega_{B1}$, and also how the emission spectrum behaves when beam B has an angular frequency $\omega_{B2}$. The center angular frequency of the emission spectrum changes along the dash-dotted line shown in FIG. 44. The half-value full width of the emission spectrum is determined by the distribution of angular frequency $\omega_{23}$ at the angular frequency $\omega_{13}$ which corresponds to the angular frequency of the excited light.

When the solid-state material is optically processed as mentioned above, the transition energy each site in the material will be distributed in a long band-shaped region extending along a sharply sloping, straight line defined by the following equation, if a=10:

$$\omega_{23} = 10\omega_{13} - 10\omega_{13c} + \omega_{23c} \tag{53}$$

In other words, when the angular frequency $\omega_B$ is swept, while the angular frequencies $\omega_A$ and $\omega_B$ remain in the relation defined by the equation (52), population trapping is induced on those ions which have transition energy distributed along the straight line defined by the equation (53). Therefore, these ions do not move far from the straight line. This is why the transition energy is distributed in the long band-shaped region.

The absorption spectrum of the solid-state material was examined, using light applied in a direction perpendicular to the laser beam 2. The intensity of the laser beam 2 was adjusted, thus setting the Rabi characteristic angular frequency $\Omega_A$ for the $^7F_1A_2-^5D_0$ transition at 5 GHz and the angular frequency $\omega_A$ of the laser beam 2 at $\omega_{23c}+2\pi c \cdot 0.1$ cm$^{-1}$. The absorption spectrum then had a region which had a width of about $2\times 10^{-3}$ cm$^{-1}$ and in which light is substantially not absorbed, as shown in FIG. 45. This region centered at $\omega_{13c}+2\pi c \cdot 0.1$ cm$^{-1}$.

The angular frequency $\omega_A$ was changed from $\omega_{23c}-2\pi c \cdot 0.1$ cm$^{-1}$ to $\omega_{23c}+2\pi c \cdot 0.1$ cm$^{-1}$. Then, a transparent region was formed at $0.1\times\omega_A-0.1\times\omega_{23c}+\omega_{13c}$. That is, the change of angular frequency at the transparent region changed one tenth the change of the angular frequency $\omega_A$.

Next, incident light 6 is applied through the light passage 8, and the angular frequency of the laser beam 3 was swept, while recording the output of the photodiode 10. The incident light was a beam emitted from a ring-dye laser excited with the light from an Ar$^+$ laser.

FIG. 46 illustrates how the output of the photodiode 10 changed when the angular frequency $\omega_A$ was changed from $\omega_{23c}-2\pi c \cdot 0.2$ cm$^{-1}$ to $\omega_{23c}+2\pi c \cdot 0.2$ cm$^{-1}$. Plotted on the abscissa are not only the angular frequency $\omega_A$, but also the angular frequency of the light which passed through the transparent region.

The resolution was 0.02 cm$^{-1}$ because of the changes in the frequency of the laser beam 3 which was swept. The frequency-measuring resolution for the incident light 6 was 0.002 cm$^{-1}$, which was sufficiently high.

As indicated above, the frequency-measuring instrument, i.e., the eighth embodiment of the invention, can be small and can yet have a resolution which is ten times as high as the frequency-measuring resolution of the semiconductor laser 2.

(Ninth Embodiment)

FIGS. 47A and 47B ares sectional views of a frequency modulator/amplifier incorporating a frequency-converting element, which is the ninth embodiment of the present invention. FIG. 47A is a plan view, and FIG. 47B is a side view. The components identical to those shown in FIGS. 40A and 40B are denoted at the same reference numerals.

In operation, the semiconductor laser 2, which is made of, for example, $Ga_xIn_{1-x}As_yP_{1-y}$ mixed crystal, emits a laser beam 3 having a width of about 1 cm$^{-1}$. The laser beam 3 is applied to the first cylindrical lens 4 made of quartz and having a diameter of 1 mm. The first cylindrical lens 4 focuses the laser beam 3, which is applied to the solid-state member 5. The member 5 has a size of 1 mm×1 mm×3 mm and is made of the solid-state material made of BaClF crystal containing Sm$^{2+}$ and having an adjusted distribution of transition energy of Sm$^{2+}$.

Incident light 6 is applied to the second cylindrical lens 9 made of quartz and having a diameter of 1 mm. The second cylindrical lens 9 focuses the incident light 6. The light 6 focused passes through the solid-state member 5. A beam stopper 11 prevents the light 6 from leaking outside.

The semiconductor laser 2, first cylindrical quartz lens 4, solid-state member 5, second cylindrical quartz lens 9, and beam stopper 11 are secured to an aluminum substrate 1.

The solid-state material of the member 5 used in the frequency modulator/amplifier has been processed, and the transition energy has been distributed in desired manner.

More specifically, as in the eighth embodiment, light having a wavelength of 19440 cm$^{-1}$ was applied from an argon-ion laser to the solid-state material. At the same time, two light beams A and B were applied to the material from two continuously oscillating, ring-dye lasers, respectively, which were excited with the light from an argon-ion laser.

The light beam A resonated with the energy transition between the levels $^7F_1A_2$ and $^5D_0$, while the light beam B resonated with the energy transition between the levels $^7F_0$ and $^5D_0$. The angular frequency $\omega_A$ of the beam A and the angular frequency $\omega_B$ of the beam B were simultaneously swept. In the present embodiment, the angular frequency $\omega_B$ was swept from $\omega_{13C}-2\pi c \cdot 0.2$ cm$^{-1}$ to $\omega_{13C}+2\pi c \cdot 0.2$ cm$^{-1}$, while maintaining the following relation between the angular frequencies $\omega_A$ and $\omega_B$:

$$\omega_A = 0.1\omega_B + \omega_{23c} - 0.1\omega_{13c} \quad (54)$$

The intensities of the light beams A and B were then adjusted, setting the Rabi characteristic angular frequency $\Omega_A$ of the beam A at 380 MHz and the Rabi characteristic angular frequency $\omega_B$ of the beam B at 6 MHz.

The resultant emission spectrum for the transition between the levels $^7F_1A_2$ and $^5D_0$ was then analyzed by a high-resolution spectroscope, in order to determine how much this spectrum depended on the photon energy of the excited light. The results of the analysis were as shown in FIG. 48. More precisely, FIG. 48 represents the relationship between the full width at half maximum of the emission spectrum and the photon energy of the excited light.

As is evident from FIG. 48, the full width at half maximum in the region where the photon energy of the excited light ranged from $\omega_{13c}/(2\pi c)-0.2$ cm$^{-1}$ to $\omega_{13c}/(2\pi c)+0.2$ cm$^{-1}$ was $2\times10^{-3}$ cm$^{-1}$.

Figure 49:
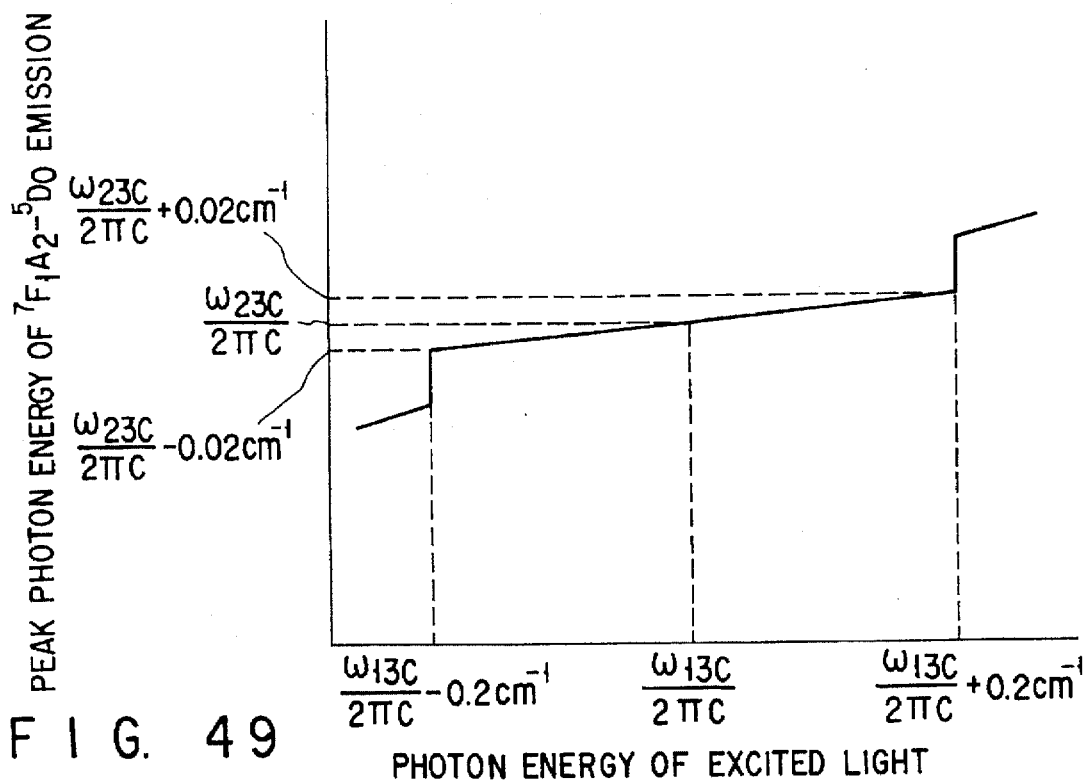
FIG. 49 is a graph showing the peak photon energy of the material used in the modulator/amplifier and the photon energy of the excited light applied to the material.
Figure 50:
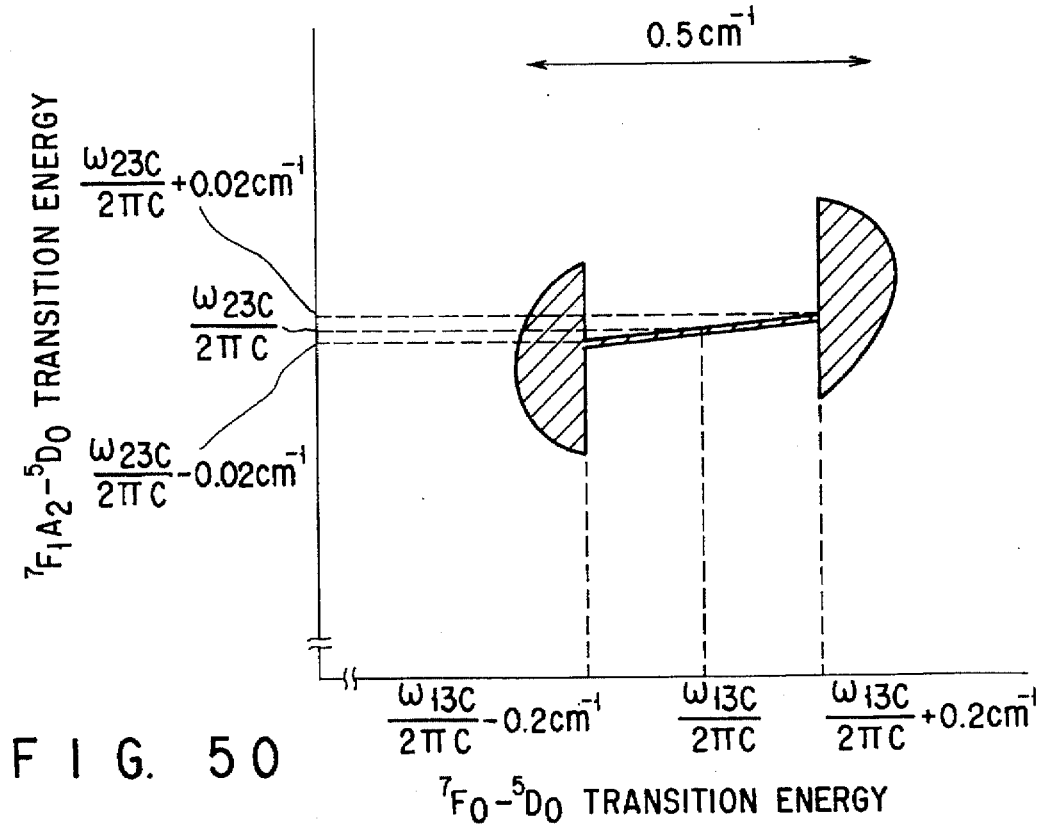
FIG. 50 is a diagram depicting the transition-energy distribution of the solid-state material used in the modulator/amplifier shown in FIGS. 47A and 47B.

FIG. 49 shows the relation between the peak photon energy observed in the emission spectrum for the transition between the levels $^7F_1A_2$ and $^5D_0$, on one hand, and the photon energy of the excited light applied to the solid-state material, on the other. This relationship resulted from the fact that the transition-energy distribution on the $\omega_{13}$–$\omega_{23}$ plane changed to the one illustrated in FIG. 50, after the material had been irradiated with the light beams A and B.

When the solid-state material is optically processed as mentioned above, the transition energy each site in the material will be distributed in a long band-shaped region extending along a gently sloping, straight line defined by the following equation, if a=0.1:

$$\omega_{23} = 0.1\omega_{13} - 0.1\omega_{13c} + \omega_{23c} \quad (55)$$

Further, a laser beam emitted from a wavelength-variable semiconductor laser was applied as incident light 6 to the solid-state material. To more specific, the angular frequency of the laser beam was set at $\omega_{23C}$, and the laser beam was frequency-modulated by using $\omega_{23C}$ as the center angular frequency, at cycle period of 10 ms and amplitude of 0.01 cm$^{-1}$. As a result of this, the frequency modulator/amplifier output frequency-modulated light 12 which had a center frequency $\omega_{13C}$, a cycle period of 10 ms and an amplitude of 0.1 cm$^{-1}$. This output light 12 was amplified ten times as much as the incident light.

Thus, the frequency modulator/amplifier, i.e., the ninth embodiment of the invention, has a large amplification factor, capable of amplifying the incident light 6 ten times.

The present invention is not limited to the embodiments described above, which are spectroscopic elements. Rather, the invention can be applied to other types of elements, such as lasers exhibiting no population inversion.

In the first to fifth embodiments, the transition-energy distribution (i.e., angular-frequency distribution) is not limited to those having the shapes described above. For example, a crescent distribution of transition energy can be obtained.

In the sixth and seventh embodiments, an electric field is applied to the solid-state material. Instead, an external field of another type, such as a magnetic field or a stress, can be applied to the material to attain the same advantage.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a solid-state material comprising:

a first step of preparing a starting material having an energy-level structure with at least first, second and third energy levels, each having a specific level width, said first energy level is the lowest of the three levels, one of said second and third energy levels changing the energy-level structure when light having a predetermined wavelength is applied to the material, and the energy-level structure remaining so changed even after the application of the light; and a second step of irradiating the starting material with a first coherent light beam resonating with transition between said first and third energy levels and a second coherent light beam resonating with transition between said second and third energy levels in a case that said third level is a level which changes the energy level structure, thereby changing a distribution of angular frequency in a plane one axis of which is a first transition angular frequency corresponding to the transition between said first and third energy levels and the other axis of which is a second transition angular frequency corresponding to the transition between said second and third energy levels, thereby to form a solid-state material having new distribution of transition angular frequency, wherein said second step includes a step of setting a spectral width of said second light beam, Rabi characteristic angular frequency for transition of said first light beam and Rabi characteristic angular frequency for transition of said second light beam within one of two inhomogeneous widths for said first and second transition angular frequencies which is broader than the other.

2. The method according to claim 1, wherein at least one of said first and second light beams includes a plurality of light beams each having different angular frequency.

3. The method according to claim 1, wherein said second step further comprises a step of changing the angular frequency of at least one of said first and second light beams, while applying said first and second light beams to said starting material, either continuously or intermittently.

4. A method of manufacturing a solid-state material, comprising the steps:

a first step of preparing a starting material having an energy-level structure with at least first, second, third and fourth energy levels, each having a specific level width, said first energy level is the lowest of the four levels, said fourth energy levels changing the energy-level structure when light having a predetermined wavelength is applied to the material, and the energy-level structure remaining so changed even after the application of the light; and a second step of irradiating the starting material with a first coherent light beam resonating with transition between said first and third energy levels, a second coherent light beam resonating with transition between said second and third energy levels and a third light beam for directly or indirectly exciting said third energy level to said fourth energy level, thereby changing a distribution of angular frequency in a plane one axis of which is a first transition angular frequency corresponding to the transition between said first and third energy levels and the other axis of which is a second transition angular frequency corresponding to the transition between said second and third energy levels, thereby to form a solid-state material having new distribution of transition angular frequency, wherein said second step includes a step of setting a spectral width of said second light beam, Rabi characteristic angular frequency for transition of said first light beam and Rabi characteristic angular frequency for transition of said second light beam within one of two inhomogeneous widths for said first and second transition angular frequencies which is broader than the other.

5. The method according to claim 4, wherein at least one of said first and second light beams includes a plurality of light beams each having different angular frequency.

6. The method according to claim 4, wherein said second step further comprises a step of changing the angular frequency of at least one of said first and second light beams, while applying said first and second light beams to said starting material, either continuously or intermittently.

7. A solid-state material having an energy-level structure with at least first, second and third energy levels, each having a specific level width, said first energy level is the lowest of the three levels, wherein a distribution of angular frequency in a plane one axis of which is a first transition angular frequency corresponding to the transition between said first and third energy levels and the other axis of which is a second transition angular frequency corresponding to the transition between said second and third energy levels has a part processed and removed, and a boundary between the removed part and remaining part of the distribution of angular frequency is in part not perpendicular to the axis of said first transition angular frequency.

8. The material according to claim 7, wherein said third energy level is higher than said second energy level, and the remaining part of the distribution of angular frequency is shaped such that the distribution extends along a predetermined straight line whose difference between said first and second transition angular frequencies.

9. The material according to claim 7, wherein said third energy level is lower than said second energy level, and the remaining part of the distribution of angular frequency is shaped such that the distribution extends along a predetermined straight line whose sum of said first and second transition angular frequencies.

10. A method of manufacturing a solid-state material, comprising:

a first step of preparing a starting material having an energy-level structure with at least first, second and third energy levels, said second energy level being higher than said first energy level and lower than said third energy level, wherein a part is excited to said third energy level and a field near said part changes, whereby said part acquires a different energy level in a distribution of angular frequency in a plane one axis of which is a first transition angular frequency corresponding to the transition between said first and third energy levels and the other axis of which is a second transition angular frequency corresponding to the transition between said second and third energy levels, and a reciprocal of transverse relaxation time for transition between said first and second energy levels is less than an inhomogeneous width of a transition angular frequency corresponding to the transition between said first and second energy levels; and a second step of irradiating the starting material with a train of light pulses having a pulse width which is less than a reciprocal of a transition angular frequency corresponding to transition between said first and second energy levels, and having a center angular frequency which is an angular frequency resonating with transition between said first and third energy levels and simultaneously with transition between said second and third energy levels.

11. The method according to claim 10, wherein said second step includes a step of applying at least one of an electric field, a magnetic field and a stress to said starting material, together with said excited light.

12. A method of manufacturing a solid-state material, comprising:

a first step of preparing a starting material having an energy-level structure with at least first, second, third and fourth energy levels, said second energy level being higher than said first energy level and lower than said third energy level, and said fourth energy level being different from said first, second and third energy levels, wherein a part is excited from said third energy level directly or indirectly to said fourth energy level and a field near said part changes, whereby said part acquires a different energy level in a distribution of angular frequency in a plane one axis of which is a first transition angular frequency corresponding to the transition between said first and third energy levels and the other axis of which is a second transition angular frequency corresponding to the transition between said second and third energy levels, and a reciprocal of transverse relaxation time for transition between said first and second energy levels is less than an inhomogeneous width of a transition angular frequency corresponding to the transition between said first and second energy levels; and a second step of irradiating the starting material with excited light causing a transition from said third energy level directly or indirectly to said fourth energy level and with a train of light pulses having a pulse width which is less than a reciprocal of a transition angular frequency corresponding to transition between said first and second energy levels, and having a center angular frequency which is an angular frequency resonating with transition between said first and third energy levels and simultaneously with transition between said second and third energy levels.

13. The method according to claim 12, wherein said second step includes a step of applying at least one of an electric field, a magnetic field and a stress to said starting material, together with said excited light.

14. A method of manufacturing a solid-state material, comprising the steps:

a first step of preparing a starting material containing ions capable of assuming a first valence and a second valence grater than the first valence, and having an energy-level structure wherein ions of the first valence have at least first, second and third energy levels, said second energy level being higher than said first energy level and lower than said third energy level, ions of the first valence are excited to said third energy level, thereby emitting electrons and assuming the second valence, ions of the second valence receives the electrons, thereby assuming the first valence, and a reciprocal of transverse relaxation time for transition between said first and second energy levels is less than an inhomogeneous width of a transition angular frequency corresponding to the transition between said first and second energy levels; and a second step of irradiating the starting material with a train of light pulses having a pulse width which is less than a reciprocal of a transition angular frequency corresponding to transition between said first and second energy levels, and having a center angular frequency which is an angular frequency resonating with transition between said first and third energy levels and simultaneously with transition between said second and third energy levels.

15. The method according to claim 14, wherein said second step includes a step of applying at least one of an electric field, a magnetic field and a stress to said starting material, together with said excited light.

16. A method of manufacturing a solid-state material, comprising:

a first step of preparing a starting material containing ions capable of assuming a first valence and a second valence grater than the first valence, and having an energy-level structure wherein ions of the first valence have at least first, second, third and fourth energy levels, said second energy level being higher than said first energy level and lower than said third energy level and said fourth energy level being different from said first, second and third energy levels, ions of the first valence are excited from said third energy levels directly or indirectly to said fourth energy level, thereby emitting electrons and assuming the second valence, ions of the second valence receives the electrons, thereby assuming the first valence, and a reciprocal of transverse relaxation time for transition between said first and second energy levels is less than an inhomogeneous width of a transition angular frequency corresponding to the transition between said first and second energy levels; and a second step of irradiating the starting material with excited light causing a transition from said third energy level directly or indirectly to said fourth energy level and with a train of light pulses having a width which is less than a reciprocal of a transition angular frequency corresponding to transition between said first and second energy levels, and having a center angular frequency which is an angular frequency resonating with transition between said first and third energy levels and simultaneously with transition between said second and third energy levels.

17. The method according to claim 16, wherein said second step includes a step of applying at least one of an electric field, a magnetic field and a stress to said starting material, together with said excited light.

18. A frequency-converting element comprising a solid-state material having an energy-level structure with at least first, second and third energy levels, each having a specific level width, said first energy level is the lowest of the three levels, and having a band-shaped distribution of angular frequency in a plane one axis of which is a first transition angular frequency corresponding to the transition between said first and third energy levels and the other axis of which is a second transition angular frequency corresponding to the transition between said second and third energy levels, said band-shaped distribution extending along a straight line defined by:

$\omega_{23}=a\omega_{13}+b, |a|>1$ where a and b are constants, $\omega_{13}$ is said first transition angular frequency, and $\omega_{23}$ is said second transition angular frequency.

19. The frequency-converting element according to claim 18, wherein the distribution of angular frequency in said plane is changed by irradiating said solid-state material with a first coherent light beam resonating with transition between said first and third energy levels and a second coherent light beam resonating with transition between said second and third energy levels.

20. A frequency-measuring instrument comprising:

a frequency-converting element of a type defined in claim 18, for converting incident light resonating with transition between said second and third energy levels and generating output light resonating with transition between said first and third energy levels;

means for irradiating solid-state material in said frequency-converting element, with coherent light which resonates with the transition between said second and third energy levels; and means for detecting light passing through said solid-state material.

21. A frequency-converting element comprising a solid-state material having an energy-level structure with at least first, second and third energy levels, each having a specific level width, said first energy level is the lowest of the three levels, and having a band-shaped distribution of angular frequency in a plane one axis of which is a first transition angular frequency corresponding to the transition between said first and third energy levels and the other axis of which is a second transition angular frequency corresponding to the transition between said second and third energy levels, said band-shaped distribution extending along a straight line defined by:

$\omega_{23}=a\omega_{13}+b, |a|>1$ where a and b are constants, $\omega_{13}$ is said first transition angular frequency, and $\omega_{23}$ is said second transition angular frequency.

22. The frequency-converting element according to claim 21, wherein the distribution of angular frequency in said plane is changed by irradiating said solid-state material with a first coherent light beam resonating with transition between said first and third energy levels and a second coherent light beam resonating with transition between said second and third energy levels.

23. A frequency modulator/amplifier comprising:

a frequency-converting element of a type defined in claim 21, for converting incident light resonating with transition between said second and third energy levels and generating output light resonating with transition between said first and third energy levels; and means for irradiating solid-state material in said frequency-converting element, with coherent light which has a frequency width corresponding to a frequency-modulation width of said incident light and which resonates with the transition between said first and third energy levels.

* * * * *

UNITED STATES PATENT AND TRADEMARK OFFICE
CERTIFICATE OF CORRECTION

PATENT NO. : 5,699,374
DATED : DECEMBER 16, 1997
INVENTOR(S) : ICHIMURA ET AL

It is certified that error appears in the above-identified patent and that said Letters Patent is hereby corrected as shown below:

Column 42, line 40, change ">" to --<--;

Signed and Sealed this

Sixteenth Day of February, 1999

Attest:

Attesting Officer

Acting Commissioner of Patents and Trademarks